United States Patent
Gulati et al.

(10) Patent No.: US 11,272,482 B2
(45) Date of Patent: Mar. 8, 2022

(54) METHODS FOR TRANSMISSION TO ACHIEVE ROBUST CONTROL AND FEEDBACK PERFORMANCE IN A NETWORK

(71) Applicant: QUALCOMM Incorporated, San Diego, CA (US)

(72) Inventors: Kapil Gulati, Hillsborough, NJ (US); Junyi Li, Chester, NJ (US); Sudhir Kumar Baghel, Hillsborough, NJ (US); Tien Viet Nguyen, Bridgewater, NJ (US); Arjun Bharadwaj, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/671,117

(22) Filed: Oct. 31, 2019

(65) Prior Publication Data

US 2020/0145978 A1    May 7, 2020

Related U.S. Application Data

(60) Provisional application No. 62/754,396, filed on Nov. 1, 2018, provisional application No. 62/754,491, filed on Nov. 1, 2018.

(51) Int. Cl.
*H04W 72/04* (2009.01)
*H04W 28/04* (2009.01)
(Continued)

(52) U.S. Cl.
CPC ....... *H04W 72/0406* (2013.01); *H04W 28/04* (2013.01); *H04W 72/044* (2013.01); *H04W 72/10* (2013.01); *H04W 92/18* (2013.01)

(58) Field of Classification Search
CPC ............. H04W 72/0406; H04W 28/04; H04W 72/044; H04W 72/10; H04W 92/18
See application file for complete search history.

(56) References Cited

U.S. PATENT DOCUMENTS

| | | | |
|---|---|---|---|
| 9,112,685 | B2 | 8/2015 | Gage et al. |
| 9,876,609 | B2 | 1/2018 | Walton et al. |
| (Continued) | | | |

OTHER PUBLICATIONS

Di B., et al., "V2X Meets NOMA: Non-Orthogonal Multiple Access for 5G Enabled Vehicular Networks", IEEE Wireless Communications, May 24, 2017, pp. 1-18.

(Continued)

*Primary Examiner* — Luat Phung
(74) *Attorney, Agent, or Firm* — Loza & Loza, LLP/Qualcomm Incorporated

(57) ABSTRACT

Aspects of the disclosure relate to methods for wireless communication. A transmitting device transmits a first portion of a control message to a receiving device. The first portion includes information for decoding a second portion of the control message and for decoding data. The transmitting device then transmits the second portion to the receiving device, the second portion including additional information for decoding the data. Thereafter, the first device transmits the data to the receiving device. The receiving device receives the first portion and the second portion, and decodes the received second portion based on the information included in the first portion. The receiving device then receives the data from the second device if the received second portion is able to be decoded. The receiving device decodes the received data based on the information included in the first portion and the additional information included in the second portion.

72 Claims, 22 Drawing Sheets

(51) Int. Cl.
*H04W 72/10* (2009.01)
*H04W 92/18* (2009.01)

(56) References Cited

U.S. PATENT DOCUMENTS

| | | | |
|---|---|---|---|
| 2017/0111886 A1 | 4/2017 | Kim et al. | |
| 2017/0367059 A1 | 12/2017 | Park et al. | |
| 2018/0076994 A1 | 3/2018 | Lee et al. | |
| 2018/0131468 A1* | 5/2018 | Blasco Serrano | .... H04L 1/0025 |
| 2018/0132168 A1 | 5/2018 | Ingale et al. | |
| 2018/0227886 A1* | 8/2018 | Chou | .......... H04W 72/046 |
| 2018/0234220 A1 | 8/2018 | Yasukawa et al. | |
| 2018/0278454 A1 | 9/2018 | Islam et al. | |
| 2018/0302889 A1 | 10/2018 | Guo et al. | |
| 2018/0343626 A1 | 11/2018 | Li et al. | |
| 2019/0020987 A1* | 1/2019 | Khoryaev | .......... H04W 72/046 |
| 2019/0045526 A1* | 2/2019 | Lee | ................ H04L 5/00 |
| 2019/0075546 A1 | 3/2019 | Yasukawa et al. | |
| 2019/0089564 A1* | 3/2019 | Blasco Serrano | .. H04L 27/2608 |
| 2019/0090156 A1* | 3/2019 | Kim | .......... H04L 69/04 |
| 2019/0132834 A1 | 5/2019 | Yan et al. | |
| 2019/0199564 A1 | 6/2019 | Jiang et al. | |
| 2019/0223094 A1 | 7/2019 | Ingale et al. | |
| 2019/0260497 A1* | 8/2019 | Wang | ............... H04L 1/0003 |
| 2019/0260540 A1* | 8/2019 | Blasco Serrano | .... H04L 5/0053 |
| 2019/0261398 A1 | 8/2019 | Golitschek Edler Von Elbwart | |
| 2019/0306923 A1 | 10/2019 | Xiong et al. | |
| 2019/0349153 A1 | 11/2019 | Li et al. | |
| 2020/0022175 A1* | 1/2020 | Xiong | ............... H04L 5/0053 |
| 2020/0029318 A1 | 1/2020 | Guo | |
| 2020/0037314 A1 | 1/2020 | Xiong et al. | |
| 2020/0053528 A1 | 2/2020 | Wang et al. | |
| 2020/0067610 A1* | 2/2020 | Lee | ................ H04B 17/318 |
| 2020/0068605 A1 | 2/2020 | Golitschek Edler Von Elbwart | |
| 2020/0100215 A1 | 3/2020 | Li et al. | |
| 2020/0106566 A1 | 4/2020 | Yeo et al. | |
| 2020/0112982 A1 | 4/2020 | Li et al. | |
| 2020/0120545 A1 | 4/2020 | Li et al. | |
| 2020/0127796 A1 | 4/2020 | Li et al. | |
| 2020/0260472 A1 | 8/2020 | Ganesan et al. | |
| 2020/0266857 A1 | 8/2020 | Hwang et al. | |

OTHER PUBLICATIONS

CATT: "Motivation for Study Item on Non-orthogonal Multiple Access for NR", 3GPP Draft, 3GPP TSG RAN Meeting #75, RP-170407 Motivation for SI on NOMA for NR, 3rd Generation Partnership Project (3GPP), Mobile Competence Centre, 650, Route Des Lucioles, F-06921 Sophia-Antipolis Cedex, France, vol. TSG RAN, No. Dubrovnik, Croatia, Mar. 6, 2017-Mar. 9, 2017, Mar. 18, 2018 (Mar. 18, 2018), XP051507088, pp. 1-17, URL: http://www.3gpp.org/ftp/tsg%5Fran/TSG%5FRAN/TSGR%5F75/Docs/RP%2D170407%2Ezip, [retrieved on Mar. 18, 2018], slide 9, slide 11.
CATT: "Support of Unicast, Groupcast and Broadcast in NR Sidelink", 3GPP Draft, 3GPP TSG RAN1 Meeting #94 bis, R1-1810539, 3rd Generation Partnership Project (3GPP), Mobile Competence Centre, 650, Route Des Lucioles, F-06921 Sophia-Antipolis Cedex, France, vol. RAN WG1, No. Chengdu, China, Oct. 8, 2018-Oct. 12, 2018, Sep. 29, 2018 (Sep. 29, 2018), XP051517947, 9 Pages, URL: http://www.3gpp.org/ftp/tsg%5Fran/WG1%5FRL1/TSGR1%5F94b/Docs/R1%2D1810539%2Ezip [retrieved on Sep. 29, 2018], p. 7, Section 2.3.4, Section 2.3.1.
Ericsson: "On 2-stage PSCCH-I Design", 3GPP Draft, 3GPP TSG-RAN WG1 Meeting #94bis, R1-1811607 E, 3rd Generation Partnership Project (3GPP), Mobile Competence Centre, 650, Route Des Lucioles, F-06921 Sophia-Antipolis Cedex, France, vol. RAN WG1, No. Chengdu, China, Oct. 8, 2018-Oct. 12, 2018, Sep. 28, 2018, XP051519005, 5 Pages, URL: http://www.3gpp.org/ftp/tsg%5Fran/WG1%5FRL1/TSGR1%5F94b/Docs/R1%2D1811607%2Ezip, p. 3, Observation 5, p. 4, list item 'a', p. 4, list item 'b', p. 3, Observation 1.
Ericsson: "On Mode 2 Resource Allocation for NR Sidelink", 3GPP Draft, 3GPP TSG-RAN WG1 Meeting #94-Bis, R1-1811594 Ericsson—Resource Allocation, 3rd Generation Partnership Project (3GPP), Mobile Competence Centre , 650, Route Des Lucioles, F-06921 Sophia-Antipolis Cedex, France, vol. RAN WG1, No. Chengdu, China, Oct. 8, 2018-Oct. 12, 2018, Sep. 28, 2018 (Sep. 28, 2018), XP051518992, 10 Pages, URL: http://www.3gpp.org/ftp/tsg%5Fran/WG1%5FRL1/TSGR1%5F94b/Docs/R1%2D1811594%2Ezip, [retrieved on Sep. 28, 2018], p. 6.
Ericsson: "Physical Layer Structures of NR V2X", 3GPP Draft, 3GPP TSG-RAN WG1 Meeting #94bis, R1-1811592 Ericsson—Physical Layer Structures of NR V2X, 3rd Generation Partnership Project (3GPP), Mobile Competence Centre, 650, Route Des Lucioles, F-06921 Sophia-Antipolis Cedex, France, vol. RAN WG1, No. Chengdu, China, Oct. 8, 2018-Oct. 12, 2018, Sep. 28, 2018 (Sep. 28, 2018), XP051518990, 16 Pages, URL: http://www.3gpp.org/ftp/tsg%5Fran/WG1%5FRL1/TSGR1%5F94b/Docs/R1%2D1811592%2Ezip, [retrieved on Sep. 28, 2018], p. 8, last line, p. 9, par. 1.
Ericsson: "Support of Unicast, Groupcast and Broadcast on the NR Sidelink", 3GPP Draft, 3GPP TSG-RAN WG1 Meeting #94-Bis, R1-1811591 Ericsson—Support of UC, GC, BC, 3rd Generation Partnership Project (3GPP), Mobile Competence Centre, 650, Route Des Lucioles, F-06921 Sophia-Antipolis Cedex, France, vol. RAN WG1, No. Chengdu, China, Oct. 1, 2018, Sep. 28, 2018 (Sep. 28, 2018), XP051518989, 10 Pages, URL: http://www.3gpp.org/ftp/tsg%5Fran/WG1%5FRL1/TSGR1%5F94b/Docs/R1%2D1811591%2Ezip, p. 2, Section 2.1, p. 1, list item 2.
International Search Report and Written Opinion—PCT/US2019/059455—ISAEPO—dated Jun. 9, 2020.
Mediatek Inc: "Physical Layer Structure for NR Sidelink", 3GPP Draft, 3GPP TSG RAN WG1 Meeting #94bis, R1-1810453_Physical Layer Structure for NR Sidelink, 3rd Generation Partnership Project (3GPP), Mobile Competence Centre, 650, Route Des Lucioles, F-06921 Sophia-Antipolis Cedex, France, vol. RAN WG1, No. Chengdu, China, Oct. 8, 2018-Oct. 12, 2018, Sep. 29, 2018, XP051517862, 9 Pages, URL: http://www.3gpp.org/ftp/tsg%5Fran/WG1%5FRL1/TSGR1%5F94b/Docs/R1%2D1810453%2Ezip, p. 6, par. below Proposal 6.
Xiaomi Communications: "On Support of HARQ for V2x Communications", 3GPP Draft, 3GPP RAN WG1 Meeting #94bis, R1-1811420, 3rd Generation Partnership Project (3GPP), Mobile Competence Centre, 650, Route Des Lucioles, F-06921 Sophia-Antipolis Cedex, France, vol. RAN WG1, No. Chengdu, China, Oct. 8, 2018-Oct. 12, 2018, Sep. 28, 2018 (Sep. 28, 2018), XP051518824, 2 Pages, URL: http://www.3gpp.org/ftp/tsg%5Fran/WG1%5FRL1/TSGR1%5F94b/Docs/R1%2D1811420%2Ezip, p. 1, Section 2.1, p. 1, list item 1.
Ericsson: "Details on Physical Layer Structure for SL V2X", 3GPP Draft, 3GPP TSG-RAN WG1 Meeting# ah-1901, R1-1901211, 3rd Generation Partnership Project (3GPP), Mobile Competence Centre, 650, Route Des Lucioles, F-06921 Sophia-Antipolis Cedex, France, vol. RAN WG1, No. Jan. 21, 2019-Jan. 25, 2019, Taipei, Taiwan, Jan. 11, 2019, XP051576740, 13 pages, Retrieved from the Internet: URL: http://www.3gpp.org/ftp/tsg%5Fran/WG1%5FRL1/TSGR1%5FAH/NR%5FAH%5F1901/Docs/R1%2D1901211%2Ezip. [retrieved on Jan. 11, 2019] chapters 1, 5.
Ericsson: "On 2-Stage PSCCH Design", 3GPP Draft, 3GPP TSG-RAN WG1 Meeting #95, R1-1813648, 3rd Generation Partnership Project (3GPP), Mobile Competence Centre, 650, Route Des Lucioles, F-06921 Sophia-Antipolis Cedex, France, vol. RAN WG1, No. Nov. 12, 2018-Nov. 16, 2018, Spokane, WA, US, Nov. 2, 2018 , XP051479989, 4 pages, Retrieved from the Internet: URL: http://www.3gpp.org/ftp/tsg%5Fran/WG1%5FRL1/TSGR1%5F95/Docs/R1%2D1813648%2Ezip. [retrieved on Nov. 2, 2018] chapter 2, figure 1.
Huawei: "Email Discussion [86b-23] On Multi-Steps DL Control Channel Design", 3GPP Draft, 3GPP TSG RAN WG1 Meeting #87, R1-1611656 V3, 3rd Generation Partnership Project (3GPP), Mobile Competence Centre, 650, Route Des Lucioles, F-06921 Sophia-Antipolis Cedex, France, vol. RAN WG1, No. Nov. 14, 2016-Nov. 18, 2016, Reno, NV, US, Nov. 14, 2016, XP051190942,14 pages,

(56) References Cited

OTHER PUBLICATIONS

Retrieved from the Internet: URL: http://www.3gpp.org/ftp/tsg_ran/WG1_RL1/TSGR1_87/Docs/. [retrieved on Nov. 14, 2016] chapters 2.3, 2.5, Appendix.

Interdigital Inc: "Discussion on Physical Layer Structure for NR V2X Sidelink", 3GPP Draft, 3GPP TSG RAN WG1 #96, R1-1902595, Final, 3rd Generation Partnership Project (3GPP), Mobile Competence Centre, 650, Route Des Lucioles, F-06921 Sophia-Antipolis Cedex, France, vol. RAN WG1, No. Feb. 25, 2019-Mar. 1, 2019, Athens, Greece, Feb. 16, 2019, XP051600288, 9 pages, Retrieved from the Internet: URL: http://www.3gpp.org/ftp/tsg%5Fran/WG1%5FRL1/TSGR1%5F96/Docs/R1%2D1902595%2Ezip. [retrieved on Feb. 16, 2019] chapter 2.5.

Kim H., et al., "Multiple Access for 5G New Radio: Categorization, Evaluation, and Challenges", System Level Simulation for 5G Networks, arXiv:1703.09042v1 [cs.IT], Mar. 27, 2017, pp. 1-9.

Qualcomm Incorporated: "Considerations on Physical Layer Aspects of NR V2X", 3GPP TSG RAN WG1 Meeting #98, 3GPP Draft, R1-1909252 Considerations on Physical Layer Aspects of NR V2X, 3rd Generation Partnership Project (3GPP), Mobile Competence Centre, 650, Route Des Lucioles, F-06921 Sophia-Antipolis Cedex, France, vol. RAN WG1, No. Prague, CZ, Aug. 26, 2019-Aug. 30, 2019, Aug. 16, 2019 (Aug. 16, 2019), 18 Pages, XP051765857, Retrieved from the Internet: URL: https://www.3gpp.org/ftp/tsg_ran/WG1_RL1/TSGR1_98/Docs/R1-1909252.zip [retrieved on Aug. 16, 2019], Section 3, Physical Layer Procedures.

Qualcomm Incorporated: "Considerations on Physical Layer Aspects of NR V2X", R1-1907269, 3GPP TSG RAN WG1 Meeting #97, Reno, USA, May 13-17, 2019, 15 pages.

Qualcomm Incorporated: "Sidelink Resource Allocation Mechanism for NR V2X", R1-1811263, 3GPP TSG RAN WG1 Meeting #94bis, Chengdu, China, Oct. 8-12, 2018, 9 pages.

Qualcomm Incorporated: "Procedures and Use Cases for Groupcast and Unicast Transmissions", R1-1811260, 3GPP TSG RAN WG1 Meeting #94bis, Chengdu, China, Oct. 8-12, 2018, 4 pages.

Vodafone: "New SID: Study on NR V2X", RP-181429, 3GPP TSG RAN Meeting #80, La Jolla, USA, Jun. 11-14, 2018, 5 pages.

\* cited by examiner

METHODS FOR TRANSMISSION TO ACHIEVE ROBUST CONTROL AND FEEDBACK PERFORMANCE IN A NETWORK

CROSS-REFERENCE TO RELATED APPLICATIONS

This application claims priority to and the benefit of U.S. Provisional Application Ser. No. 62/754,396, entitled "METHODS FOR TRANSMISSION TO ACHIEVE ROBUST CONTROL AND FEEDBACK PERFORMANCE IN A VEHICLE-TO-EVERYTHING (V2X) NETWORK" filed on Nov. 1, 2018 and U.S. Provisional Application Ser. No. 62/754,491, entitled "CONTROL MESSAGE TO ENHANCE RESOURCE SELECTION" filed on Nov. 1, 2018, the entire contents of which is incorporated herein by reference as if fully set forth below in its entirety and for all applicable purposes.

INTRODUCTION

The technology discussed below relates generally to wireless communication systems, and more particularly, to vehicle-to-everything (V2X) communication, vehicle-to-vehicle (V2V), or other device-to-device (D2D) communication.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard.

Cellular vehicle-to-everything (V2X) is a vehicular communication system enabling communications between a vehicle and any entity that may affect the vehicle. V2X may incorporate other more specific types of communication, e.g., vehicle-to-infrastructure (V2I), vehicle-to-vehicle (V2V), vehicle-to-pedestrian (V2P), vehicle-to-device (V2D), and vehicle-to-grid (V2G).

In 3GPP Release 14, LTE-based communication has been defined for a direct interface (e.g., PC5 interface) as well as for a network interface (e.g., Uu interface). Currently, V2V communication via the PC5 interface is broadcast. However, for later 3GPP releases (e.g. Release 16 and beyond), there is a need to establish unicast links between vehicles for advanced use cases. A use case for 1-to-1 or 1-to-many V2V link scenarios may involve the on-demand sharing of sensor data that cannot be supported over broadcast. Another use case may involve a see-through camera feed, such as when a first vehicle wishes to see in front of a second vehicle ahead of the first vehicle using the second vehicle's camera.

As the demand for mobile broadband access continues to increase, research and development continue to advance wireless communication technologies not only to meet the growing demand for mobile broadband access, but to advance and enhance the user experience with mobile communications.

BRIEF SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Aspects of the present disclosure relate to a transmission/reception scheme for transmitting/receiving control information to increase robustness of control/data transmissions and corresponding feedback transmissions.

In one example, a method of wireless communication at a first UE is disclosed. The method includes transmitting a first portion of a control message to a second UE, the first portion comprising information for decoding a second portion of the control message and for decoding user data, transmitting the second portion of the control message to the second UE, the second portion comprising additional information for decoding the user data, and transmitting the user data to the second UE.

In another example, a first UE for wireless communication is disclosed. The first UE includes at least one processor and a memory coupled to the at least one processor. The at least one processor and the memory are configured to transmit a first portion of a control message to a second UE, the first portion comprising information for decoding a second portion of the control message and for decoding user data, transmit the second portion of the control message to the second UE, the second portion comprising additional information for decoding the user data, and transmit the user data to the second UE.

In a further example, a first UE for wireless communication is disclosed. The first UE includes means for transmitting a first portion of a control message to a second UE, the first portion comprising information for decoding a second portion of the control message and for decoding user data, means for transmitting the second portion of the control message to the second UE, the second portion comprising additional information for decoding the user data, and means for transmitting the user data to the second UE.

In yet another example, a non-transitory computer-readable medium storing computer-executable code at a first UE is disclosed. The non-transitory computer-readable medium includes code for causing a computer to transmit a first portion of a control message to a second UE, the first portion comprising information for decoding a second portion of the control message and for decoding user data, transmit the second portion of the control message to the second UE, the second portion comprising additional information for decoding the user data, and transmit the user data to the second UE.

In one example, a method of wireless communication at a UE is disclosed. The method includes transmitting a first portion of a control message, the first portion comprising a resource allocation for a second portion of the control message and information for decoding the second portion of the control message and for decoding user data, transmitting the second portion of the control message, the second portion comprising additional information for decoding the user data, and transmitting the user data.

In another example, UE for wireless communication is disclosed. The UE includes at least one processor and a memory coupled to the at least one processor. The at least one processor and the memory are configured to transmit a first portion of a control message, the first portion comprising a resource allocation for a second portion of the control message and information for decoding the second portion of the control message and for decoding user data, transmit the second portion of the control message, the second portion comprising additional information for decoding the user data, and transmit the user data.

In a further example, a UE for wireless communication is disclosed. The UE includes means for transmitting a first portion of a control message, the first portion comprising a resource allocation for a second portion of the control message and information for decoding the second portion of the control message and for decoding user data, means for transmitting the second portion of the control message, the second portion comprising additional information for decoding the user data, and means for transmitting the user data.

In yet another example, a non-transitory computer-readable medium storing computer-executable code at a UE is disclosed. The non-transitory computer-readable medium includes code for causing a computer to transmit a first portion of a control message, the first portion comprising a resource allocation for a second portion of the control message and information for decoding the second portion of the control message and for decoding user data, transmit the second portion of the control message, the second portion comprising additional information for decoding the user data, and transmit the user data.

In one example, a method of wireless communication at a first UE is disclosed. The method includes receiving a first portion of a control message from a second UE, the first portion including information for decoding a second portion of the control message and for decoding user data, the second portion including additional information for decoding the user data, receiving the second portion of the control message from the second UE, decoding the received second portion of the control message based on the information included in the first portion of the control message, receiving the user data from the second UE if the received second portion of the control message is able to be decoded, and decoding the received user data based on the information included in the first portion of the control message and the additional information included in the second portion of the control message.

In another example, a first UE for wireless communication is disclosed. The first UE includes at least one processor and a memory coupled to the at least one processor. The at least one processor and the memory are configured to receive a first portion of a control message from a second UE, the first portion including information for decoding a second portion of the control message and for decoding user data, the second portion including additional information for decoding the user data, receive the second portion of the control message from the second UE, decode the received second portion of the control message based on the information included in the first portion of the control message, receive the user data from the second UE if the received second portion of the control message is able to be decoded, and decode the received user data based on the information included in the first portion of the control message and the additional information included in the second portion of the control message.

In a further example, a first UE for wireless communication is disclosed. The first UE includes means for receiving a first portion of a control message from a second UE, the first portion including information for decoding a second portion of the control message and for decoding user data, the second portion including additional information for decoding the user data, means for receiving the second portion of the control message from the second UE, means for decoding the received second portion of the control message based on the information included in the first portion of the control message, means for receiving the user data from the second UE if the received second portion of the control message is able to be decoded, and means for decoding the received user data based on the information included in the first portion of the control message and the additional information included in the second portion of the control message.

In yet another example, a non-transitory computer-readable medium storing computer-executable code at a first UE is disclosed. The non-transitory computer-readable medium includes code for causing a computer to receive a first portion of a control message from a second UE, the first portion including information for decoding a second portion of the control message and for decoding user data, the second portion including additional information for decoding the user data, receive the second portion of the control message from the second UE, decode the received second portion of the control message based on the information included in the first portion of the control message, receive the user data from the second UE if the received second portion of the control message is able to be decoded, and decode the received user data based on the information included in the first portion of the control message and the additional information included in the second portion of the control message.

In one example, a method of wireless communication at UE is disclosed. The method includes receiving a first portion of a control message, the first portion including a resource allocation for a second portion of the control message and information for decoding the second portion of the control message and for decoding user data, the second portion including additional information for decoding the user data, receiving the second portion of the control message based on the resource allocation included in the first portion of the control message, decoding the received second portion of the control message based on the information included in the first portion of the control message, receiving the user data if the received second portion of the control message is able to be decoded, and decoding the received user data based on the information included in the first portion of the control message and the additional information included in the second portion of the control message.

In another example, a UE for wireless communication is disclosed. The UE includes at least one processor and a memory coupled to the at least one processor. The at least one processor and the memory are configured to receive a first portion of a control message, the first portion including a resource allocation for a second portion of the control message and information for decoding the second portion of the control message and for decoding user data, the second portion including additional information for decoding the user data, receive the second portion of the control message based on the resource allocation included in the first portion of the control message, decode the received second portion of the control message based on the information included in the first portion of the control message, receive the user data if the received second portion of the control message is able to be decoded, and decode the received user data based on the information included in the first portion of the control message and the additional information included in the second portion of the control message.

In a further example, a UE for wireless communication is disclosed. The UE includes means for receiving a first portion of a control message, the first portion including a resource allocation for a second portion of the control message and information for decoding the second portion of the control message and for decoding user data, the second portion including additional information for decoding the user data, means for receiving the second portion of the control message based on the resource allocation included in the first portion of the control message, means for decoding the received second portion of the control message based on the information included in the first portion of the control message, means for receiving the user data if the received second portion of the control message is able to be decoded, and means for decoding the received user data based on the information included in the first portion of the control message and the additional information included in the second portion of the control message.

In yet another example, a non-transitory computer-readable medium storing computer-executable code at a UE is disclosed. The non-transitory computer-readable medium includes code for causing a computer to receive a first portion of a control message, the first portion including a resource allocation for a second portion of the control message and information for decoding the second portion of the control message and for decoding user data, the second portion including additional information for decoding the user data, receive the second portion of the control message based on the resource allocation included in the first portion of the control message, decode the received second portion of the control message based on the information included in the first portion of the control message, receive the user data if the received second portion of the control message is able to be decoded, and decode the received user data based on the information included in the first portion of the control message and the additional information included in the second portion of the control message.

These and other aspects will become more fully understood upon a review of the detailed description, which follows. Other aspects and features will become apparent to those of ordinary skill in the art, upon reviewing the following description in conjunction with the accompanying figures. While features of the present disclosure may be discussed relative to certain aspects and figures below, all aspects of the present disclosure can include one or more of the advantageous features discussed herein. In other words, while one or more aspects may be discussed as having certain advantageous features, one or more of such features may also be used in accordance with the various aspects of the disclosure discussed herein. In similar fashion, while exemplary aspects may be discussed below as device, system, or method aspects it should be understood that such exemplary aspects can be implemented in various devices, systems, and methods.

DETAILED DESCRIPTION

Figure 1:
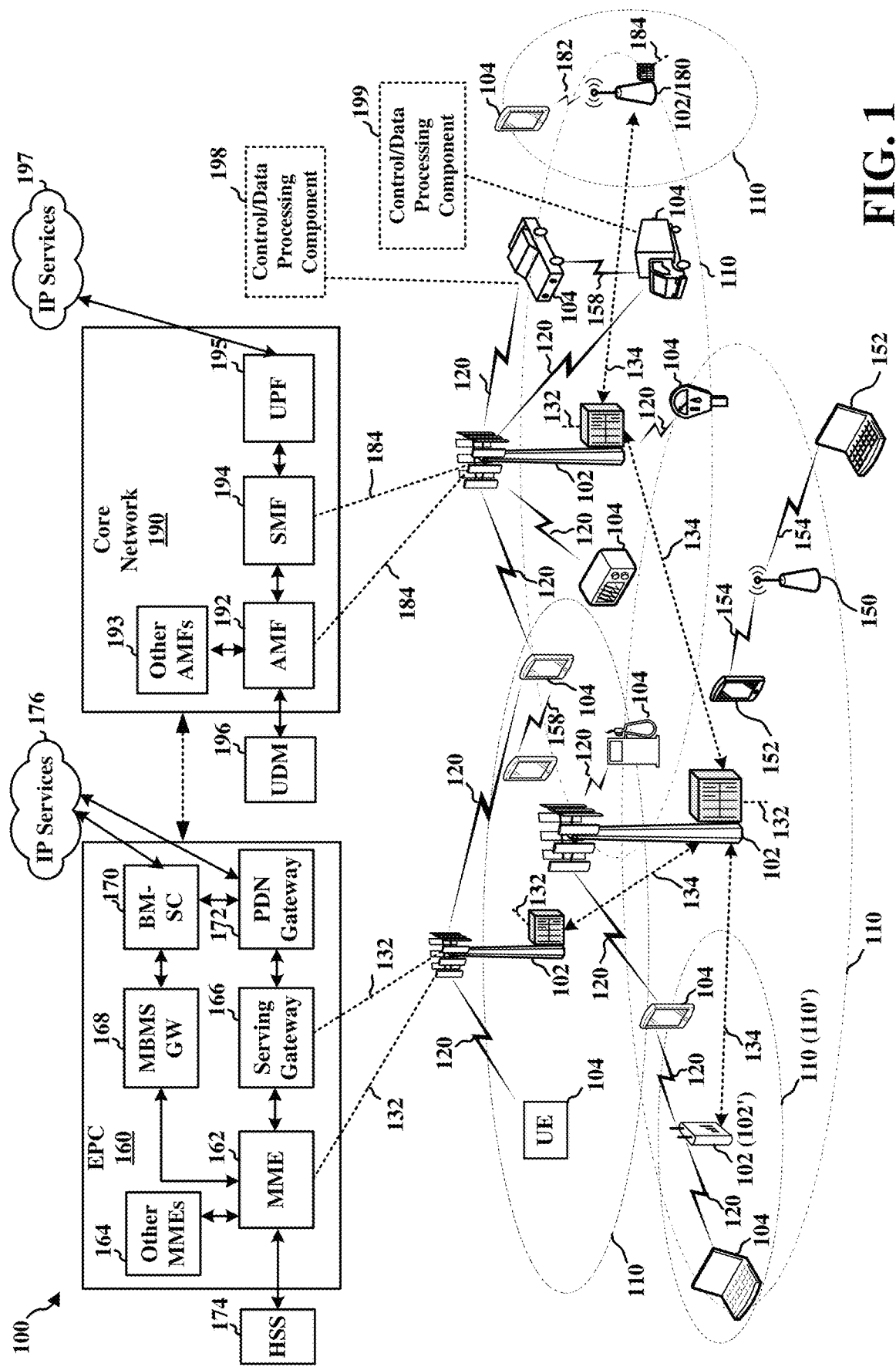
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

While aspects are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip aspects and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Wireless communication may involve a control channel and a data channel. The control channel may include information that a receiving device needs to know in order to decode the data channel. The control channel may also include additional information that assist with network operation, e.g., measurement information, interference management information, etc. When control information is lost or unable to be decoded by receiving devices, e.g., due to interference, the information is lost and network performance suffers. There is a need to protect control information to help ensure that a control channel is received with a high probability in order to maintain good network performance. The receipt of control information can be important, even for receiving devices that do not need to decode associated data.

Figure 2:
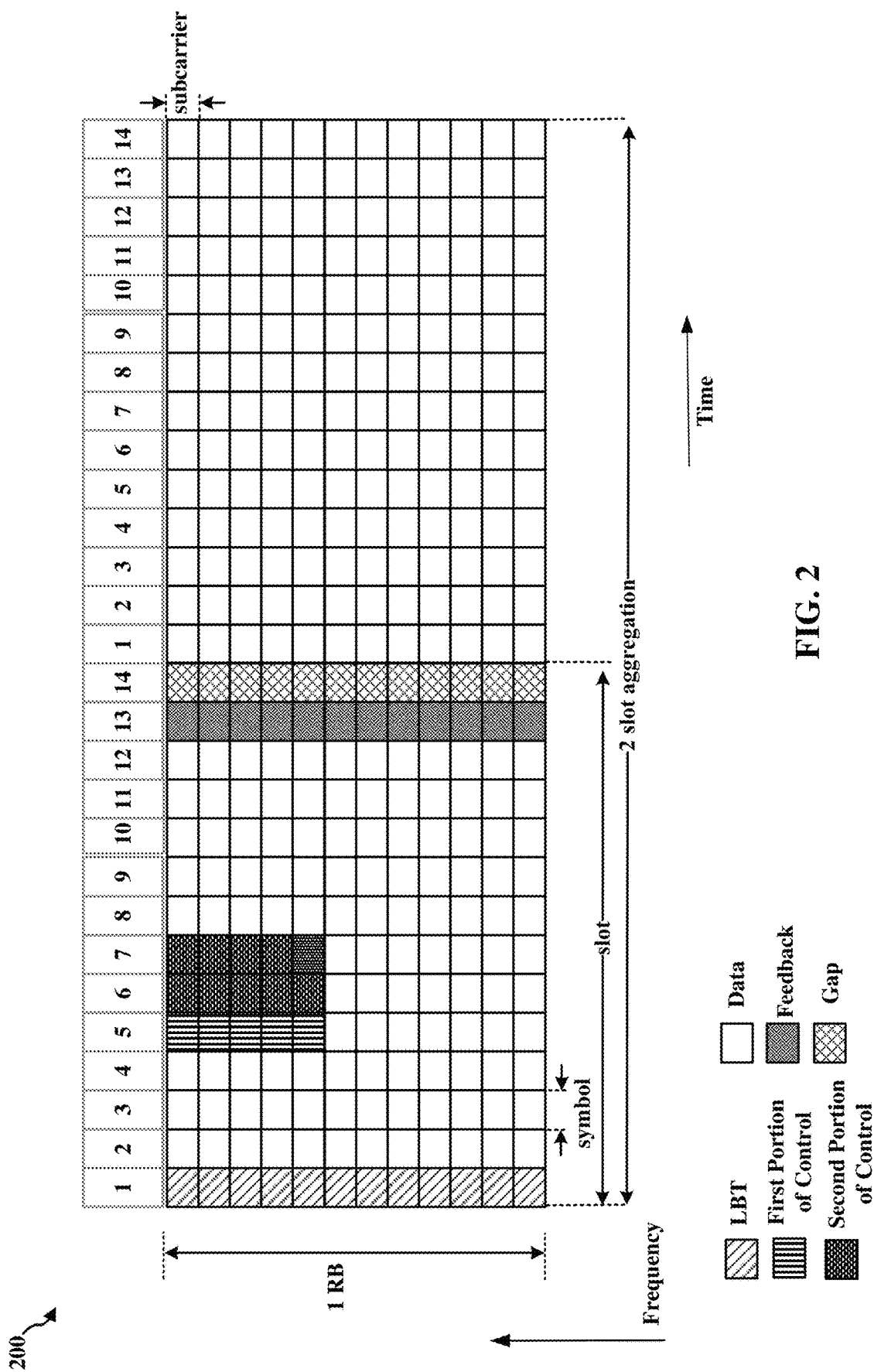
FIG. 2 illustrates an example of a frame structure for wireless communication.

In NR V2X, for example, transmissions may occupy certain resource blocks (RBs) for a number of Transmission Time Intervals (TTIs). The number of TTIs may vary based on the size of the data to be transmitted. For example, FIG. 2 illustrates a single slot, which may comprise a single TTI. FIG. 2 also illustrates a two-slot aggregation, which may comprise an aggregation of two TTIs. In other examples, larger amounts of data may be sent in three or more TTIs. The number of TTIs, as well as the RBs that will be occupied by the data transmission, may be indicated in a control message from the transmitting device. In order to avoid interference, a device that decodes the control message may wait until the indicated data packet ends before starting an attempt to use the indicated RBs to transmit. However, if there is a collision with the control transmission of a first device and a second device is not able to decode the control transmission, the second device may proceed to begin a transmission using resources overlapping with a data transmission indicated in the control transmission from the first device. Not only will the network performance deteriorate due to the overlapping transmissions, but the control transmission from the second device may also experience interference due to the overlap. The interference may cause other devices to perform transmissions that overlap the second device's data transmission. Thus, the problem can escalate causing the network performances to further deteriorate.

Aspects of the present disclosure provide a solution to the problem of potential interference due to colliding control transmissions that lead a device to start transmitting during an ongoing data transmission. As described herein, a control message may be separated into two portions. A first portion of the control message may comprise information for interference avoidance, while the second portion may comprise additional information for decoding a data transmission, as well as other control information. Transmitting the portion of the control message that is needed for interference avoidance separately from the other control information may help to ensure that the interference avoidance information is received with a higher likelihood. The two portions of the control message may be separately encoded and may use different coding rates, e.g., with the first portion of the control message having a lower coding rate than the second portion. A receiving device may decode the first portion of the control message and may determine whether to defer use of resources that will be occupied by a data transmission indicated in the first portion of the control message.

Aspects of the present disclosure further relate to a transmission/reception scheme for transmitting/receiving control information to increase robustness of control/data transmissions and corresponding feedback transmissions. For example, a transmitting device may determine time-frequency resources to transmit control information and data associated with the control information to a receiving device. Thereafter, the transmitting device may transmit a first subset of the control information via a first subset of the time-frequency resources, transmit a second subset of the control information via a second subset of the time-frequency resources, and transmit the data via a third subset of the time-frequency resources. The transmitting device may further receive a negative acknowledgement (NACK) from the receiving device if the receiving device fails to successfully decode the second subset of the control information or the data. The receiving device may receive the first subset of the control information via the first subset of time-frequency resources based on a multiple access (MA) signature used to transmit the first subset of the control information, receive the second subset of the control information via the second subset of the time-frequency resources based on the first subset of the control information, determine if the receiving device is an intended receiver based on one or more of the first subset of the control information, the MA signature used to transmit the first subset of the control information, or the second subset of the control information, and determine to receive the data via the third subset of the time-frequency resources based on the second subset of the control information if the second subset of the control information is successfully received. The receiving device may transmit the NACK to the transmitting device if the receiving device successfully decodes the second subset of the control information but fails to decode the data. The receiving device may also transmit the NACK to the transmitting device if the receiving device is the intended receiver and fails to successfully decode the second subset of the control information.

In another example, a transmitting device transmits a first portion of the control message to a receiving device, wherein the first portion includes information for decoding a second portion of the control message and for decoding data. The transmitting device then transmits the second portion to the receiving device, the second portion including additional information for decoding the data. Thereafter, the transmitting device transmits the data to the receiving device. The receiving device receives the first portion and the second portion, and decodes the received second portion based on the information included in the first portion. The receiving device then receives the data from the transmitting device if the received second portion is able to be decoded. The receiving device decodes the received data based on the information included in the first portion and the additional information included in the second portion. The various concepts presented throughout this disclosure may be implemented across a broad variety of telecommunication systems, network architectures, and communication standards.

FIG. 1 is a diagram illustrating an example of a wireless communications system 100 including an access network. The wireless communications system (also referred to as a wireless wide area network (WWAN)) includes base stations 102, UEs 104, an Evolved Packet Core (EPC) 160, and another Core Network, e.g., a 5G Core (5GC), 190. The base stations 102 may include macro cells (high power cellular base station) and/or small cells (low power cellular base station). The macro cells include macro base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with Core Network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate with each other directly over backhaul links 134 (e.g., X2 interface) or indirectly (e.g., through the EPC 160 or Core Network 190). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels. Sidelink channels are channels that allow for one device to directly communicate with another device without utilizing (or going through) a base station. Examples of sidelink channels include a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a macro cell (e.g., macro base station), may include an eNB, next generation NodeB (gNodeB or gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the radio frequency (RF) in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include services provided by the Internet, an intranet, and an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The Core Network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the 5 GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include services provided by the Internet, an intranet, and an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or Core Network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, a transmitting device, e.g., a transmitting Vehicle User Equipment (VUE) or other UE 104 may be configured to transmit messages directly to another UE 104. A Road Side Unit (RSU) may be another transmitting device. The communication may be based on V2V/V2X or other D2D communication, such as Proximity Services (ProSe). A Transmitting device may comprise a control/data processing component 198 configured to transmit to another UE a first portion of a control message having information for decoding a second portion of the control message and for decoding user data, transmit to the other UE the second portion of the control message comprising additional information for decoding the user data, and transmit to the other UE the user data. A receiving device, such another UE 104, RSU, etc., may comprise a control/data processing component 199 configured to receive the first portion of the control message, receive the second portion of the control message, decode the received second portion based on the information included in the first portion, receive the user data if the received second portion is able to be decoded, and decode the received user data based on the information included in the first portion and the additional information included in the second portion.

FIG. 2 is a diagram illustrating an example of a slot structure 200 that may be used within a 5G/NR frame structure, e.g., for sidelink communication. This is merely one example, and other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. As well, depending on a Cyclic Prefix (CP) and Sub-Carrier Spacing (SCS) (e.g., 15 kHz, 30 kHz, 60 kHz etc.), the number of symbols in a slot, a slot duration, etc. may be different.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may comprise control information, e.g., along with demodulation RS (DM-RS). The control information may comprise Sidelink Control Information (SCI). The control information may comprise a first portion of a control message comprising information for interference avoidance for a data transmission and a second portion of the control message comprising additional information for decoding the data transmission. Although FIG. 2 illustrates that the first portion of the control message comprises a single symbol and the second portion of the control message comprises two symbols, the sizes are merely examples. The first portion of the control message may comprise multiple symbols, e.g., having the same number or even more symbols than the second portion of the control message. The particular example in FIG. 2 is merely illustrative of the concept of transmitting two separate portions of a control message. At least one symbol at the beginning of a slot may be used by a transmitting device to perform a Listen Before Talk (LBT) operation prior to transmitting. At least one symbol may be used for feedback, as described herein. Another symbol, e.g., at the end of the slot may be used as a gap. The gap enables a device to switch from operating as a transmitting device to prepare to operate as a receiving device, e.g., in the following slot. Data may be transmitted in the remaining REs, as illustrated. The data may comprise the data message described herein. The position of any of the SCI, feedback, and LBT symbols may be different than the example illustrated in FIG. 2. Multiple slots may be aggregated together. FIG. 2 illustrates an example aggregation of two slots. The aggregated number of slots may also be larger than two. When slots are aggregated, the symbols used for feedback and/or a gap symbol may be different than for a single slot.

Figure 3:
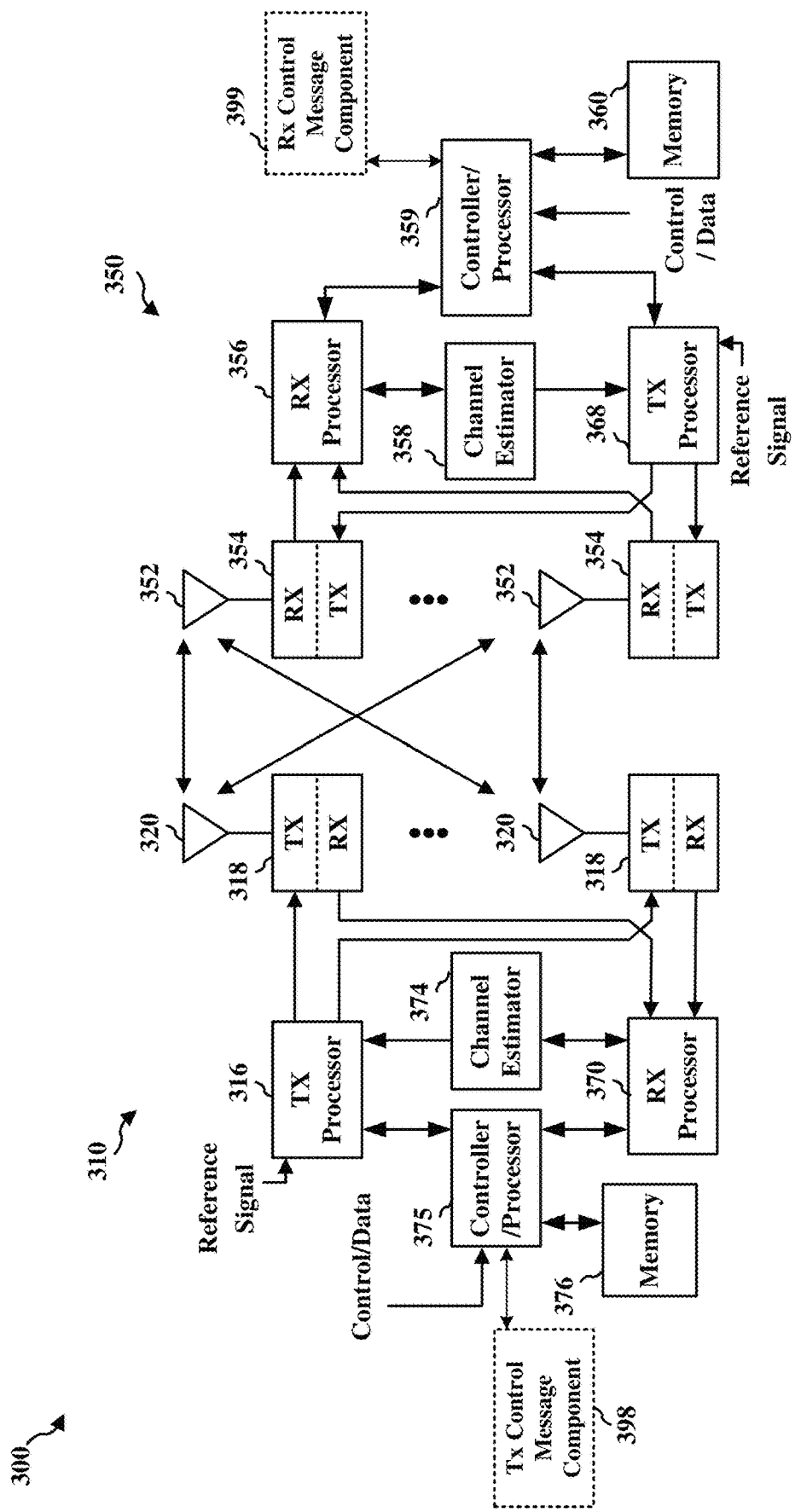
FIG. 3 is a diagram illustrating an example of a base station and user equipment (UE) in an access network.

FIG. 3 is a block diagram 300 of a first wireless communication device 310 in communication with a second wireless communication device 350, e.g., via V2V/V2X/D2D communication. The device 310 may comprise a transmitting device communicating with a receiving device, e.g., device 350, via V2V/V2X/D2D communication. The transmitting device 310 may comprise a UE communicating with another UE, e.g., receiving device 350, via sidelink. In addition to those components illustrated in FIG. 3, the wireless communication devices 310, 350 may each comprise a Tx control message component 398 and/or a Rx control message component 399. The Tx control message component 398 may be configured to transmit to another UE a first portion of a control message having a resource allocation for a second portion of the control message and/or information for decoding the second portion of the control message and for decoding user data. The Tx control message component 398 may also be configured to transmit to another UE the second portion of the control message having additional information for decoding the user data. The Rx control message component 399 may be configured to receive from another UE a first portion of a control message having a resource allocation for a second portion of the control message and/or information for decoding the second portion of the control message and for decoding user data. The Rx control message component 399 may also be configured to receive from another UE the second portion of the control message having additional information for decoding the user data. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

Figure 4:
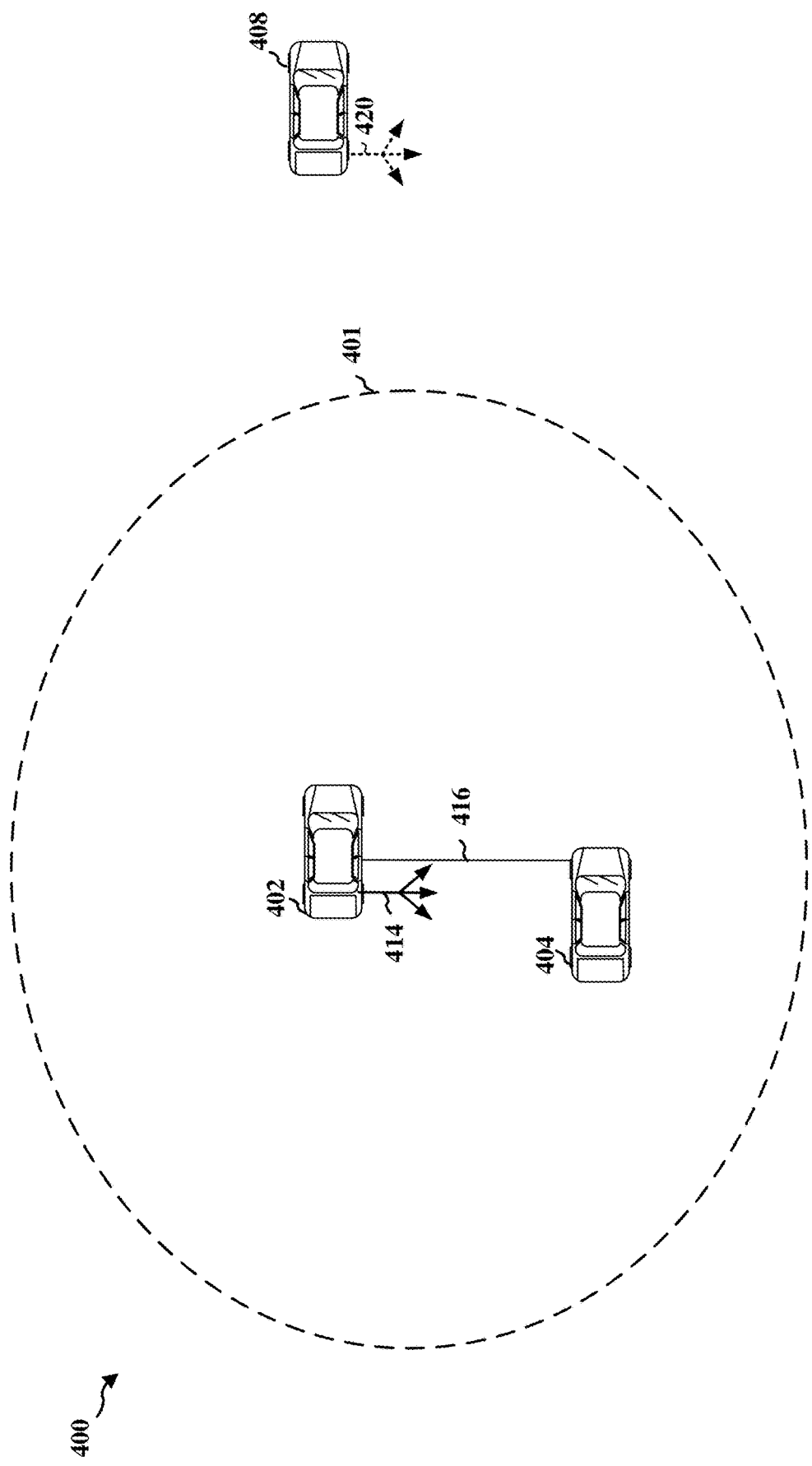
FIG. 4 illustrates an example of communication between UEs according to some aspects of the disclosure.

FIG. 4 illustrates an example 400 of wireless communication between devices based on V2X/V2V/D2D communication. A first device 402 transmits a first transmission 414 comprising a control channel and a corresponding data channel that may be received by a second device 404 and a third device 408. The devices 402, 404, 408 may each be capable of operating as a transmitting device in addition to operating as a receiving device. Thus, the third device 408 is illustrated as transmitting a second transmission 420. The first transmission 414 and the second transmission 420 may be broadcast or multicast to nearby devices.

A control channel may include information for decoding a data channel and may also be used by a receiving device to avoid interference by refraining from transmitting on the occupied resources during a data transmission. The number of TTIs, as well as the RBs that will be occupied by the data transmission, may be indicated in a control message from the transmitting device. In order to avoid interference, a receiving device that decodes the control message may wait until the indicated data packet ends before starting an attempt to use the indicated RBs to transmit. When control information is lost or unable to be decoded by receiving devices, e.g., due to interference, the control information is lost. As such, network performance suffers because the receiving devices will not be aware that they should avoid using certain resources. Thus, the receiving devices may attempt to transmit using overlapping resources, e.g., in time and/or frequency.

Referring to FIG. 4, not only will the network performance deteriorate due to the overlapping transmissions, but a control transmission from the third device 408 may also experience interference due to the overlap. The interference may cause other devices to perform transmissions that overlap a data transmission from the third device 408. Thus, the problem can escalate causing the network performances to further deteriorate.

An aspect of the present disclosure provides a solution to the problem of potential interference due to colliding control transmissions that cause a device to miss a control transmission and to start transmitting during an ongoing data transmission. As described herein, a control message may be separated into two portions. A first portion of the control message may comprise information regarding the particular resources that will be occupied by a data transmission, e.g., information for interference avoidance. A second portion of the control message may comprise other information for decoding the data transmission or other control information.

For example, the first portion of the control message may comprise an indication of a number of TTIs (or slots) spanned by the data transmission, a number of RBs occupied by the data transmission, and/or information related to a location of the transmitting device. The second portion of the control message may comprise an indication of whether a NACK is needed for the data, information about MIMO layers, a device speed, a device position, a transmit power, whether the transmission is a new data transmission or a retransmission, MCS, other control information, etc.

Figure 5:
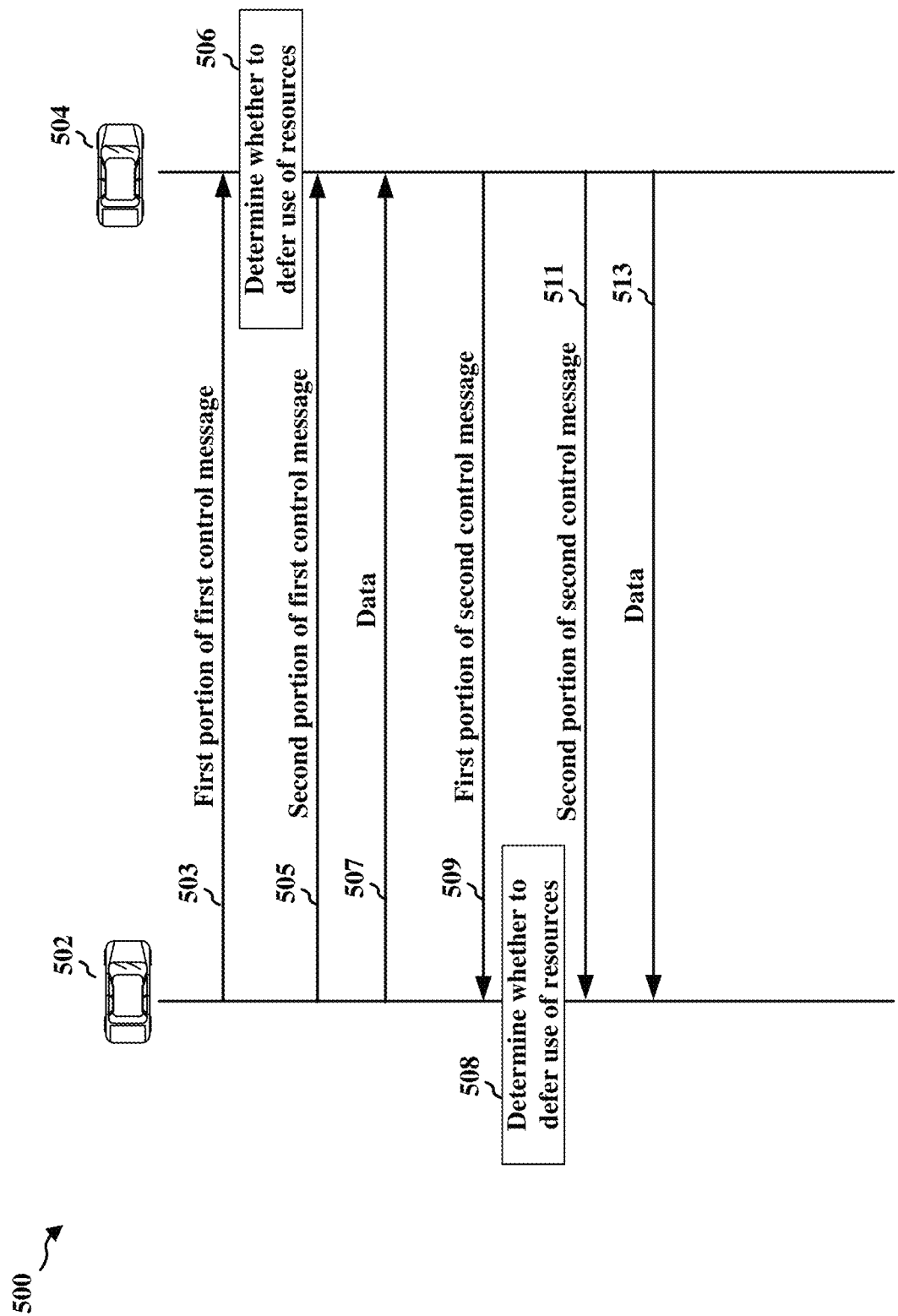
FIG. 5 illustrates an example communication flow between wireless devices according to some aspects of the disclosure.

FIG. 5 illustrates an example communication flow 500 between a first device 502 and a second device 504. The communication may be based on V2X, V2V, or D2D communication directly from a transmitting device to a receiving device. The communication transmitted from device 502, may be broadcast and subsequently received by multiple receiving devices 504 within range of transmitting device 502, as described in connection with FIG. 4. As illustrated, first device 502 may transmit a first portion of a first control message 503 that comprises information for interference avoidance and may transmit a second portion of the control message 505 that comprises additional information for decoding a data transmission 507, as well as other control information. Transmitting the first portion of the first control message 503 that is needed for interference avoidance separately from the other control information may help to ensure that the interference avoidance information is received with a higher likelihood.

The two portions of the first control message 503, 505 may be separately encoded. In one example, the first portion of the first control message 503 may be encoded using polar coding. In another example, the second portion of the first control message 505 may also be encoded using polar coding. However, the first and second portions may use different coding rates, e.g., with the first portion of the first control message 503 having a lower coding rate than the second portion 505. The lower coding rate improves the reliability of the first portion of the first control message 503. Thus, a receiving device will be more likely to receive the first portion of the first control message 503 even if there is interference that causes problems in decoding the second portion of the first control message 505.

By including the information to enable interference avoidance in the first portion (e.g., an indication of a number of TTIs (or slots) spanned by a data transmission, a number of RBs occupied by the data transmission, and/or information related to a location of a transmitting device), the second device 504 may be aware of the resources that will be used by the data transmission 507. Even if the second device 504 does not decode the second portion of the first control message 505 and cannot decode the data transmission 507, the second device 504 can avoid causing interference to the data transmission 507 by avoiding use of the resources used by the data transmission 507. Upon decoding the first portion of the first control message 503, the second device 504 may determine, at 506, whether to defer use of resources that will be occupied by the data transmission 507 indicated in the first portion of the first control message 503.

For example, the second device 504 may determine to wait until the TTIs comprising the data transmission 507 end before attempting to transmit a data transmission 513. Prior to sending the data transmission 513, the second device 504 may transmit a second control message with information about the data transmission 513. The control message may comprise a first portion of a second control message 509 and a second portion of the second control message 511, similar to portions 503, 505. Thus, upon receiving the first portion of the second control message 509, the first device 502 may make a determination 508 regarding whether to defer use of the resources that will be occupied by the data transmission 513.

The first portion of the first control message 503 and the first portion of the second control message 509 may comprise an indication of the resources in time and/or frequency that will be occupied by a corresponding data transmission. For example, the first portion of a control message may indicate a number of TTIs that will be occupied by a data transmission. The number of TTIs may be mapped to a Demodulation Reference Signal (DMRS) sequence that is transmitted along with the control message. The first portion of the first control message 503 and the first portion of the second control message 509 may also indicate the RBs that are occupied by the corresponding data transmission.

The first portion of the first control message 503 and the first portion of the second control message 509 may also comprise information that enables a receiving device to identify a location of the transmitting device and/or to infer a distance between the transmitting device and the receiving device. As one example, the first portion of the first control message 503 may comprise a Layer 2 (L2) Identifier (ID) for the first device 502. The L2 ID may be linked to a basic safety message (BSM) in a manner that enables the second device 504 to obtain location information, e.g., Global Navigation Satellite System (GNSS) coordinates of the first device 502. The second device 504 may be aware of its own location and may determine a distance between the two locations. As another example, the first portion of the first control message 503 may comprise at least a portion of location coordinates for the first device 502, e.g., such as a reduced number of GNSS x, y coordinate bits. A coarseness of the partial GNSS coordinates may be based on a configurable resolution, e.g., within a resolution of 10 m, within a resolution of 50 m, within a resolution of 100 m, and so forth. The second device 504 may also use a signal quality measurement, such as a relative received signal strength indication (RSSI) measurement, to help the second device 504 determine the distance to the first device 502.

In another example, the first portion of the first control message 503 may comprise an indication of a zone, such as a zone ID, for the first device 502. Using predefined zones or areas may reduce the amount of overhead required to encode the geographic area information in the first portion of the first control message 503. For example, a zone ID or an area ID for the first device 502 may be encoded in the first portion of the first control message 503. In one example, the zone/area intended to reliably receive the message may comprise a circular area centered on the location of the transmitting device, e.g., first device 502, and extending to a radius indicated to the receiving devices. In another example, predefined zones may have a non-circular shape, e.g., with a region divided into a set of rectangular, hexagon, or other shaped zones, each having a corresponding zone ID. In yet another example, the predefined zones may have a customized shape. For example, the predefined zones may follow a contour of a road, a driving direction, a shape of a geographic feature, etc. In another example, hierarchical zones may be organized in different layers. Each layer may correspond to zones of a different size. For example, a first layer may correspond to zones having a radius of 50 m, a width of 50 m, etc. A second layer may correspond to zones having a radius of 100 m, a width of 100 m, etc.

In another example, the first portion of the first control message 503 may comprise a combination of any of the L2 ID, a portion of GNSS coordinates, and/or a zone ID for the first device 502. For example, a combination of a truncated L2 ID and truncated x, y coordinates may be used.

The second device 504 may use the information in the first portion of the first control message 503 to infer a distance to the first device 502 and determine whether to defer its own transmission to avoid interference with the data transmission 507 sent from the first device 502. As the first portion of the first control message 503 may be transmitted in a way that enables the second device 504 to receive the first portion 503, whereas the second device 504 is unlikely to receive the second portion 505 and/or the data transmission 507, the second device may determine that it does not need to defer its own transmissions 509, 511, 513. In the example in FIG. 4, the second device 404 may receive a first portion of a control message in the first transmission 414 and may determine that the first device 402 is within a threshold distance 416 of the second device 404. The determination may involve determining whether the devices 402, 404 are within a same zone or area 401. If so, the second device 404 may determine to wait to begin a transmission until after the occupied resources of the data transmission from the first device 402 have passed. In contrast, the third device 408 may receive the first portion of the control message and may determine a distance from the first device 402 to the third device 408. If the distance is large enough, the third device 408 may proceed to transmit without regard to the data transmission from the first device 402.

The first portions of different control messages may be code division multiplexed so that a receiving device can identify different control messages that may be received in an overlapping manner. As a first example, different control messages from different transmitting devices may use different DMRS sequences. The use of a different DMRS sequence may help the receiving device identify the different first portions of control messages. As another example, a Multiple Access (MA) signature may be used, e.g., each first portion of the first control message 503 and the second control message 509 being scrambled with a unique code signature in addition to the different DMRS sequence. The MA signature may comprise a Non-Orthogonal Multiple Access (NOMA) signature. In another example, the first portion of the first control message 503 and the first portion of the second control message 509 may be transmitted without being scrambled using an MA signature and may just rely on the different DMRS sequence. The use of the MA signature may require additional complexity for the first portion of the control message, yet may provide additional decoding quality.

Figure 6:
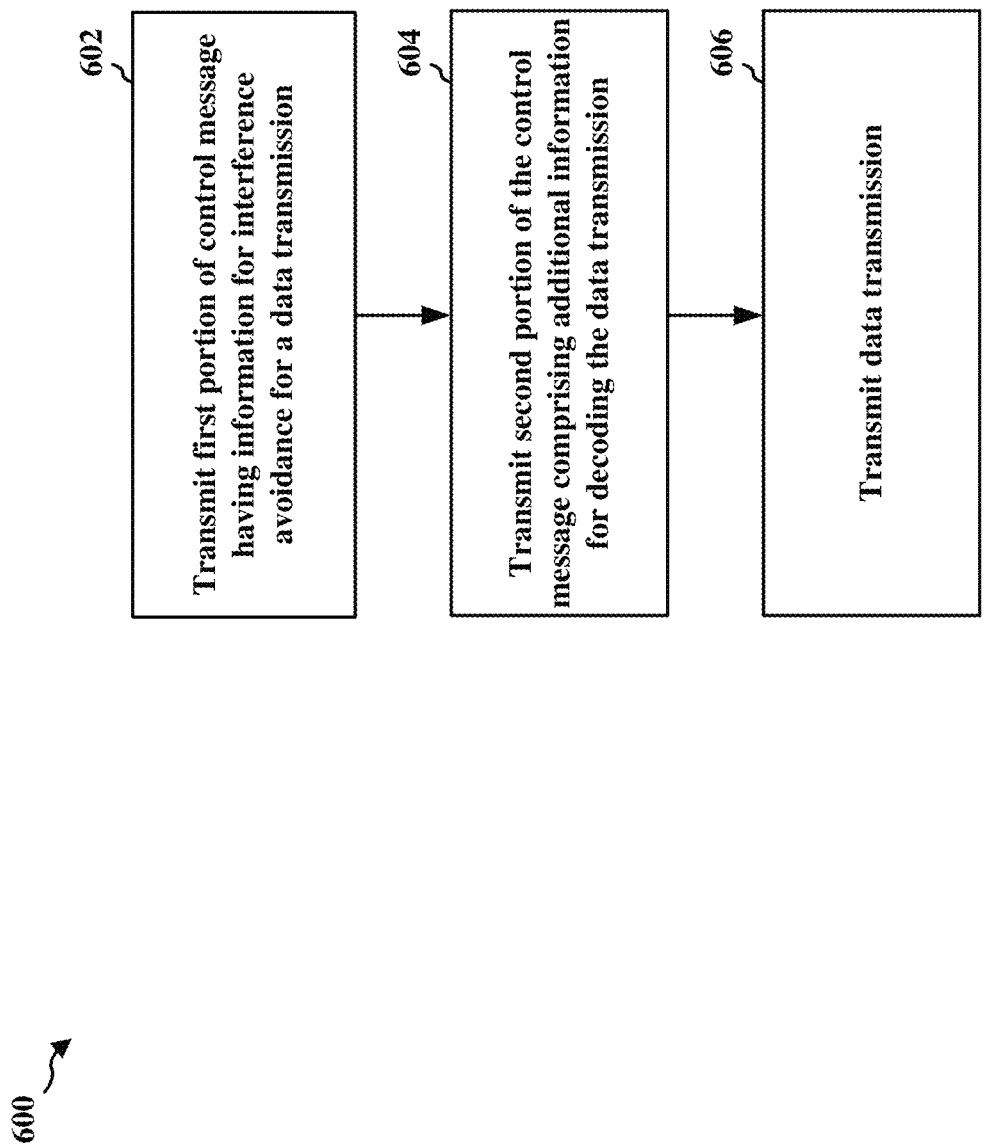
FIG. 6 is a flowchart of a method of wireless communication according to some aspects of the disclosure.

FIG. 6 is a flowchart 600 of a method of wireless communication. The method may be performed by a transmitting device (e.g., UE 104, device 310, 402, 408, 502, 504, apparatus 702/702'), RSU, etc. The transmitting device may transmit control and/or data directly to receiving devices, e.g., to UE(s) or RSU(s) based on V2V or V2X communication, or other direct D2D communication. The method improves network performance by helping to ensure that transmitting devices do not cause interference to each other based on trouble in decoding control transmissions.

At 602, the transmitting device transmits a first portion of a control message having information for interference avoidance for a data transmission. The first portion of the control message may indicate a number of TTIs that will be occupied by the data transmission. The number of TTIs may correspond to a DMRS sequence transmitted with the control message. Thus, a receiving device may be able to infer the number of TTIs based on the DRMS sequence. The first portion of the control message may indicate one or more resource blocks that will be occupied by the data transmission. The first portion of the control message may also comprise information that enables a receiving device to determine a location of the transmitting device, e.g., a Layer 2 ID for the transmitting device, a portion of geographic coordinates for the transmitting device, and/or a zone ID for the transmitting device.

At 604, the transmitting device transmits a second portion of a control message comprising additional information for decoding the data transmission. The second portion of the control message may comprise, e.g., whether a NACK is needed for the data, information about MIMO layers, a speed of the transmitting device, a position of the transmitting device, a transmit power, whether the transmission is a new data transmission or a retransmission, MCS, other control information, etc.

The first portion of the control message may be transmitted using a first coding rate and the second portion of the control message may be transmitted using a second coding rate. For example, the first coding rate may be lower than the second coding rate. The first portion of the control message may be encoded using polar coding, for example. Thus, the first portion of the control message may have a coding rate that helps to ensure that it can be decoded.

The control message transmitted at 602 may comprise aspects of code division multiplexing. For example, different control messages may use different DMRS sequences. The first portion of the control message may be scrambled based on an MA sequence. In another example, the first portion of the control message may be transmitted without scrambling based on an MA sequence.

Finally, at 606, the transmitting device transmits the data transmission. The data transmitted may be transmitted using the resources indicated, e.g., in the first portion of the control message. The data transmission may be further based on information comprised in the second control portion of the message.

Figure 7:
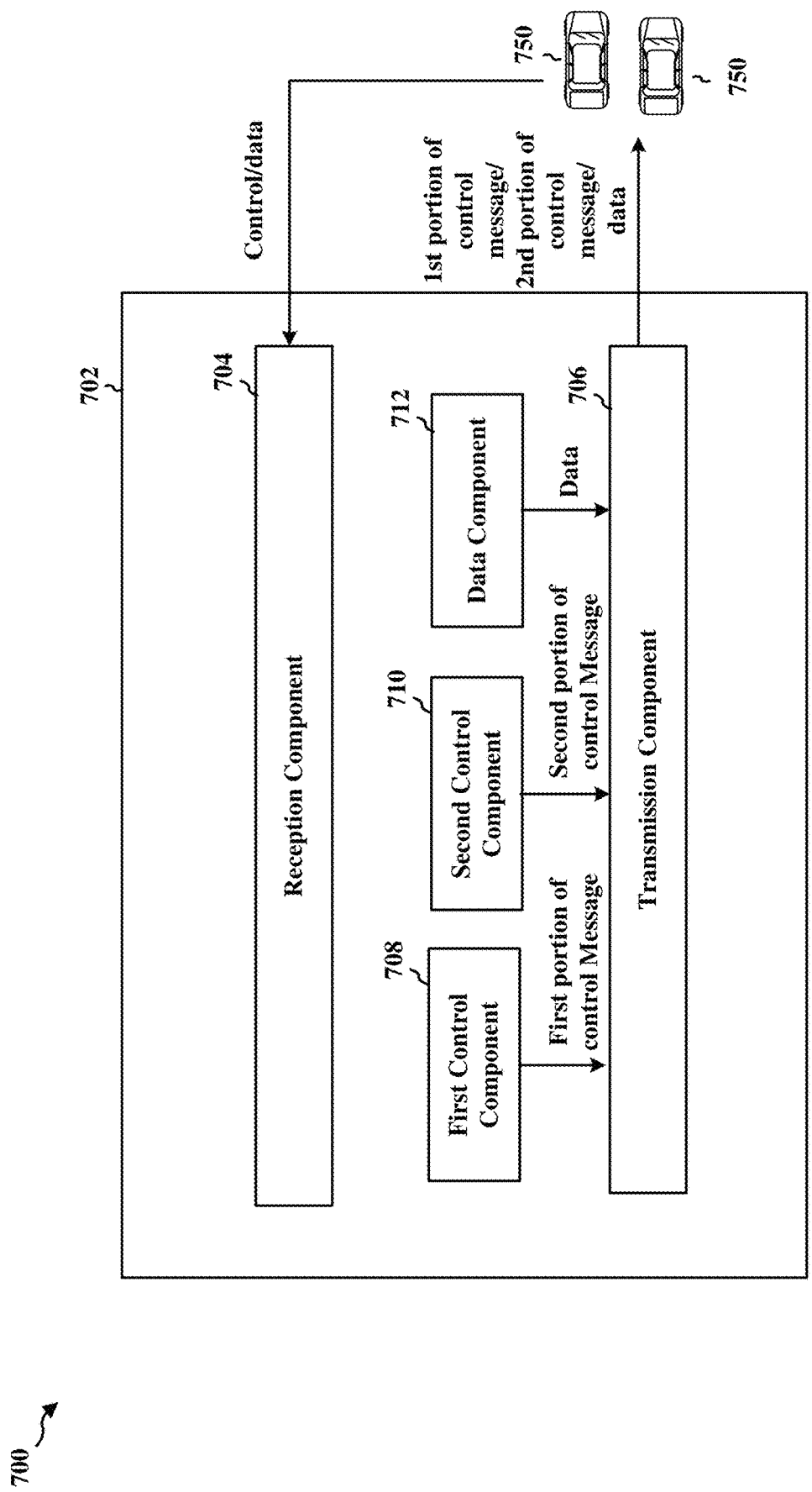
FIG. 7 is a conceptual data flow diagram illustrating the data flow between different means/components in an exemplary apparatus according to some aspects of the disclosure.

FIG. 7 is a conceptual data flow diagram 700 illustrating the data flow between different means/components in an exemplary apparatus 702. The apparatus may be a transmitting device, e.g., UE 104, device 310, 350, 402, 408, 502, 504, etc. The apparatus includes a reception component 704 that receives communication from other transmitting devices and a transmitting component 706 that transmits communication to receiving devices, e.g., UE 104, device 310, 350, 404, 408, 502, 504, etc. The device may further comprise a first control component 708 configured to transmit a first portion of a control message having information for interference avoidance for a data transmission, e.g., as described in connection with 602. The device may further comprise a second control component 710 configured to transmit a second portion of the control message comprising additional information for decoding the data transmission, e.g., as described in connection with 604. The apparatus may comprise a data component 712 configured to transmit the data transmission, e.g., as described in connection with 606.

The apparatus may include additional components that perform each of the blocks of the algorithm in the aforementioned flowcharts of FIGS. 5 and 6. As such, each block in the aforementioned flowcharts of FIGS. 5 and 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 8:
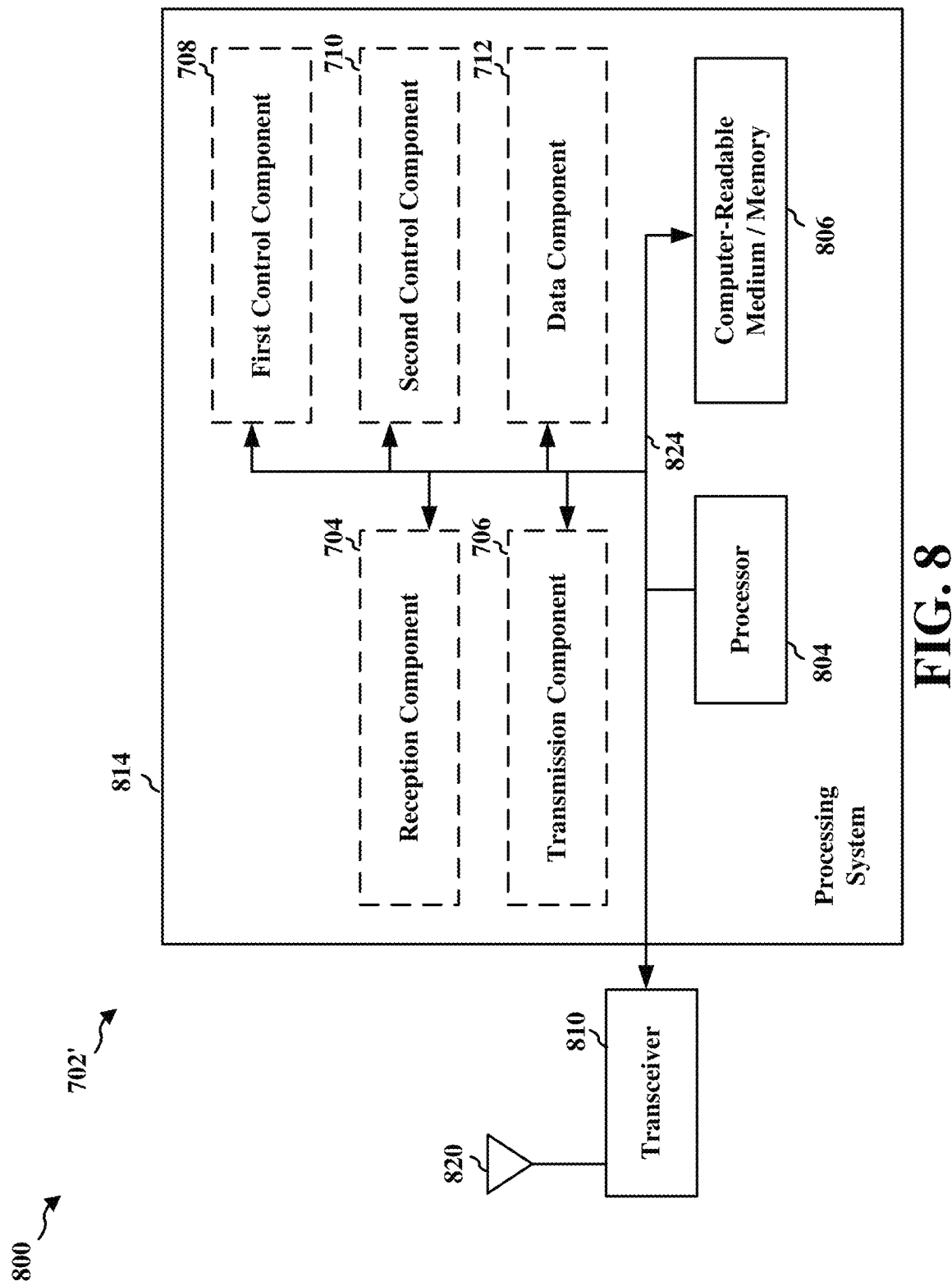
FIG. 8 is a diagram illustrating an example of a hardware implementation for an apparatus employing a processing system according to some aspects of the disclosure.

FIG. 8 is a diagram 800 illustrating an example of a hardware implementation for an apparatus 702' employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware components, represented by the processor 804, the components 704, 706, 708, 710, 712, and the computer-readable medium/memory 806. The bus 824 may also link various other circuits such as timing sources, peripherals, voltage regulators, and power management circuits, which are well known in the art, and therefore, will not be described any further.

The processing system 814 may be coupled to a transceiver 810. The transceiver 810 is coupled to one or more antennas 820. The transceiver 810 provides a means for communicating with various other apparatus over a transmission medium. The transceiver 810 receives a signal from the one or more antennas 820, extracts information from the received signal, and provides the extracted information to the processing system 814, specifically the reception component 704. In addition, the transceiver 810 receives information from the processing system 814, specifically the transmission component 706, and based on the received information, generates a signal to be applied to the one or more antennas 820. The processing system 814 includes a processor 804 coupled to a computer-readable medium/memory 806. The processor 804 is responsible for general processing, including the execution of software stored on the computer-readable medium/memory 806. The software, when executed by the processor 804, causes the processing system 814 to perform the various functions described supra for any particular apparatus. The computer-readable medium/memory 806 may also be used for storing data that is manipulated by the processor 804 when executing software. The processing system 814 further includes at least one of the components 704, 706, 708, 710, 712. The components may be software components running in the processor 804, resident/stored in the computer readable medium/memory 806, one or more hardware components coupled to the processor 804, or some combination thereof. The processing system 814 may be a component of the device 310 and may include the memory 376 and/or at least one of the TX processor 316, the RX processor 370, and the controller/processor 375.

In one configuration, the apparatus 702/702' for wireless communication includes means for transmitting a first portion of a control message having information for interference avoidance for a data transmission (e.g., at least first control component 708), means for transmitting a second portion of the control message comprising additional information for decoding the data transmission (e.g., at least second control component 710), and means for transmitting the data transmission (e.g., at least data component 712). The aforementioned means may be one or more of the aforementioned components of the apparatus 702 and/or the processing system 814 of the apparatus 702' configured to perform the functions recited by the aforementioned means. As described supra, the processing system 814 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 9:
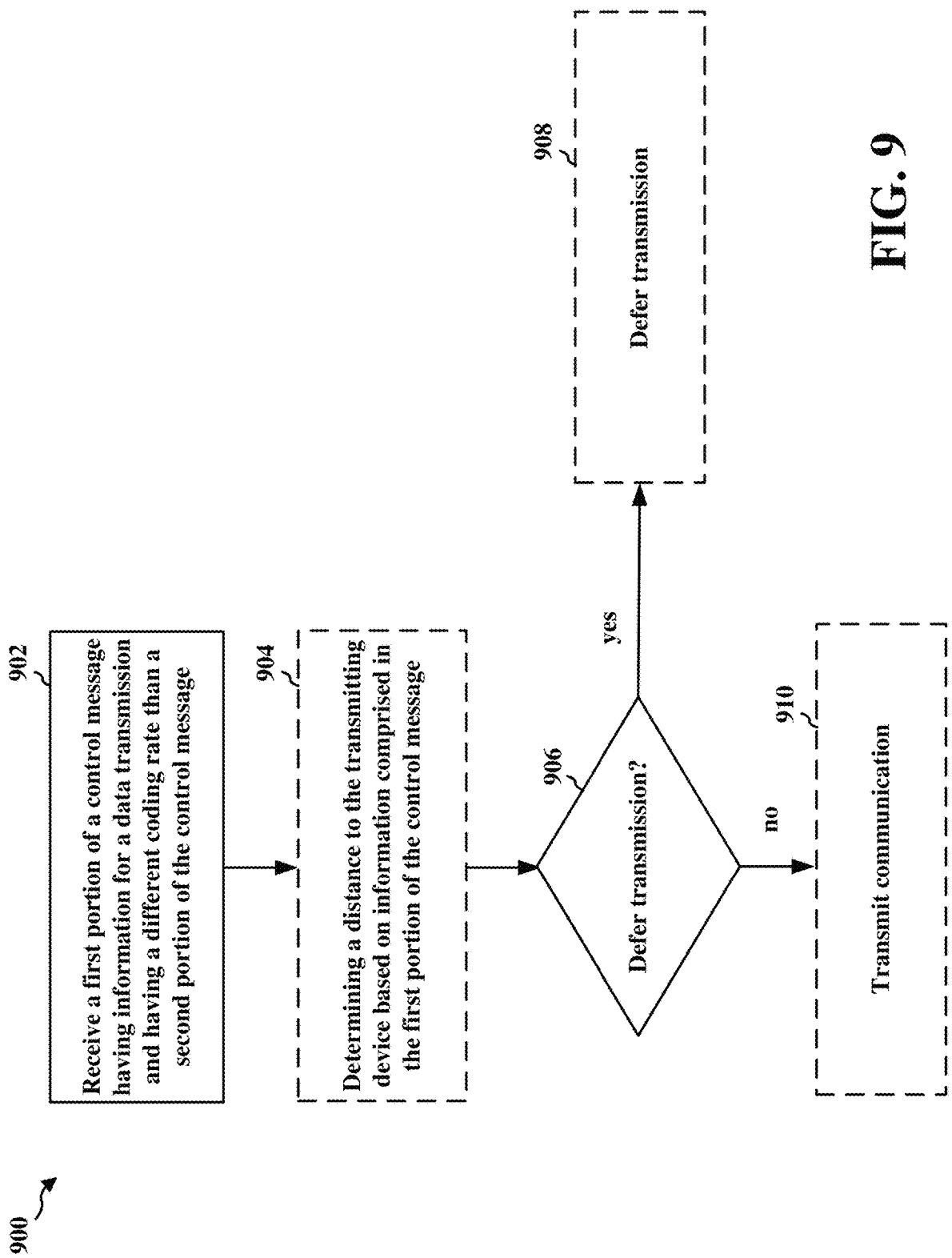
FIG. 9 is a flowchart of a method of wireless communication according to some aspects of the disclosure.

FIG. 9 is a flowchart 900 of a method of wireless communication. The method may be performed by a receiving device (e.g., the UE 104, device 350, 404, 408, 502, 504, 750, the apparatus 1002/1002'). The receiving device may receive communication directly from transmitting devices, e.g., from UE(s) or other devices based on V2V or V2X communication, or other direct D2D communication. Optional aspects are illustrated with a dashed line. The method improves network performance by helping to ensure that transmitting devices do not cause interference to each other based on trouble in decoding control transmissions.

At 902, the receiving device receives at least a first portion of a control message having information for interference avoidance for a data transmission sent from a transmitting device, wherein the first portion of the control message is transmitted using a different coding rate than a second portion of the control message. The first portion of the control message may use a lower coding rate than the second portion of the control message. The first portion of the control message may indicate a number of TTIs that will be occupied by the data transmission. The number of TTIs may correspond to a DMRS sequence transmitted with the control message. Thus, a receiving device may be able to infer the number of TTIs based on the DRMS sequence. The first portion of the control message may indicate one or more resource blocks that will be occupied by the data transmission.

The first portion of the control message received at 902 may comprise aspects of code division multiplexing. For example, different control messages may use different DMRS sequences. Thus, the receiving device may be able to distinguish different control messages based on a DMRS sequence used in connection with the control message. The first portion of the control message may be scrambled based on an MA sequence. In another example, the first portion of the control message may be received without scrambling based on an MA sequence.

At 906, the receiving device determines whether to defer a transmission based on information comprised in the first portion of the control message. If the receiving device determines, at 906, to defer the transmission, then the receiving device defers the transmission at 908. Otherwise, the receiving device may proceed to transmit control and/or data at 910.

As illustrated at 904, the receiving device may determine a distance from the receiving device to the transmitting device based on information comprised in the first portion of the control message, wherein the receiving device determines whether to defer, at 906, the transmission based on information comprised in the first portion of the control message. The information in the first portion of the control message that is used to determine the distance may comprise any combination of a L2 ID for the transmitting device, at least a portion of geographic coordinates for the transmitting device and/or a zone ID for the transmitting device. Accordingly, at 906, the receiving device may use the distance to determine whether to defer its own transmission to avoid interference with the data transmission sent from the transmitting device. In one example, the first portion of the control message may be transmitted in a way that enables the receiving device to receive the first portion, however, the receiving device may determine that it will not receive (or is unlikely to receive) the second portion of the control message and/or the data transmission due to the distance from the transmitting device. As such, the receiving device may determine at 906 that deferral of its own transmission is unnecessary and proceed to transmit its own control and/or data at 910. In another example, the receiving device may receive the first portion of the control message and determine that the transmitting device is within a threshold distance of the receiving device. The determination may involve determining whether the transmitting device and the receiving device are within a same zone or area. If so, the receiving device may determine at 906 that it will receive (or is likely to receive) the second portion of the control message and/or the data transmission, and therefore, wait at 910 to begin its own transmission until after resources occupied by the data transmission from the transmitting device have passed.

Figure 10:
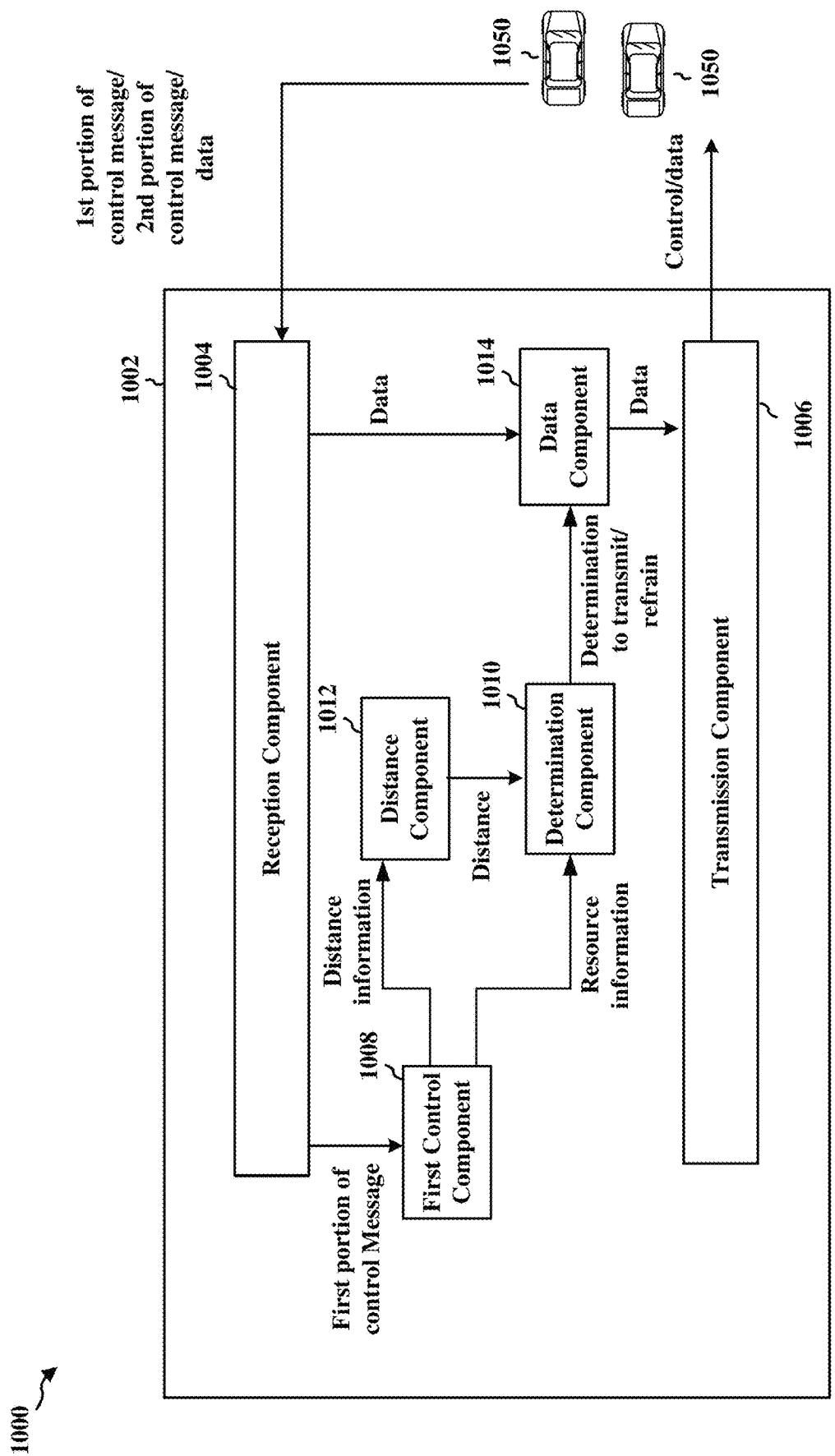
FIG. 10 is a conceptual data flow diagram illustrating the data flow between different means/components in an exemplary apparatus according to some aspects of the disclosure.

FIG. 10 is a conceptual data flow diagram 1000 illustrating the data flow between different means/components in an exemplary apparatus 1002. The apparatus may be a receiving device, e.g., UE 104, device 350, 404, 408, 502, 504, 750. The apparatus includes a reception component 1004 that receives transmissions from transmitting devices, e.g., UE(s) 1050 and a transmission component that transmits to UE(s) 1050. The apparatus may further comprise a first control component 1008 that is configured to receive, at least a first portion of a control message having information for interference avoidance for a data transmission, wherein the first portion of the control message is transmitted using a different coding rate than a second portion of the control message. The apparatus may comprise a determination component 1010 that is configured to determine whether to defer a transmission based on information comprised in the first portion of the control message. The apparatus may comprise a distance component 1012 that is configured to determine a distance from the receiving device to the transmitting device based on information comprised in the first portion of the control message, wherein the receiving device determines to defer the transmission based on information comprised in the first portion of the control message. The apparatus may comprise a data component 1014 that is configured to transmit data or to receive data based on the determination from the determination component 1010.

The apparatus may include additional components that perform each of the blocks of the algorithm in the aforementioned flowcharts of FIGS. 5 and 9. As such, each block in the aforementioned flowcharts of FIGS. 5 and 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
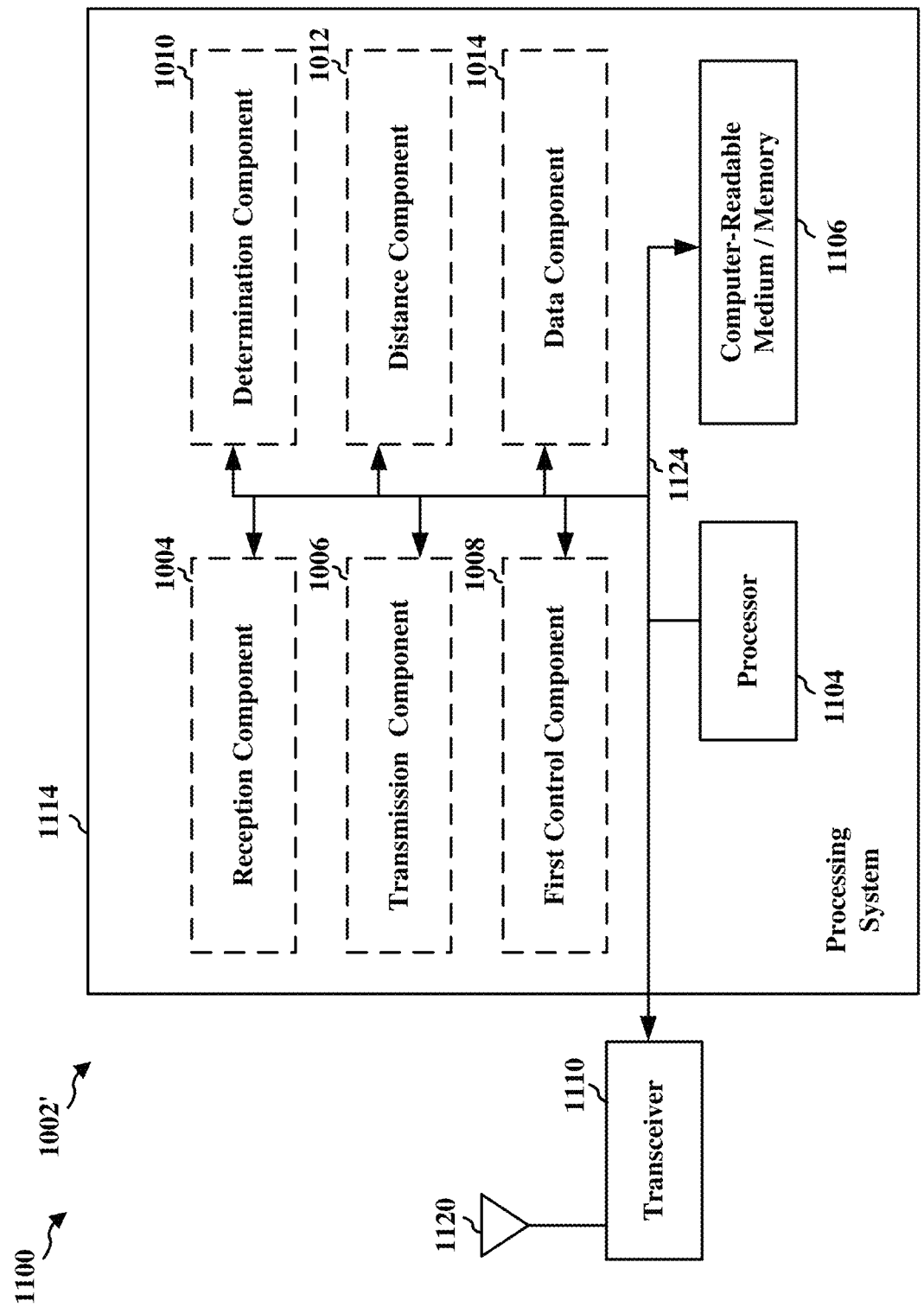
FIG. 11 is a diagram illustrating an example of a hardware implementation for an apparatus employing a processing system according to some aspects of the disclosure.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, 1012, 1014, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1006, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010, 1012, 1014. The components may be software components running in the processor 1104, resident/stored in the computer readable medium/memory 1106, one or more hardware components coupled to the processor 1104, or some combination thereof. The processing system 1114 may be a component of the device 350 and may include the memory 360 and/or at least one of the TX processor 368, the RX processor 356, and the controller/processor 359.

In one configuration, the apparatus 1002/1002' for wireless communication includes means for receiving at least a first portion of a control message having information for interference avoidance for a data transmission, wherein the first portion of the control message is transmitted using a different coding rate than a second portion of the control message (e.g., at least first control component 1008), means for determining a distance from the apparatus 1002/1002' to the transmitting device based on information comprised in the first portion of the control message (e.g., at least distance component 1012), and means for determining whether to defer a transmission based on the determined distance (e.g., at least determination component 1010), wherein the apparatus 1002/1002' determines to defer the transmission based on the determined distance. The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Other aspects of the disclosure relate to using multiple access (MA) signatures for non-orthogonal multiple access (NOMA). MA signatures are identifiers for distinguishing UE-specific patterns of data transmissions and may be used to multiplex UEs on a set of resources. NOMA uses non-orthogonal signatures. When an overloading factor of greater than 1 (>1) is present, NOMA access may support a large number of UEs. For example, the overloading factor is greater than 1 when 6 UEs are spread over 4 resource elements (REs).

In 3GPP, NOMA in downlink communications may use superposition coding, such as multi-user superposition transmission (MUST). Moreover, a receiver may be configured for successive interference cancellation (SIC). NOMA in uplink communications may utilize grant-free uplink transmissions that are power controlled. Schemes may include resource spread multiple access (RSMA), sparse code multiple access (SCMA), interleave-division multiple access (IDMA), pattern division multiple access (PDMA), multi-user shared access (MUSA), etc.

For V2X, a transmission may not be power controlled to a certain receiver. Hence, V2X (non-power-controlled uplink transmissions) and NOMA (power-controlled uplink transmissions) are different with respect to uplink communications in that different tradeoff and combination schemes are possible. In V2X, successive interference cancellation (SIC) is needed to separate transmitting UEs with a power imbalance. Moreover, V2X needs MA signatures to separate transmitting UEs that cannot be separated with SIC. Notably, power-domain MA schemes are not applicable for V2X.

Figure 12:
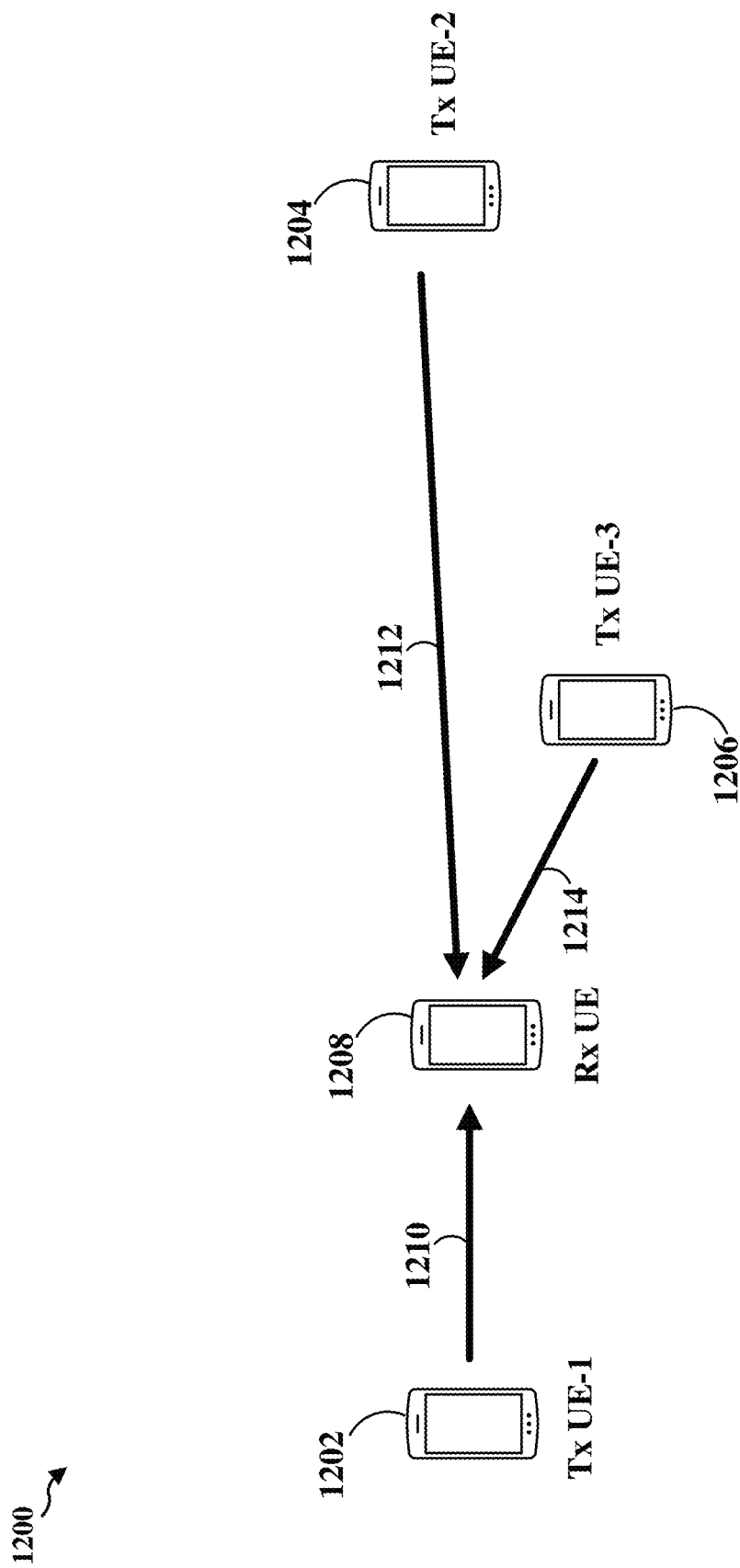
FIG. 12 illustrates a V2X scenario where transmissions to a receiver are not power controlled according to some aspects of the disclosure.

FIG. 12 illustrates a V2X scenario 1200 where transmissions to a receiver are not power controlled. In FIG. 12, a first transmitting UE 1202, a second transmitting UE 1204, and a third transmitting UE 1206 all transmit to a receiving UE 1208. In an example, a first transmission 1210 from the first transmitting UE 1202 and a second transmission 1212 from the second transmitting UE 1204 may potentially be separated with SIC at the receiving UE 1208. However, orthogonal/low correlation signatures may be needed to separate the first transmission 1210 from the first UE 1202 and a third transmission 1214 from the third UE 1206 if such transmissions cannot be separated with SIC at the receiving UE 1208.

In an aspect of the disclosure, to improve transmission reliability with increasing user densities, MA signatures may be used for control transmissions to make a control transmission more reliable even when collisions are detected. For example, a NACK-based reselection scheme may be provided to reselect a resource in case a collision is detected. In an aspect, a request (REQ)-response (RSP) based design may be provided that allows for a NOMA/MA signature spread REQ and RSP for detecting collisions during the REQ phase.

Figure 13:
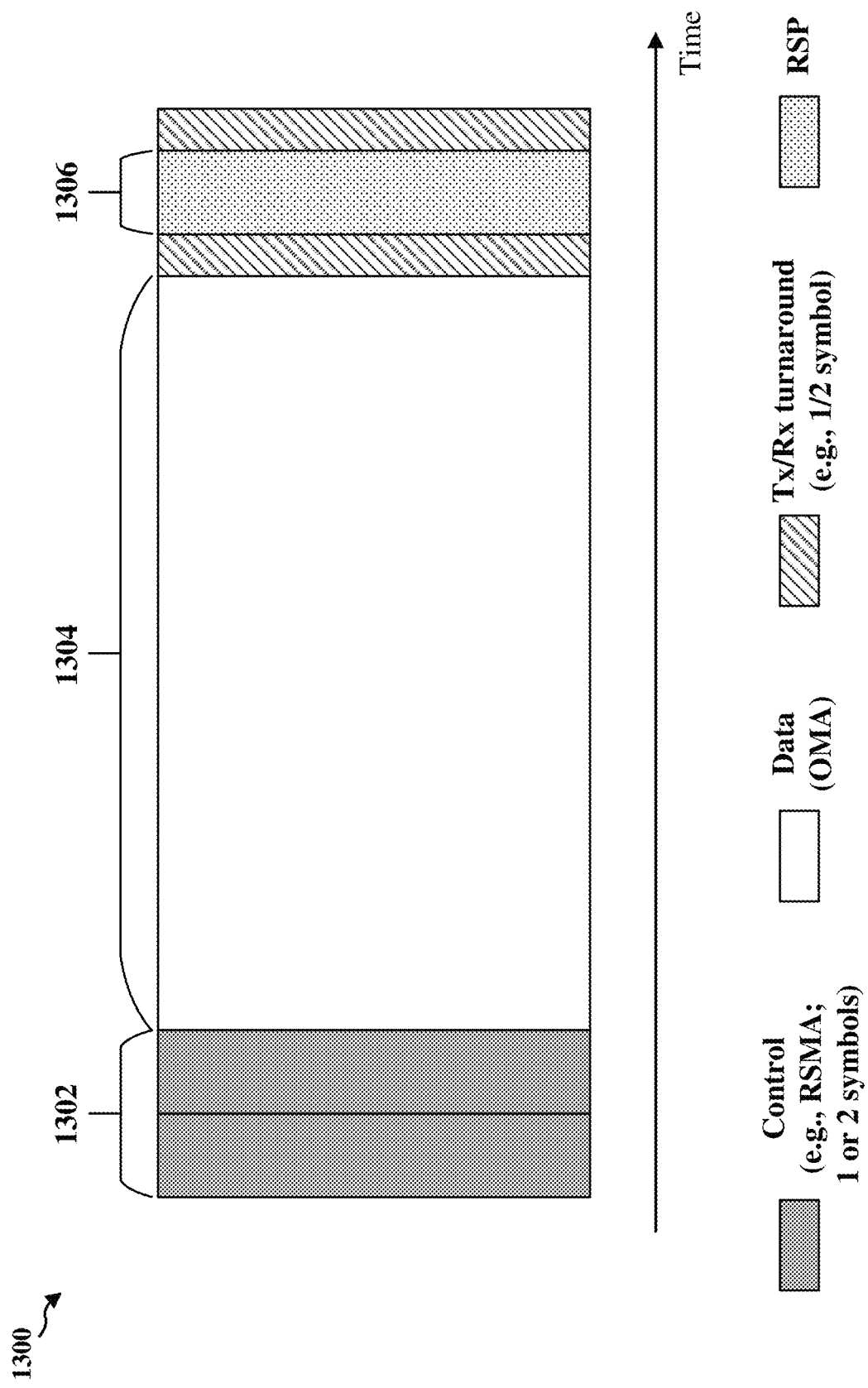
FIG. 13 illustrates an example transmission time interval (TTI) structure for a request (REQ)-response (RSP) based channel access design according to some aspects of the disclosure.

FIG. 13 illustrates an example TTI structure 1300 for a REQ-RSP based channel access design according to an aspect of the present disclosure.

The TTI structure 1300 may include a first region 1302 for communicating control information over, e.g., 1 or 2 symbols. In an aspect, the control information includes a transmission request (REQ). That is, the first region 1302 carries information related to the REQ instead of only a sequence. The first region 1302 is followed by a second region 1304 for communicating orthogonal multiple access (OMA) data over a number of symbols. A third region 1306 for communicating a response (RSP) to the REQ may follow the second region 1304. Notably, a Tx/Rx turnaround region (e.g., ½ symbol in length) may precede and follow the third region 1306. In an aspect, the RSP may be in the form of ACK/NACK or information indicating that a transmitter should reselect a resource for the transmission of data. In an aspect, the TTI structure 1300 for the REQ-RSP based transmission design, wherein the control information (REQ) is transmitted followed by the transmission of the OMA data and the RSP, reduces overhead in comparison to a transmission design that transmits a REQ followed by transmission of a RSP, control information, and data in a TTI.

In an aspect, the REQ-RSP based transmission design of FIG. 13 may be implemented with or without LBT symbols. When implemented without LBT symbols, control information may be transmitted in the first region 1302 with MA signatures (e.g., RSMA or SCMA). A MA signature length (e.g., repetition factor for RSMA) may be configured for a channel bandwidth/resource pool since the MA signature length depends on a QoS versus density needs. Moreover, the MA signature length can be dynamically modified based on UE measurements of congestion, etc. Notably, a baseline of OMA control information and data may still be supported based on configuration (with LBT symbols).

In an aspect, when the control information is transmitted with MA signatures (e.g., RSMA), reference symbols (RS) for the control information are orthogonal. The RS may be used to determine a start/stop of resource allocation. Notably, in a previous scheme, the start/stop of resource allocation may have been determined based on different LBT sequences.

In an aspect, a number of orthogonal RS dimensions needed for transmission may be determined as follows. For example, a number of orthogonal RS dimensions needed may be equal to N×4, where N is the number of UEs that can be multiplexed in the channel bandwidth/resource pool. The number of UEs that can be multiplexed may determine a collision probability. Therefore, a higher value of N may be needed for higher QoS and higher densities.

If N=1, then the number of orthogonal RS dimensions needed is equal to N×4=1×4=4. Thus, a transmitter transmitting OMA control information and data may rely on random selection alone for reduced collisions. Notably, this is the same as a baseline design with a LBT-based mechanism.

If N=2, then the number of orthogonal RS dimensions needed is equal to N×4=2×4=8. If N=4, then the number of orthogonal RS dimensions needed is equal to N×4=4×4=16. If N=8, then the number of orthogonal RS dimensions needed is equal to N×8=8×4=32.

Figure 14:
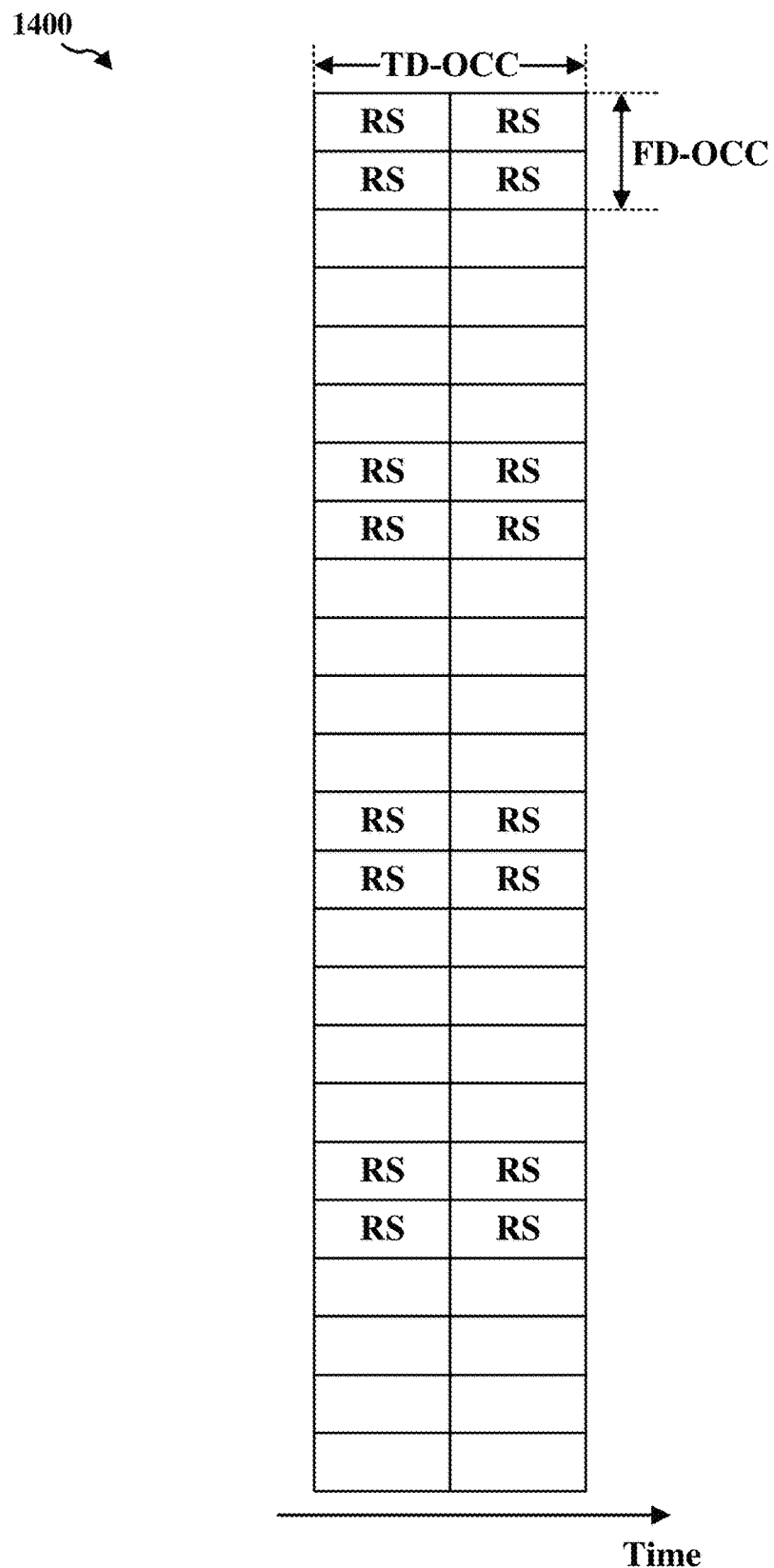
FIG. 14 illustrates an example resource structure for control symbols having reference symbols (RS) according to some aspects of the disclosure.

FIG. 14 illustrates an example resource structure 1400 for control symbols having reference symbols (RS) according to an aspect of the present disclosure. Referring to FIG. 14, methods for attaining a number of orthogonal RS dimensions will be described.

The number of orthogonal RS dimensions may be attained using one or two root sequences. Moreover, the number of attainable RS dimensions may be a product of a maximum number of cyclic shifts, a number of a time domain orthogonal cover code (TD-OCC), a number of a frequency domain orthogonal cover code (FD-OCC), and the number of roots sequences. In one example, if the maximum number of cyclic shifts is 4, the number of TD-OCC is 2, the number of FD-OCC is 2, and the number of root sequences is 1, then the number of attainable RS dimensions=4×2×2×1=16. In another example, if the maximum number of cyclic shifts is 4, the number of TD-OCC is 2, the number of FD-OCC is 2, and the number of root sequences is 2, then the number of attainable RS dimensions=4×2×2×2=32.

In an aspect, a MA sequence may be applied to have subchannel-based spreading/interleaving. This is appropriate since two UEs may overlap only in a subset of subchannels.

In an aspect, a MA sequence may be configured for a channel bandwidth/resource pool according to a MA signature length, a number of control symbols, a number of cyclic shifts, a number of TD-OCC, a number of FD-OCC, and a number of root sequences. In an example, the MA signature length is 4, the number of control symbols is 2, the number of cyclic shifts is 4, the number of TD-OCC is 2, the number of FD-OCC is 2, and the number of root sequences is 1. This results in a multiplexing factor of 4 with 16 orthogonal RS for control decoding and allocation size detection.

In an aspect, distributed channel access mechanisms may result in collision among transmissions. Particularly, in networks (e.g., V2X networks) with a distributed channel access mechanism, collisions among transmitters may be unavoidable. Example channel access mechanisms include random resource selection, LBT-based resource selection, REQ-RESP-based resource selection (with Tx/Rx yielding), long-term sensing-based resource selection, etc. Resource overhead for the purpose of channel contention may be a function of the channel access mechanism. Moreover, a collision probability (spatial reuse of resources) may depend on the channel access mechanism.

For example, in a random resource selection channel access mechanism, UEs select a set of time-frequency resources in a distributed manner. This may result in a highest collision probability compared to the other channel access mechanisms described above. However, the resource overhead for channel contention is not increased.

In another example, in a LBT-based resource selection channel access mechanism, guard zones will be created around the transmitters. For a typical receiver, a collision probability is smaller (on average) than random selection.

In an aspect, a transmission may encompass a transmission of control information and data. A UE may select a set of time-frequency resources to transmit the control information and the data. The control information may include information required to decode the data, such as a starting resource block (start RB), a length of a time-frequency resource allocation, a number of slots in which the data is transmitted, a modulation and coding scheme, etc. The control information may also include a link identifier (link ID) and/or a destination identifier (destination ID) (complete or in-part) of the receiving UE for which the data is being sent. An entire destination ID, as well as a source identifier (source ID) of the sending UE sending the data, may be sent in a medium access control (MAC) header of the data. Moreover, a subset of the destination ID (destination ID bits) may be sent in the control information to enable a feedback transmission from the receiving UE when the receiving UE fails to decode the data.

Notably, resource collisions may be unavoidable with distributed channel access mechanisms. A collision probability may depend on a channel access mechanism and a density of transmitters/UEs in a given area. A collision pertains to both control information and data. Thus, if a control information transmission is lost due to a collision, feedback information from the receiving UE may not be sent (e.g., discontinuous transmission (DTX)).

In unicast communication, a transmitting UE may assume DTX at a receiving UE to be a negative acknowledgement (NACK). Thus, when the feedback information from the receiving UE is lost due to a collision, the transmitting UE can proceed as if the NACK is received from the receiving UE.

In groupcast communication, NACK-based feedback is relied upon since NACKs from receiving UEs are part of a synchronous frequency network (SFN). As such, for groupcast communication, a transmitting UE may assume DTX at a receiving UE to be a positive acknowledgement (ACK), and therefore, resource collisions will result in packet loss if the NACK is unable to be communicated to the transmitting UE.

Accordingly, what is needed is a transmission method for transmitting control information (e.g., destination ID) from a transmitting UE and feedback information (e.g., NACK) from a receiving UE that is robust to resource collisions. In some transmission schemes, control information may be transmitted using multiple access (MA) signatures, which is robust to collisions (from UEs using different MA signatures), and feedback information may be sent using the same MA signatures as transmitting UEs. In such a transmission scheme, the feedback information may be used to determine whether to continue transmission or reselect a transmission resource.

According to aspects of the present disclosure, a transmission scheme is provided that facilitates the transmission of control information from the transmitting UE and feedback information from the receiving UE independent of a channel access mechanism. The transmission scheme also allows for the splitting of the control information based on a minimum information required (e.g., destination ID) to determine the feedback information.

In an aspect of the disclosure, the control information may be divided into two subsets of control information. A first subset of the control information (or first control information subset) may include information needed to determine whether or not to send feedback (e.g., destination ID indicating the intended receiving UE(s)). A second subset of the control information (or second control information subset) may include information for decoding corresponding data, such as a time-frequency resource location allocation (e.g., resource block (RB)/time) for the data, a modulation and coding scheme (MCS) of the data, a transmission mode, etc. Notably, to increase the likelihood of receiving feedback information from a receiving UE, it is advantageous to increase the robustness of the first control information subset against collisions. Accordingly, robustness may be increased by transmitting a smaller portion (less bits) of the control information, i.e., the first control information subset, to the receiving UE as compared to transmitting an entirety of the control information, i.e., the first and second control information subsets, which is less robust.

In an aspect, a transmitting UE may transmit the first control information subset to the receiving UE using multiple access (MA) signatures. The transmitting UE's use of a MA signature to transmit the first control information subset will increase the robustness of the transmission as long as different UEs select different MA signatures to send their own transmission of a first control information subset. In an aspect, use of the MA signature to transmit the first control information subset may be equivalent to transmitting the first control information subset on orthogonal resources. In operation, the transmitting UE may select a MA signature and transmit the first control information subset using the selected MA signature. A reference symbol (RS) for decoding the first control information subset is orthogonal and a sequence/time-frequency chosen to send the RS may depend on the MA signature selected. In an aspect, a set of MA signatures from which a MA signature is selected may depend on the priority of the transmission, such that if the priority of the transmission is high, the selected MA signature allows the high-priority transmission to have a lower probability of colliding with other transmissions using other MA signatures.

In an aspect, the transmitting UE may transmit the second control information subset and the data to the receiving UE according to a normal procedure without using any MA signatures. In a further aspect, the receiving UE may detect active MA signatures and decode the first control information subset transmitted (by the transmitting UE) based on one or more active MA signatures. The receiving UE may further determine if a corresponding transmission of the second control information subset and the data is intended for the receiving UE based on the first control information subset (e.g., destination ID). If the receiving UE learns that the transmission of the second control information subset and the data is intended for the receiving UE, the receiving UE then attempts to decode the second control information subset and the data. If the receiving UE fails to decode the second control information subset and/or the data, the receiving UE may transmit feedback information (e.g., NACK) to the transmitting UE.

Figure 15:
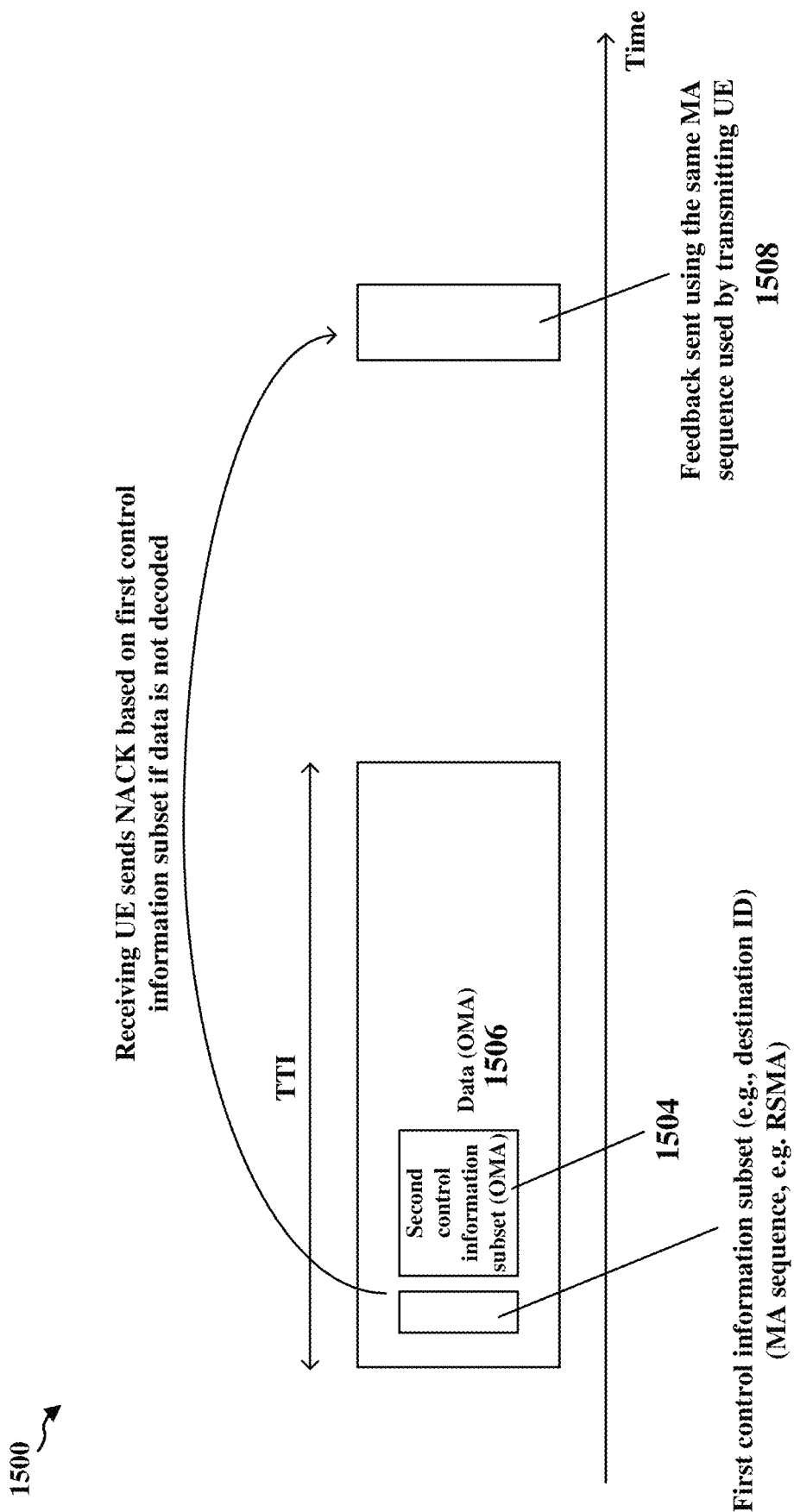
FIG. 15 illustrates a transmission scheme for transmitting control information using a multiple access (MA) signature to increase robustness of a control transmission and a corresponding feedback transmission according to some aspects of the disclosure.

FIG. 15 illustrates a transmission scheme 1500 for transmitting control information using a multiple access (MA) signature to increase robustness of a control transmission and a corresponding feedback transmission in accordance with aspects of the disclosure.

In an aspect of the disclosure, from a transmitting UE's perspective, the transmitting UE may select a set of time-frequency resources within a transmission time interval (TTI) for transmitting control information (1502, 1504) and data 1506 corresponding to the control information to a receiving UE. The transmitting UE may further select a first subset of the time-frequency resources (first time-frequency resource subset) to transmit a first subset of the control information (first control information subset) 1502.

The first control information subset 1502 may include a link identifier (link ID) and/or a destination identifier (destination ID) of the receiving UE for which the data 1506 is being sent. The inclusion of the link ID and/or destination ID in the first control information subset 1502 allows the receiving UE to determine that the data 1506 is intended for the receiving UE and further enables the receiving UE to send a feedback transmission (e.g., NACK) 1508 to the transmitting UE if the receiving UE fails to decode the data 1506. The first control information subset 1502 may further include one or more transmission priorities of the control information and/or the data to enable priority-based backoff. The first control information subset 1502 may also include a time-frequency resource allocation of the control information and/or the data to enable resource exclusion by other transmitting UEs.

In an aspect, the transmitting UE may determine a multiple access (MA) signature (e.g., codebook, sequence, or scrambling/interleaving) that can be used as an identifier to distinguish the transmitting UE's transmission from other transmitting UEs' transmissions on the same time-frequency resources. In an aspect, the codebook includes sparse codewords that do not overlap for any element. That is, the transmitting UE selects orthogonal time-frequency resources within the first time-frequency resource subset available for transmission of the first control information subset 1502. Thereafter, the transmitting UE transmits the first control information subset 1502 using the MA signature.

The transmitting UE also selects a second subset of the time-frequency resources (second time-frequency resource subset) to transmit a remainder of the control information, i.e., a second subset of the control information (second control information subset) 1504, needed by the receiving UE to decode the data 1506. The transmitting UE further selects a third subset of the time-frequency resources (third time-frequency resource subset) to transmit the data 1506. Notably, the selected first, second, and third time-frequency resource subsets may be separated in time or frequency.

In an aspect, when transmitting the first control information subset 1502, the transmitting UE may determine a reference symbol (RS) sequence and a subsubset of time-frequency resources within the first time-frequency resource subset to use for transmitting the RS sequence based on the selected MA signature. The RS sequence may be used to demodulate the first control information subset 1502 at the receiving UE. The transmitting UE transmits the RS sequence via orthogonal time-frequency resources of the subsubset along with the first control information subset 1502 using the MA signature. In a further aspect, the transmitting UE determines a sequence identifier, a time domain orthogonal cover code (TD-OCC), a frequency domain orthogonal cover code (FD-OCC), and/or a cyclic shift to use for transmitting the first control information subset 1502. The sequence identifier, the time TD-OCC, the FD-OCC, or the cyclic shift to use for transmitting the first control information subset 1502 may be preconfigured at the transmitting UE via a radio resource control (RRC) configuration.

In an aspect, a length of the MA signature and a number of symbols to use for transmitting the first control information subset 1502 is preconfigured at the transmitting UE via a radio resource control (RRC) configuration. In another aspect, the MA signature used to transmit the first control information subset 1502 is indicated in the second control information subset 1504 or a medium access control (MAC) header of the data 1506. This helps the receiving UE determine a correspondence between multiple decoded control information subsets and the data (if decoded), and send feedback 1508 appropriately.

In an aspect of the disclosure, from a receiving UE's perspective, the receiving UE detects a set of active MA signatures (e.g., based on RS sequence). The receiving UE then receives the first control information subset 1502 sent on each active MA signature and determines whether a destination identifier (destination ID) or a link identifier (link ID) included in the first control information subset 1502 corresponds to an associated link ID for which the receiving device is interested in receiving data. If the destination ID or the link ID corresponds to the associated link ID, the receiving UE attempts to receive the second control information subset 1504 based on the first control information subset 1502. If the second control information subset 1504 is successfully received, the receiving UE attempts to receive the data 1506 associated with the control information (1502, 1504) based on the second control information subset 1504.

If the receiving UE fails to successfully receive (decode) the second control information subset 1504 or the data 1506, the receiving UE transmits feedback information (e.g., NACK) 1508 to the transmitting UE. In an aspect, the feedback information 1508 is transmitted using the same MA signature used to transmit the first control information subset 1502 from the transmitting UE.

In an aspect, when transmitting the feedback information 1508, the receiving UE may determine a reference symbol (RS) sequence based on the MA signature and determine orthogonal time-frequency resources for transmitting the RS sequence based on the MA signature. The receiving UE may then transmit, with the feedback information (e.g., NACK) 1508, the RS sequence via the orthogonal time-frequency resources using the MA signature.

Figure 16:
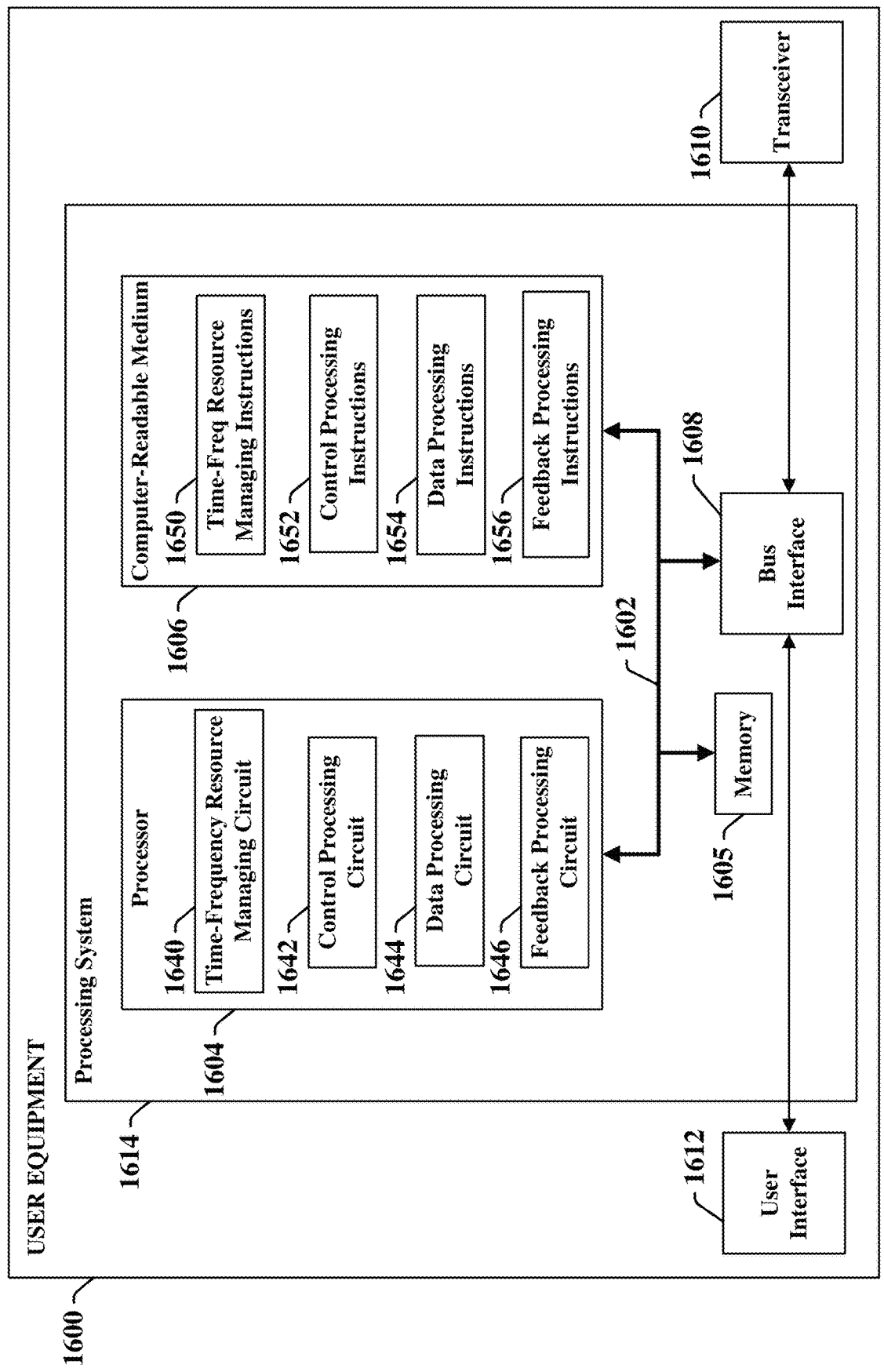
FIG. 16 is a block diagram conceptually illustrating an example of a hardware implementation for a user equipment according to some aspects of the disclosure.

FIG. 16 is a block diagram illustrating an example of a hardware implementation for a UE 1600 employing a processing system 1614. For example, the UE 1600 may be a user equipment (UE) as illustrated in any one or more of FIGS. 1, 3, 4, 5, and/or 12.

The UE 1600 may be implemented with a processing system 1614 that includes one or more processors 1604. Examples of processors 1604 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 1600 may be configured to perform any one or more of the functions described herein. That is, the processor 1604, as utilized in the UE 1600, may be used to implement any one or more of the processes and procedures described below and illustrated in FIGS. 17 and 18.

In this example, the processing system 1614 may be implemented with a bus architecture, represented generally by the bus 1602. The bus 1602 may include any number of interconnecting buses and bridges depending on the specific application of the processing system 1614 and the overall design constraints. The bus 1602 communicatively couples together various circuits including one or more processors (represented generally by the processor 1604), a memory 1605, and computer-readable media (represented generally by the computer-readable medium 1606). The bus 1602 may also link various other circuits such as timing sources, peripherals, voltage regulators, and power management circuits, which are well known in the art, and therefore, will not be described any further. A bus interface 1608 provides an interface between the bus 1602 and a transceiver 1610. The transceiver 1610 provides a communication interface or means for communicating with various other apparatus over a transmission medium. Depending upon the nature of the apparatus, a user interface 1612 (e.g., keypad, display, speaker, microphone, joystick) may also be provided. Of course, such a user interface 1612 is optional, and may be omitted in some examples.

In some aspects of the disclosure, the processor 1604 may include time-frequency resource managing circuitry 1640 configured for various functions, including, for example, determining time-frequency resources to transmit control information (e.g., first and second subsets/portions of a control message) and data (e.g., user data) associated with the control information to a receiving device, selecting a first subset of the time-frequency resources to transmit a first subset of the control information, selecting a second subset of the time-frequency resources to transmit a second subset of the control information, and selecting a third subset of the time-frequency resources to transmit the data. For example, the time-frequency resource managing circuitry 1640 may be configured to implement one or more of the functions described below in relation to FIG. 17, including, e.g., blocks 1702, 1704, 1706, and 1708, FIG. 19, including, e.g., block 1906, and FIG. 21, including, e.g., block 2106.

The processor 1604 may also include control processing circuitry 1642 configured for various functions, including, for example, transmitting the first subset of the control information via the first subset of the time-frequency resources and transmitting the second subset of the control information via the second subset of the time-frequency resources. For example, the control processing circuitry 1642 may be configured to implement one or more of the functions described below in relation to FIG. 17, including, e.g., blocks 1704 and 1706. The control processing circuitry 1642 may also be configured for receiving, from a transmitting device, the first subset of control information via the first subset of time-frequency resources based on a multiple access (MA) signature used to transmit the first subset of the control information, determining if a destination identifier (destination ID) or a link identifier (link ID) included in the first subset of the control information corresponds to an associated link ID, and determining to receive the second subset of the control information via the second subset of the time-frequency resources based on the first subset of the control information if the destination ID or the link ID corresponds to the associated link ID. For example, the control processing circuitry 1642 may be configured to implement one or more of the functions described below in relation to FIG. 18, including, e.g., blocks 1802, 1804, and 1806.

The control processing circuitry 1642 may also be configured for generating a first portion of a control message, the first portion including a resource allocation for a second portion of the control message and/or information for decoding the second portion of the control message and for decoding user data, generating the second portion of the control message, the second portion including additional information for decoding the user data, transmitting the first portion of the control message (e.g., to a second UE), and transmitting the second portion of the control message (e.g., to the second UE). For example, the control processing circuitry 1642 may be configured to implement one or more of the functions described below in relation to FIG. 19, including, e.g., blocks 1902, 1904, 1908, and 1910 and FIG. 21, including, e.g., blocks 2102, 2104, 2108, and 2110.

The control processing circuitry 1642 may also be configured for receiving a first portion of a control message from a second UE, the first portion including a resource allocation for a second portion of the control message and/or information for decoding the second portion of the control message and for decoding user data, determining whether the second portion of the control message or the user data is intended to be received by the first UE based on the information included in the first portion of the control message, receiving the second portion of the control message from the second UE (e.g., based on the resource allocation included in the first portion of the control message), the second portion including additional information for decoding the user data, decoding the received second portion of the control message based on the information included in the first portion of the control message, and determining whether the user data is intended to be received by the first UE based on the additional information included in the second portion of the control message. For example, the control processing circuitry 1642 may be configured to implement one or more of the functions described below in relation to FIG. 20, including, e.g., blocks 2002, 2004, 2006, and 2008 and FIG. 22, including, e.g., blocks 2202, 2204, 2206, and 2208.

The processor 1604 may also include data processing circuitry 1644 configured for various functions, including, for example, transmitting the data via the third subset of the time-frequency resources and determining to receive the data associated with the control information via the third subset of the time-frequency resources based on the second subset of the control information if the second subset of the control information is successfully received. For example, the data processing circuitry 1644 may be configured to implement one or more of the functions described below in relation to FIG. 17, including, e.g., block 1708 and FIG. 18, including, e.g., block 1808.

The data processing circuitry 1644 may also be configured for transmitting user data (e.g., to the second UE), receiving the user data (e.g., from the second UE) if the received second portion of the control message is able to be decoded, and decoding the received user data based on the information included in the first portion of the control message and the additional information included in the second portion of the control message. For example, the data processing circuitry 1644 may be configured to implement one or more of the functions described below in relation to FIG. 19, including, e.g., block 1912, FIG. 20, including, e.g., blocks 2010 and 2012, FIG. 21, including, e.g., block 2112, and FIG. 22, including, e.g., blocks 2210 and 2212.

The processor 1604 may also include feedback processing circuitry 1646 configured for various functions, including, for example, receiving a negative acknowledgement (NACK) from the receiving device if the receiving device fails to successfully decode the second subset/portion of the control information or the data (e.g., user data) and transmitting a negative acknowledgement (NACK) to the transmitting device if the receiving device fails to successfully receive/decode the second subset/portion of the control information or the data (e.g., user data). For example, the feedback processing circuitry 1646 may be configured to implement one or more of the functions described below in relation to FIG. 17, including, e.g., block 1710 FIG. 18, including, e.g., block 1810, FIG. 19, including, e.g., block 1914, FIG. 20, including, e.g., block 2014, FIG. 21, including, e.g., block 2114, and FIG. 22, including, e.g., block 2214.

The processor 1604 is responsible for managing the bus 1602 and general processing, including the execution of software stored on the computer-readable medium 1606. The software, when executed by the processor 1604, causes the processing system 1614 to perform the various functions described below for any particular apparatus. The computer-readable medium 1606 and the memory 1605 may also be used for storing data that is manipulated by the processor 1604 when executing software.

One or more processors 1604 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1606. The computer-readable medium 1606 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1606 may reside in the processing system 1614, external to the processing system 1614, or distributed across multiple entities including the processing system 1614. The computer-readable medium 1606 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 1606 may include time-frequency resource managing instructions 1650 configured for various functions, including, for example, determining time-frequency resources to transmit control information (e.g., first and second subsets/portions of a control message) and data (e.g., user data) associated with the control information to a receiving device, selecting a first subset of the time-frequency resources to transmit a first subset of the control information, selecting a second subset of the time-frequency resources to transmit a second subset of the control information, and selecting a third subset of the time-frequency resources to transmit the data. For example, the time-frequency resource managing instructions 1650 may be configured to implement one or more of the functions described below in relation to FIG. 17, including, e.g., blocks 1702, 1704, 1706, and 1708, FIG. 19, including, e.g., block 1906, and FIG. 21, including, e.g., block 2106.

The computer-readable storage medium 1606 may also include control processing instructions 1652 configured for various functions, including, for example, transmitting the first subset of the control information via the first subset of the time-frequency resources and transmitting the second subset of the control information via the second subset of the time-frequency resources. For example, the control processing instructions 1652 may be configured to implement one or more of the functions described below in relation to FIG. 17, including, e.g., blocks 1704 and 1706. The control processing instructions 1652 may also be configured for receiving, from a transmitting device, the first subset of control information via the first subset of time-frequency resources based on a multiple access (MA) signature used to transmit the first subset of the control information, determining if a destination identifier (destination ID) or a link identifier (link ID) included in the first subset of the control information corresponds to an associated link ID, and determining to receive the second subset of the control information via the second subset of the time-frequency resources based on the first subset of the control information if the destination ID or the link ID corresponds to the associated link ID. For example, the control processing instructions 1652 may be configured to implement one or more of the functions described below in relation to FIG. 18, including, e.g., blocks 1802, 1804, and 1806.

The control processing instructions 1652 may also be configured for generating a first portion of a control message, the first portion including a resource allocation for a second portion of the control message and/or information for decoding the second portion of the control message and for decoding user data, generating the second portion of the control message, the second portion including additional information for decoding the user data, transmitting the first portion of the control message (e.g., to a second UE), and transmitting the second portion of the control message (e.g., to the second UE). For example, the control processing instructions 1652 may be configured to implement one or more of the functions described below in relation to FIG. 19, including, e.g., blocks 1902, 1904, 1908, and 1910 and FIG. 21, including, e.g., blocks 2102, 2104, 2108, and 2110.

The control processing instructions 1652 may also be configured for receiving a first portion of a control message from a second UE, the first portion including a resource allocation for a second portion of the control message and/or information for decoding the second portion of the control message and for decoding user data, determining whether the second portion of the control message or the user data is intended to be received by the first UE based on the information included in the first portion of the control message, receiving the second portion of the control message from the second UE (e.g., based on the resource allocation included in the first portion of the control message), the second portion including additional information for decoding the user data, decoding the received second portion of the control message based on the information included in the first portion of the control message, and determining whether the user data is intended to be received by the first UE based on the additional information included in the second portion of the control message. For example, the control processing instructions 1652 may be configured to implement one or more of the functions described below in relation to FIG. 20, including, e.g., blocks 2002, 2004, 2006, and 2008 and FIG. 22, including, e.g., blocks 2202, 2204, 2206, and 2208.

The computer-readable storage medium 1606 may also include data processing instructions 1654 configured for various functions, including, for example, transmitting the data via the third subset of the time-frequency resources and determining to receive the data associated with the control information via the third subset of the time-frequency resources based on the second subset of the control information if the second subset of the control information is successfully received. For example, the data processing instructions 1654 may be configured to implement one or more of the functions described below in relation to FIG. 17, including, e.g., block 1708 and FIG. 18, including, e.g., block 1808.

The data processing instructions 1654 may also be configured for transmitting user data (e.g., to the second UE), receiving the user data (e.g., from the second UE) if the received second portion of the control message is able to be decoded, and decoding the received user data based on the information included in the first portion of the control message and the additional information included in the second portion of the control message. For example, the data processing instructions 1654 may be configured to implement one or more of the functions described below in relation to FIG. 19, including, e.g., block 1912, FIG. 20, including, e.g., blocks 2010 and 2012, FIG. 21, including, e.g., block 2112, and FIG. 22, including, e.g., blocks 2210 and 2212.

The computer-readable storage medium 1606 may also include feedback processing instructions 1656 configured for various functions, including, for example, receiving a negative acknowledgement (NACK) from the receiving device if the receiving device fails to successfully decode the second subset/portion of the control information or the data (e.g., user data) and transmitting a negative acknowledgement (NACK) to the transmitting device if the receiving device fails to successfully receive/decode the second subset/portion of the control information or the data (e.g., user data). For example, the feedback processing instructions 1656 may be configured to implement one or more of the functions described below in relation to FIG. 17, including, e.g., block 1710 and FIG. 18, including, e.g., block 1810, FIG. 19, including, e.g., block 1914, FIG. 20, including, e.g., block 2014, FIG. 21, including, e.g., block 2114, and FIG. 22, including, e.g., block 2214.

Figure 17:
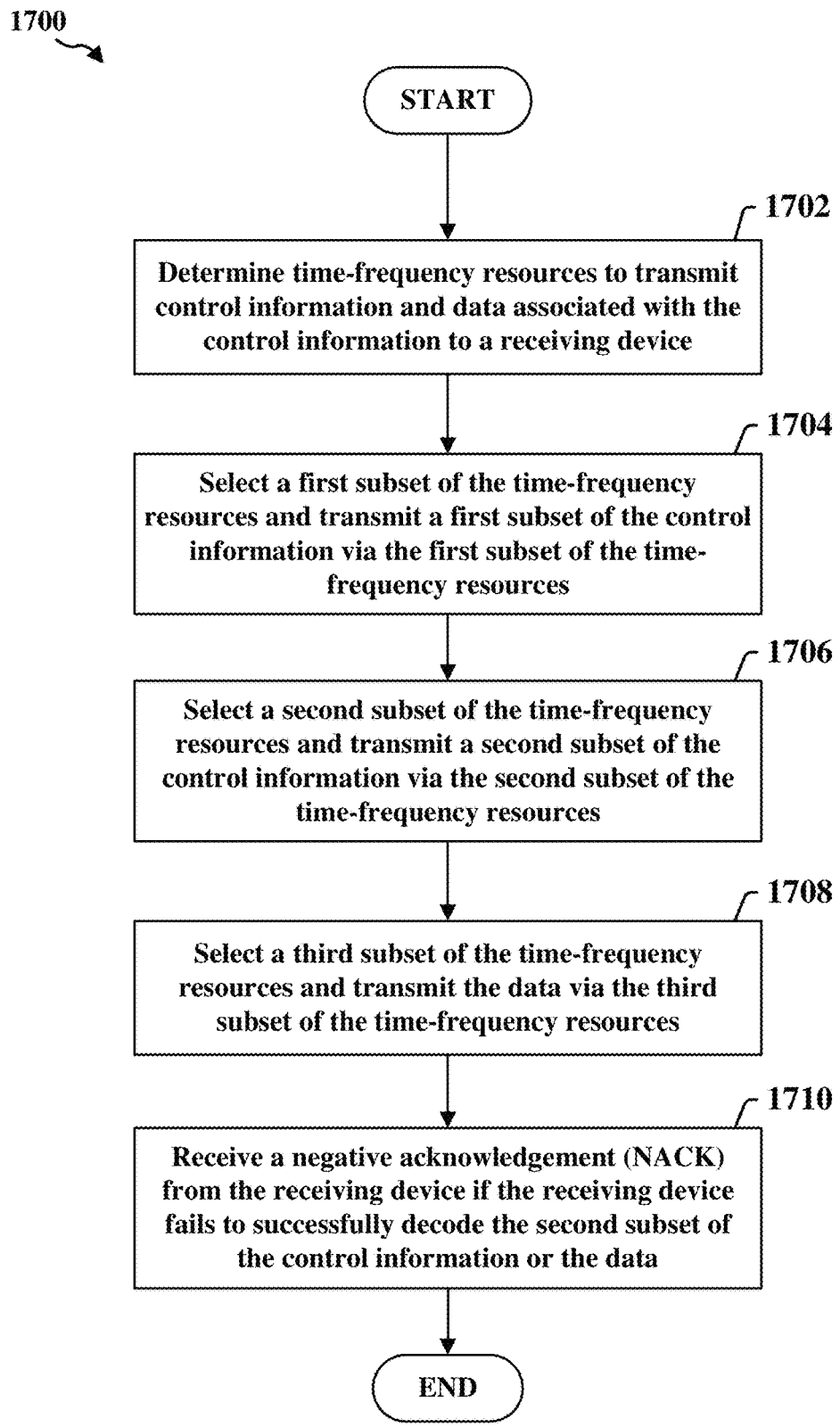
FIG. 17 is a flow chart illustrating an exemplary process for wireless communication at a transmitting device according to some aspects of the disclosure.

FIG. 17 is a flow chart illustrating an exemplary process 1700 for wireless communication at a transmitting device in accordance with some aspects of the present disclosure. As described below, some or all illustrated features may be omitted in a particular implementation within the scope of the present disclosure, and some illustrated features may not be required for implementation of all aspects. In some examples, the process 1700 may be carried out by the UE 1600 illustrated in FIG. 16. In some examples, the process 1700 may be carried out by any suitable apparatus or means for carrying out the functions or algorithm described below.

At block 1702, the transmitting device determines time-frequency resources to transmit control information and data associated with the control information to a receiving device.

At block 1704, the transmitting device selects a first subset of the time-frequency resources and transmits a first subset of the control information via the first subset of the time-frequency resources. In an aspect, the first subset of the control information includes a destination identifier (destination ID) of a service for which a data transmission is being performed. In another aspect, the first subset of the control information includes a link identifier (link ID) determined based on at least one of a link layer identifier associated with the transmitting device or a link layer identifier associated with the receiving device. The first subset of the control information may further include a transmission priority of the second subset of the control information, a transmission priority of the data, a time-frequency resource allocation of the second subset of the control information, a time-frequency resource allocation of the data, or any combination thereof.

At block 1706, the transmitting device selects a second subset of the time-frequency resources and transmits a second subset of the control information via the second subset of the time-frequency resources. In an aspect, the second subset of the control information includes information for decoding the data. For example, the information for decoding the data includes a time-frequency resource location allocated for the data, a modulation and coding scheme (MCS), a transmission mode, or any combination thereof.

At block 1708, the transmitting device selects a third subset of the time-frequency resources and transmits the data via the third subset of the time-frequency resources.

At block 1710, the transmitting device receives a negative acknowledgement (NACK) from the receiving device if the receiving device fails to successfully decode the second subset of the control information or the data.

In an aspect of the disclosure, the transmitting device transmits the first subset of the control information by determining a multiple access (MA) signature. The MA signature distinguishes a transmission of the transmitting device from another transmission of another transmitting device on a same time-frequency resource. Thereafter, the transmitting device transmits the first subset of the control information via the first subset of the time-frequency resources using the MA signature.

In a further aspect, the transmitting device transmits the first subset of the control information by determining a reference symbol (RS) sequence based on the MA signature and determining a subsubset of the first subset of the time-frequency resources to use for transmitting the RS sequence based on the MA signature. Thereafter, the transmitting device transmits, with the first subset of the control information, the RS sequence via orthogonal time-frequency resources of the subsubset of the first subset of the time-frequency resources using the MA signature. The first subset of the control information is demodulated using the RS sequence.

The transmitting device may further determine a sequence identifier, a time domain orthogonal cover code (TD-OCC), a frequency domain orthogonal cover code (FD-OCC), a cyclic shift, or any combination thereof to use for transmitting the first subset of the control information. The sequence identifier, the time TD-OCC, the FD-OCC, and/or the cyclic shift to use for transmitting the first subset of the control information may be preconfigured at the transmitting device via a radio resource control (RRC) configuration.

In an aspect, a length of the MA signature and a number of symbols to use for transmitting the first subset of the control information is preconfigured at the transmitting device via a radio resource control (RRC) configuration. In another aspect, the MA signature used to transmit the first subset of the control information is indicated in the second subset of the control information or a medium access control (MAC) header of the data, or a combination thereof.

In one configuration, the UE 1600 for wireless communication includes means for determining time-frequency resources to transmit control information and data associated with the control information to a receiving device, means for selecting a first subset of the time-frequency resources and transmitting a first subset of the control information via the first subset of the time-frequency resources, means for selecting a second subset of the time-frequency resources and transmitting a second subset of the control information via the second subset of the time-frequency resources, means for selecting a third subset of the time-frequency resources and transmitting the data via the third subset of the time-frequency resources, and means for receiving a negative acknowledgement (NACK) from the receiving device if the receiving device fails to successfully decode the second subset of the control information or the data.

In one aspect, the aforementioned means may be the processor 1604 shown in FIG. 16 configured to perform the functions recited by the aforementioned means. In another aspect, the aforementioned means may be a circuit or any apparatus configured to perform the functions recited by the aforementioned means.

Of course, in the above examples, the circuitry included in the processor 1604 is merely provided as an example, and other means for carrying out the described functions may be included within various aspects of the present disclosure, including but not limited to the instructions stored in the computer-readable storage medium 1606, or any other suitable apparatus or means described in any one of the FIGS. 1, 3, 4, 5, and/or 12 and utilizing, for example, the processes and/or algorithms described herein in relation to FIG. 17.

Figure 18:
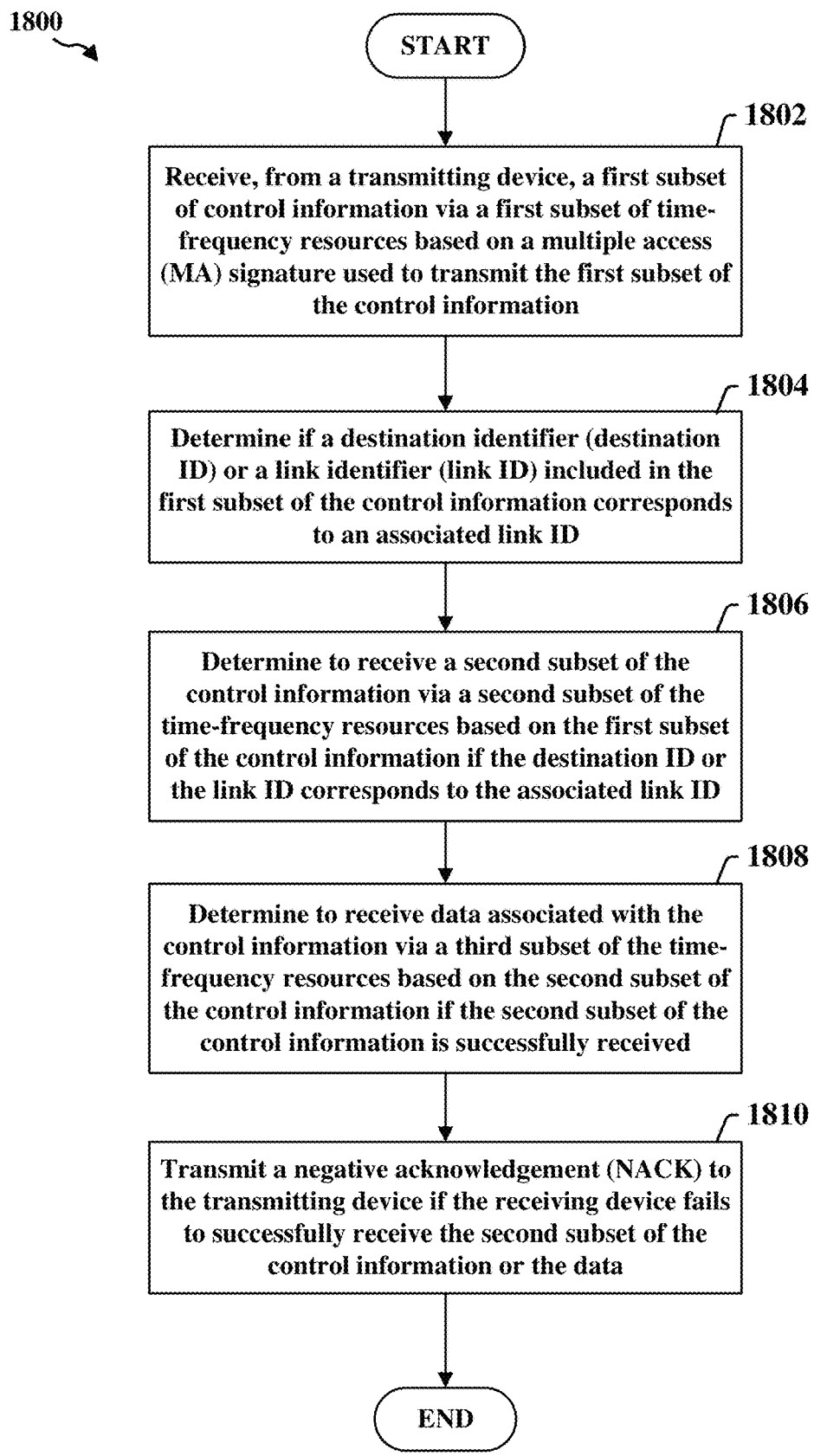
FIG. 18 is a flow chart illustrating an exemplary process for wireless communication at a receiving device according to some aspects of the disclosure.

FIG. 18 is a flow chart illustrating an exemplary process 1800 for wireless communication at a receiving device in accordance with some aspects of the present disclosure. As described below, some or all illustrated features may be omitted in a particular implementation within the scope of the present disclosure, and some illustrated features may not be required for implementation of all aspects. In some examples, the process 1800 may be carried out by the UE 1600 illustrated in FIG. 16. In some examples, the process 1800 may be carried out by any suitable apparatus or means for carrying out the functions or algorithm described below.

At block 1802, the receiving device receives, from a transmitting device, a first subset of control information via a first subset of time-frequency resources. The first subset of the control information is received based on a multiple access (MA) signature used to transmit the first subset of the control information. In aspect, the MA signature distinguishes a transmission of the transmitting device from another transmission of another transmitting device on a same time-frequency resource In a further aspect, the receiving device receives the first subset of the control information by determining a reference symbol (RS) sequence used to transmit the first subset of the control information based on the MA signature and demodulating the first subset of the control information using the RS sequence.

At block 1804, the receiving device determines if a destination identifier (destination ID) or a link identifier (link ID) included in the first subset of the control information corresponds to an associated link ID.

At block 1806, the receiving device determines to receive a second subset of the control information via a second subset of the time-frequency resources based on the first subset of the control information if the destination ID or the link ID corresponds to the associated link ID.

At block 1808, the receiving device determines to receive data associated with the control information via a third subset of the time-frequency resources based on the second subset of the control information if the second subset of the control information is successfully received.

At block 1810, the receiving device transmits a negative acknowledgement (NACK) to the transmitting device if the receiving device fails to successfully receive the second subset of the control information or the data. The NACK may be transmitted using the same MA signature used to transmit the first subset of the control information from the transmitting device.

In an aspect, the receiving device transmits the NACK by determining a reference symbol (RS) sequence based on the MA signature and determining orthogonal time-frequency resources for transmitting the RS sequence based on the MA signature. Thereafter, the receiving device transmits, with the NACK, the RS sequence via the orthogonal time-frequency resources using the MA signature.

In an aspect, the first subset of the control information includes a transmission priority of the second subset of the control information, a transmission priority of the data, a time-frequency resource allocation of the second subset of the control information, a time-frequency resource allocation of the data, or a combination thereof.

In an aspect, the second subset of the control information includes information for decoding the data. For example, the information for decoding the data includes a time-frequency resource location allocated for the data, a modulation and coding scheme (MCS), a transmission mode, or a combination thereof.

In one configuration, the UE 1600 for wireless communication includes means for receiving, from a transmitting device, a first subset of control information via a first subset of time-frequency resources based on a multiple access (MA) signature used to transmit the first subset of the control information, means for determining if a destination identifier (destination ID) or a link identifier (link ID) included in the first subset of the control information corresponds to an associated link ID, means for determining to receive a second subset of the control information via a second subset of the time-frequency resources based on the first subset of the control information if the destination ID or the link ID corresponds to the associated link ID, means for determining to receive data associated with the control information via a third subset of the time-frequency resources based on the second subset of the control information if the second subset of the control information is successfully received, and means for transmitting a negative acknowledgement (NACK) to the transmitting device if the receiving device fails to successfully receive the second subset of the control information or the data In one aspect, the aforementioned means may be the processor 1604 shown in FIG. 16 configured to perform the functions recited by the aforementioned means. In another aspect, the aforementioned means may be a circuit or any apparatus configured to perform the functions recited by the aforementioned means.

Of course, in the above examples, the circuitry included in the processor 1604 is merely provided as an example, and other means for carrying out the described functions may be included within various aspects of the present disclosure, including but not limited to the instructions stored in the computer-readable storage medium 1606, or any other suitable apparatus or means described in any one of the FIGS. 1, 3, 4, 5, and/or 12 and utilizing, for example, the processes and/or algorithms described herein in relation to FIG. 18.

Figure 19:
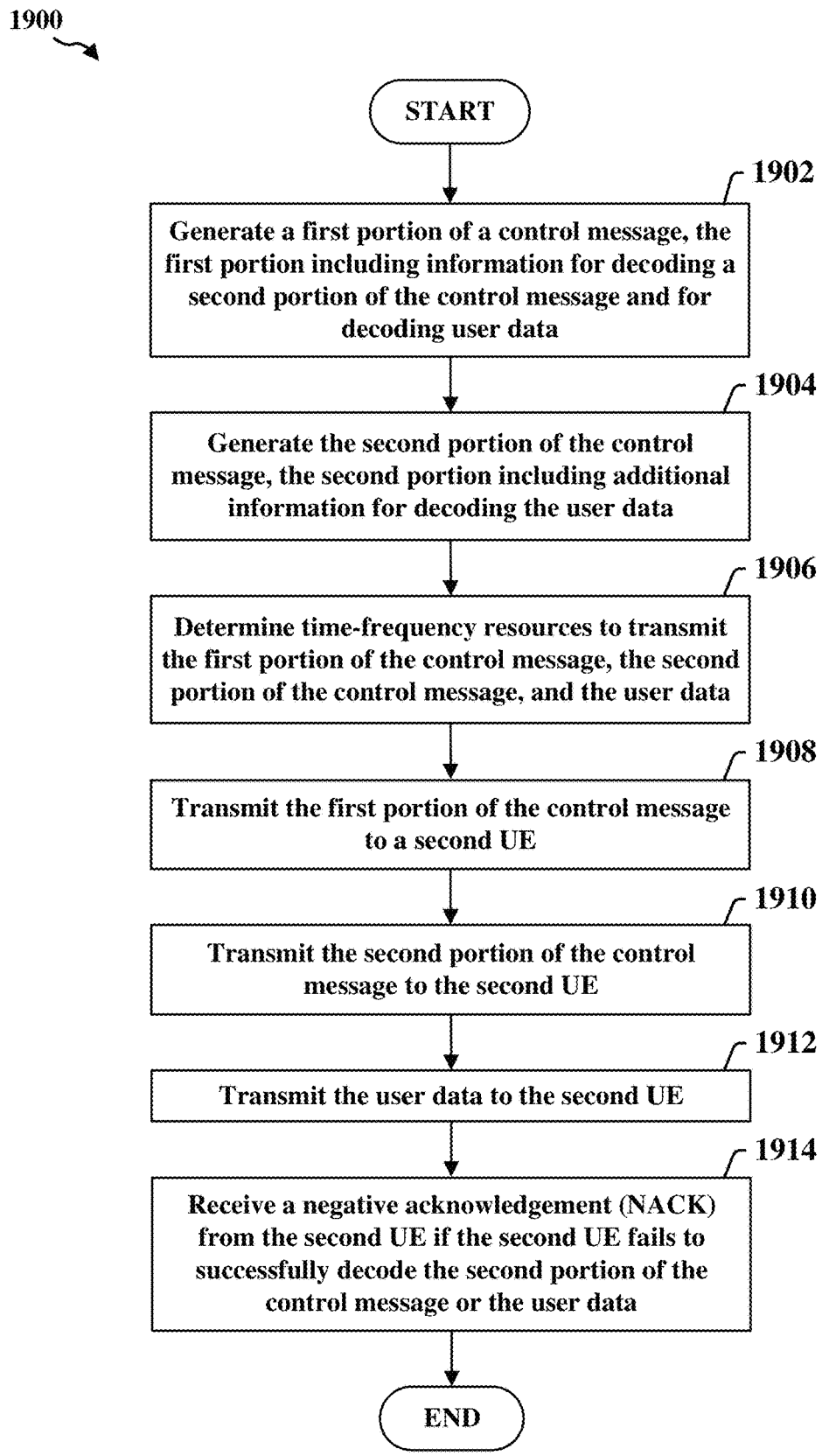
FIG. 19 is a flow chart illustrating an exemplary process for wireless communication at a transmitting UE according to some aspects of the disclosure.

FIG. 19 is a flow chart illustrating an exemplary process 1900 for wireless communication at a first UE (e.g., transmitting device) in accordance with some aspects of the present disclosure. As described below, some or all illustrated features may be omitted in a particular implementation within the scope of the present disclosure, and some illustrated features may not be required for implementation of all aspects. In some examples, the process 1900 may be carried out by the UE 1600 illustrated in FIG. 16. In some examples, the process 1900 may be carried out by any suitable apparatus or means for carrying out the functions or algorithm described below.

At block 1902, the first UE generates a first portion (e.g., first subset) of a control message. The first portion of the control message includes information for decoding a second portion of the control message and for decoding user data. For example, the first portion may include a resource allocation for the second portion of the control message, a resource allocation for a current transmission of the user data, and/or a transmission priority of the user data. The first portion may also include a destination identifier associated with a service for which the user data is being transmitted, a source identifier associated with the service for which the user data is being transmitted, and/or a link identifier determined based on at least one of a link layer identifier associated with the first UE or a link layer identifier associated with a second UE. The first portion may further include a resource allocation for a future transmission or retransmission of the user data, and/or information indicating whether acknowledgment information is to be transmitted by the second UE. In an aspect, the resource allocation for the second portion of the control message may include a transmission priority of the second portion of the control message, a format type of the second portion of the control message, time-frequency resources of the second portion of the control message, and/or an orthogonal frequency division multiplexing (OFDM) symbol location of the second portion of the control message.

At block 1904, the first UE generates a second portion (e.g., second subset) of the control message. The second portion of the control message includes additional information for decoding the user data. For example, the second portion may include a resource allocation for the user data. In an aspect, the resource allocation for the user data indicates a number of slots (e.g., transmission time intervals) that will be occupied by the user data. In another aspect, the resource allocation for the user data indicates one or more resource blocks (e.g., subchannels) that will be occupied by the user data. The second portion may also include a transmission mode, multiple input multiple output (MIMO) layer information, a speed of the first UE, a position of the first UE, a transmit power, information indicating whether the transmission of the user data is a new data transmission or a retransmission, a modulation and coding scheme (MCS), and/or information indicating whether acknowledgment information is to be transmitted by the second UE. The second portion may further include a destination identifier associated with a service for which the user data is being transmitted, a source identifier associated with the service for which the user data is being transmitted, and/or information for determining one or more feedback transmissions by the second UE.

At block 1906, the first UE determines time-frequency resources to transmit the first portion of the control message, the second portion of the control message, and the user data.

At block 1908, the first UE transmits the first portion of the control message to the second UE. At block 1910, the first UE transmits the second portion of the control message to the second UE. At block 1912, the first UE transmits the user data to the second UE.

In an aspect, the second UE is an intended receiver UE of the user data. In another aspect, the second UE is any UE.

In an aspect, the first portion of the control message is transmitted via a first subset of the time-frequency resources, the second portion of the control message is transmitted via a second subset of the time-frequency resources, and the user data is transmitted via a third subset of the time-frequency resources.

In an aspect, the first UE transmits the first portion of the control message by first determining a multiple access (MA) signature. The MA signature distinguishes a transmission of the first UE from another transmission of another UE on a same time-frequency resource. Thereafter, the first UE transmits the first portion of the control message via the first subset of the time-frequency resources using the MA signature.

In an aspect, a format type of the first portion of the control message is independent of a transmission type (e.g., unicast, multicast, or broadcast) of the second portion of the control message. Moreover, a format type of the second portion of the control message varies with respect to a transmission type (e.g., unicast, multicast, or broadcast) of the second portion of the control message. Also, a modulation and coding scheme (MCS) of the first portion of the control message may be different from, or the same as, an MCS of the second portion of the control message.

At block 1914, the first UE receives a negative acknowledgement (NACK) from the second UE if the second UE fails to successfully decode the second portion of the control message or the user data.

In one configuration, the UE 1600 for wireless communication includes means for generating a first portion of a control message, the first portion including information for decoding a second portion of the control message and for decoding user data, means for generating the second portion of the control message, the second portion including additional information for decoding the user data, means for determining time-frequency resources to transmit the first portion of the control message, the second portion of the control message, and the user data, means for transmitting the first portion of the control message to a second UE, means for transmitting the second portion of the control message to the second UE, means for transmitting the user data to the second UE, and means for receiving a negative acknowledgement (NACK) from the second UE if the second UE fails to successfully decode the second portion of the control message or the user data.

In one aspect, the aforementioned means may be the processor 1604 shown in FIG. 16 configured to perform the functions recited by the aforementioned means. In another aspect, the aforementioned means may be a circuit or any apparatus configured to perform the functions recited by the aforementioned means.

Of course, in the above examples, the circuitry included in the processor 1604 is merely provided as an example, and other means for carrying out the described functions may be included within various aspects of the present disclosure, including but not limited to the instructions stored in the computer-readable storage medium 1606, or any other suitable apparatus or means described in any one of the FIGS. 1, 3, 4, 5, and/or 12 and utilizing, for example, the processes and/or algorithms described herein in relation to FIG. 19.

Figure 20:
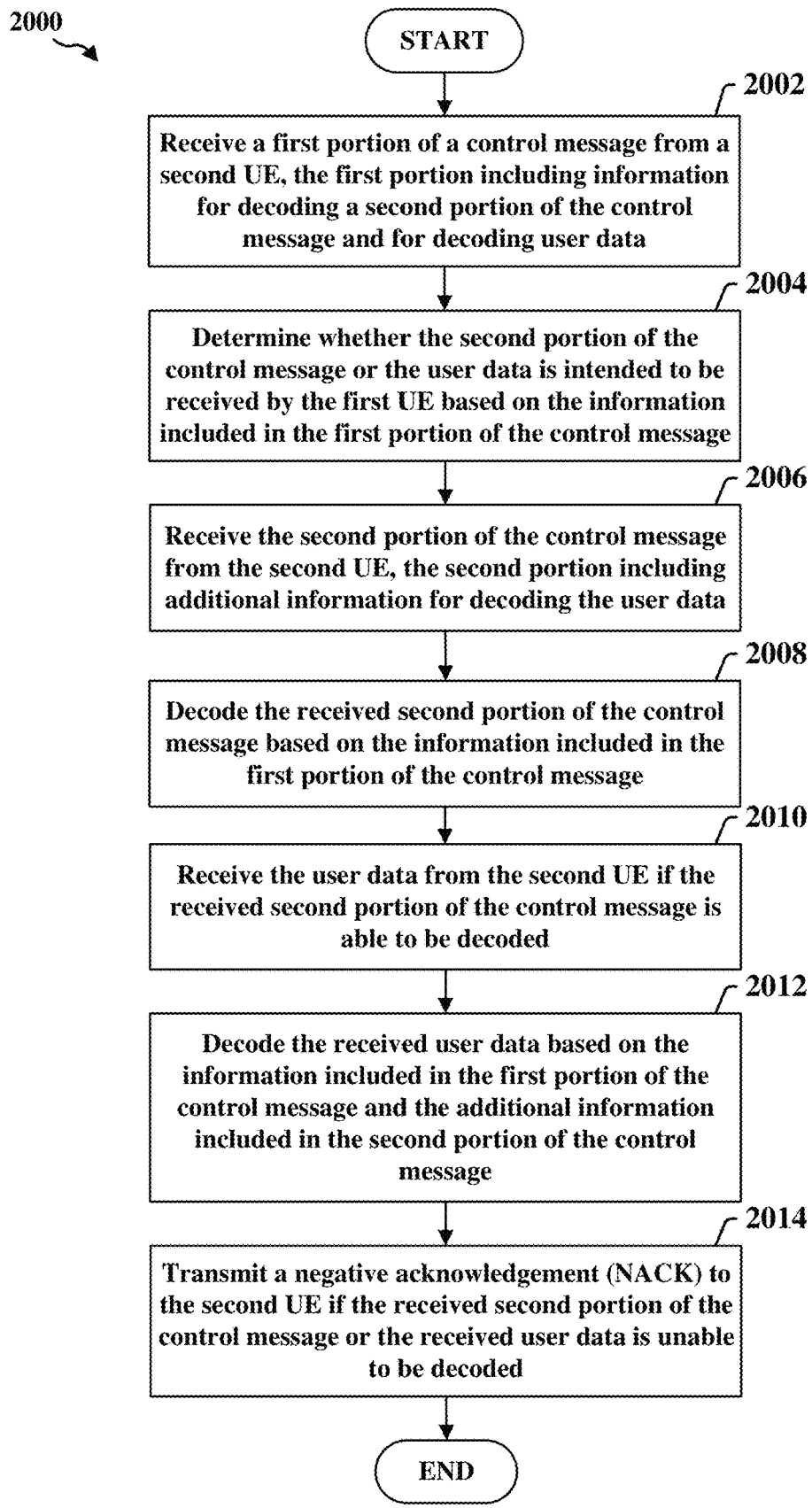
FIG. 20 is a flow chart illustrating an exemplary process for wireless communication at a receiving UE according to some aspects of the disclosure.

FIG. 20 is a flow chart illustrating an exemplary process 2000 for wireless communication at a first UE (e.g., receiving device) in accordance with some aspects of the present disclosure. As described below, some or all illustrated features may be omitted in a particular implementation within the scope of the present disclosure, and some illustrated features may not be required for implementation of all aspects. In some examples, the process 2000 may be carried out by the UE 1600 illustrated in FIG. 16. In some examples, the process 2000 may be carried out by any suitable apparatus or means for carrying out the functions or algorithm described below.

At block 2002, the first UE receives a first portion (e.g., first subset) of a control message from a second UE. The first portion includes information for decoding a second portion (e.g., second subset) of the control message and for decoding user data. For example, the first portion may include a resource allocation for the second portion of the control message, a resource allocation for a current transmission of the user data, and/or a transmission priority of the user data. The first portion may also include a destination identifier associated with a service for which the user data is being received, a source identifier associated with the service for which the user data is being received, and/or a link identifier determined based on at least one of a link layer identifier associated with the first UE or a link layer identifier associated with the second UE. The first portion may further include a resource allocation for a future transmission or retransmission of the user data and/or information indicating whether acknowledgment information is to be transmitted by the first UE. In an aspect, the resource allocation for the second portion of the control message may include a transmission priority of the second portion of the control message, a format type of the second portion of the control message, time-frequency resources of the second portion of the control message, and/or an orthogonal frequency division multiplexing (OFDM) symbol location of the second portion of the control message.

At block 2004, the first UE determines whether the second portion of the control message or the user data is intended to be received by the first UE based on the information included in the first portion of the control message. As such, the second portion of the control message is received if the second portion or the user data is intended to be received by the first UE.

At block 2006, the first UE receives the second portion of the control message from the second UE. The second portion includes additional information for decoding the user data. For example, the second portion may include a resource allocation for the user data. In an aspect, the resource allocation for the user data indicates a number of slots (e.g., transmission time intervals) that will be occupied by the user data. In another aspect, the resource allocation for the user data indicates one or more resource blocks (e.g., subchannels) that will be occupied by the user data. The second portion may further include a transmission mode, multiple input multiple output (MIMO) layer information, a speed of the second UE, a position of the second UE, a transmit power, information indicating whether a transmission of the user data is a new data transmission or a retransmission, a modulation and coding scheme (MCS), and/or information indicating whether acknowledgment information is to be transmitted by the first UE. The second portion may further include a destination identifier associated with a service for which the user data is being received, a source identifier associated with the service for which the user data is being received, and/or information for determining one or more feedback transmissions by the first UE.

At block 2008, the first UE decodes the received second portion of the control message based on the information included in the first portion of the control message and may determine whether the user data is intended to be received by the first UE based on the additional information included in the second portion of the control message. At block 2010, the first UE receives the user data from the second UE if the received second portion of the control message is able to be decoded. At block 2012, the first UE decodes the received user data based on the information included in the first portion of the control message and the additional information included in the second portion of the control message. In an aspect, when decoding the received user data, the first UE discards the user data if the first UE is an unintended receiver of the user data.

In an aspect, the first portion of the control message is received via a first subset of time-frequency resources, the second portion of the control message is received via a second subset of the time-frequency resources, and the user data is received via a third subset of the time-frequency resources. In an aspect, the first UE receives the first portion of the control message by first determining a multiple access (MA) signature used to transmit the first portion of the control message. The MA signature distinguishes a transmission of the second UE from another transmission of another UE on a same time-frequency resource. Thereafter, the first UE receives the first portion of the control message via the first subset of the time-frequency resources based on the MA signature.

In an aspect, a format type of the first portion of the control message is independent of a transmission type (e.g., unicast, multicast, or broadcast) of the second portion of the control message. Also, a format type of the second portion of the control message varies with respect to a transmission type (e.g., unicast, multicast, or broadcast) of the second portion of the control message. Moreover, a modulation and coding scheme (MCS) of the first portion of the control message may be different from, or the same as, an MCS of the second portion of the control message.

At block 2014, the first UE transmits a negative acknowledgement (NACK) to the second UE if the received second portion of the control message or the received user data is unable to be decoded.

In one configuration, the UE 1600 for wireless communication includes means for receiving a first portion of a control message from a second UE, the first portion including information for decoding a second portion of the control message and for decoding user data, means for determining whether the second portion of the control message or the user data is intended to be received by the first UE based on the information included in the first portion of the control message, means for receiving the second portion of the control message from the second UE, the second portion including additional information for decoding the user data, means for decoding the received second portion of the control message based on the information included in the first portion of the control message, means for determining whether the user data is intended to be received by the first UE based on the additional information included in the second portion of the control message, means for receiving the user data from the second UE if the received second portion of the control message is able to be decoded, means for decoding the received user data based on the information included in the first portion of the control message and the additional information included in the second portion of the control message, and means for transmitting a negative acknowledgement (NACK) to the second UE if the received second portion of the control message or the received user data is unable to be decoded.

In one aspect, the aforementioned means may be the processor 1604 shown in FIG. 16 configured to perform the functions recited by the aforementioned means. In another aspect, the aforementioned means may be a circuit or any apparatus configured to perform the functions recited by the aforementioned means.

Of course, in the above examples, the circuitry included in the processor 1604 is merely provided as an example, and other means for carrying out the described functions may be included within various aspects of the present disclosure, including but not limited to the instructions stored in the computer-readable storage medium 1606, or any other suitable apparatus or means described in any one of the FIGS. 1, 3, 4, 5, and/or 12 and utilizing, for example, the processes and/or algorithms described herein in relation to FIG. 20.

Figure 21:
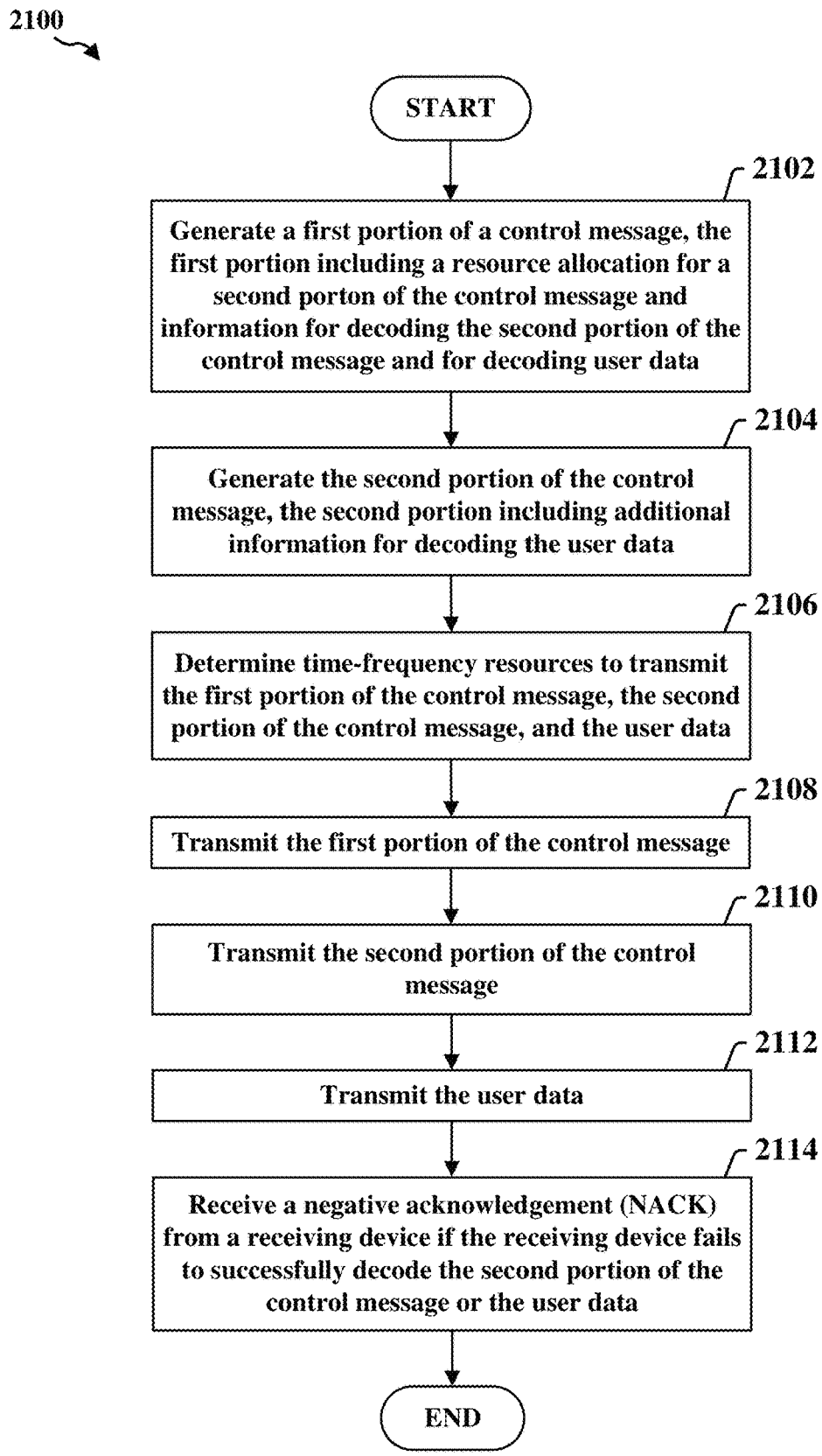
FIG. 21 is a flow chart illustrating another exemplary process for wireless communication at a transmitting UE according to some aspects of the disclosure.

FIG. 21 is a flow chart illustrating an exemplary process 2100 for wireless communication at a UE (e.g., transmitting device) in accordance with some aspects of the present disclosure. As described below, some or all illustrated features may be omitted in a particular implementation within the scope of the present disclosure, and some illustrated features may not be required for implementation of all aspects. In some examples, the process 2100 may be carried out by the UE 1600 illustrated in FIG. 16. In some examples, the process 2100 may be carried out by any suitable apparatus or means for carrying out the functions or algorithm described below.

At block 2102, the UE generates a first portion (e.g., first subset) of a control message. The first portion of the control message includes a resource allocation for a second portion of the control message and information for decoding the second portion of the control message and for decoding user data. The first portion may also include a resource allocation for a current transmission of the user data and/or a transmission priority of the user data. The first portion may also include a destination identifier associated with a service for which the user data is being transmitted, a source identifier associated with the service for which the user data is being transmitted, and/or a link identifier determined based on at least one of a link layer identifier associated with the UE or a link layer identifier associated with a receiving device (e.g. second UE, base station, etc.). The first portion may further include a resource allocation for a future transmission or retransmission of the user data and/or information indicating whether acknowledgment information is to be transmitted by the receiving device. In an aspect, the resource allocation for the second portion of the control message may include a transmission priority of the second portion of the control message, a format type of the second portion of the control message, time-frequency resources of the second portion of the control message, and/or an orthogonal frequency division multiplexing (OFDM) symbol location of the second portion of the control message.

At block 2104, the UE generates a second portion (e.g., second subset) of the control message. The second portion of the control message includes additional information for decoding the user data. For example, the second portion may include a resource allocation for the user data. In an aspect, the resource allocation for the user data indicates a number of slots (e.g., transmission time intervals) that will be occupied by the user data. In another aspect, the resource allocation for the user data indicates one or more resource blocks (e.g., subchannels) that will be occupied by the user data. The second portion may also include a transmission mode, multiple input multiple output (MIMO) layer information, a speed of the UE, a position of the UE, a transmit power, information indicating whether the transmission of the user data is a new data transmission or a retransmission, a modulation and coding scheme (MCS), and/or information indicating whether acknowledgment information is to be transmitted by the receiving device. The second portion may further include a destination identifier associated with a service for which the user data is being transmitted, a source identifier associated with the service for which the user data is being transmitted, and/or information for determining one or more feedback transmissions by the receiving device.

At block 2106, the UE determines time-frequency resources to transmit the first portion of the control message, the second portion of the control message, and the user data.

At block 2108, the UE transmits the first portion of the control message. At block 2110, the UE transmits the second portion of the control message. At block 2112, the UE transmits the user data. In an aspect, the first portion of the control message is transmitted via a first subset of the time-frequency resources, the second portion of the control message is transmitted via a second subset of the time-frequency resources, and the user data is transmitted via a third subset of the time-frequency resources.

In an aspect, the UE transmits the first portion of the control message by first determining a multiple access (MA) signature. The MA signature distinguishes a transmission of the UE from another transmission of another UE on a same time-frequency resource. Thereafter, the UE transmits the first portion of the control message via the first subset of the time-frequency resources using the MA signature.

In an aspect, a format type of the first portion of the control message is independent of a transmission type (e.g., unicast, multicast, or broadcast) of the second portion of the control message. Moreover, a format type of the second portion of the control message varies with respect to a transmission type (e.g., unicast, multicast, or broadcast) of the second portion of the control message. Also, a modulation and coding scheme (MCS) of the first portion of the control message may be different from, or the same as, an MCS of the second portion of the control message.

At block 2114, the UE receives a negative acknowledgement (NACK) from a receiving device if the receiving device fails to successfully decode the second portion of the control message or the user data.

In one configuration, the UE 1600 for wireless communication includes means for generating a first portion of a control message, the first portion including a resource allocation for a second portion of the control message and information for decoding the second portion of the control message and for decoding user data, means for generating the second portion of the control message, the second portion including additional information for decoding the user data, means for determining time-frequency resources to transmit the first portion of the control message, the second portion of the control message, and the user data, means for transmitting the first portion of the control message, means for transmitting the second portion of the control message, means for transmitting the user data, and means for receiving a negative acknowledgement (NACK) from a receiving device if the receiving device fails to successfully decode the second portion of the control message or the user data.

In one aspect, the aforementioned means may be the processor 1604 shown in FIG. 16 configured to perform the functions recited by the aforementioned means. In another aspect, the aforementioned means may be a circuit or any apparatus configured to perform the functions recited by the aforementioned means.

Of course, in the above examples, the circuitry included in the processor 1604 is merely provided as an example, and other means for carrying out the described functions may be included within various aspects of the present disclosure, including but not limited to the instructions stored in the computer-readable storage medium 1606, or any other suitable apparatus or means described in any one of the FIGS. 1, 3, 4, 5, and/or 12 and utilizing, for example, the processes and/or algorithms described herein in relation to FIG. 21.

Figure 22:
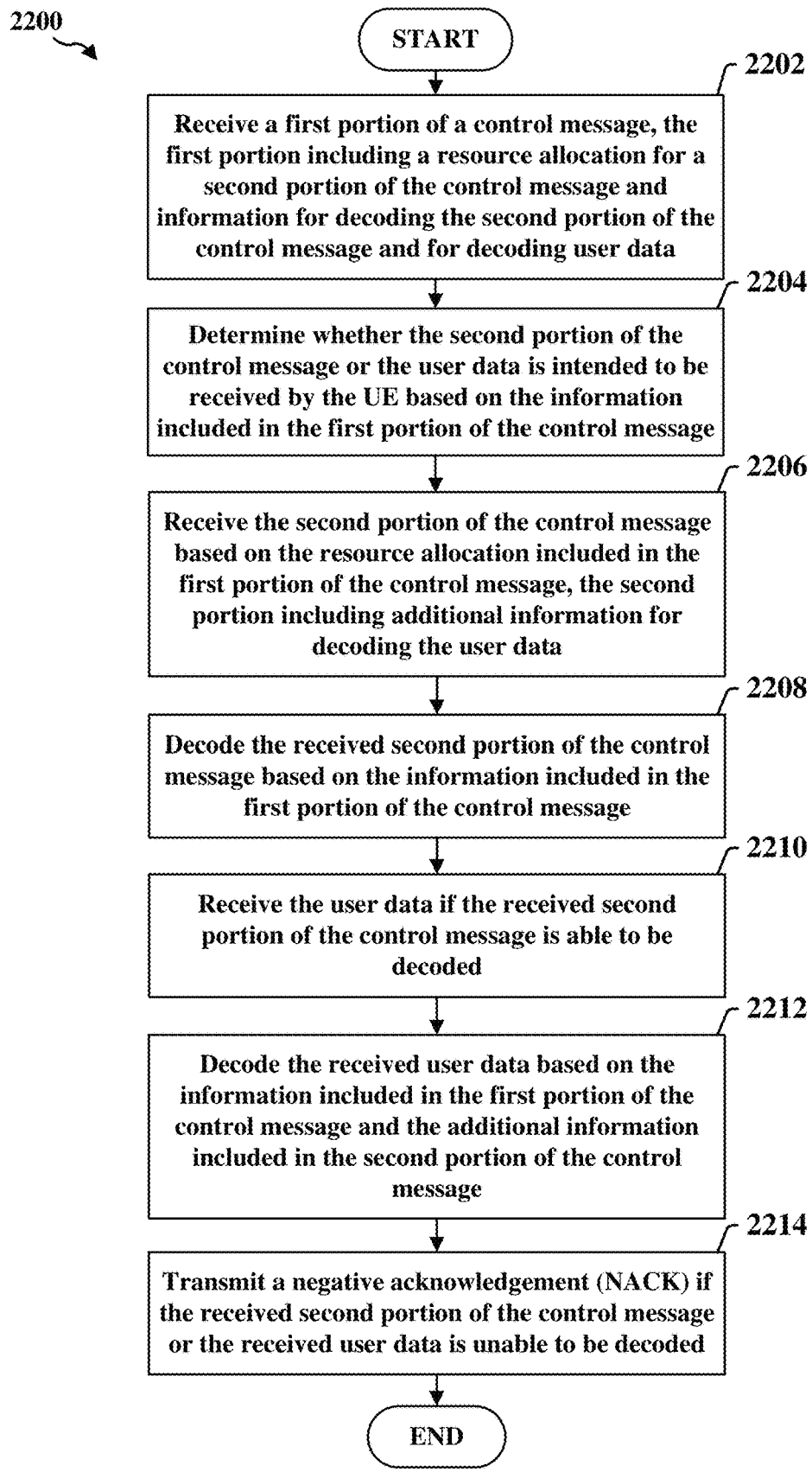
FIG. 22 is a flow chart illustrating another exemplary process for wireless communication at a receiving UE according to some aspects of the disclosure.

FIG. 22 is a flow chart illustrating an exemplary process 2200 for wireless communication at a UE (e.g., receiving device) in accordance with some aspects of the present disclosure. As described below, some or all illustrated features may be omitted in a particular implementation within the scope of the present disclosure, and some illustrated features may not be required for implementation of all aspects. In some examples, the process 2200 may be carried out by the UE 1600 illustrated in FIG. 16. In some examples, the process 2200 may be carried out by any suitable apparatus or means for carrying out the functions or algorithm described below.

At block 2202, the UE receives a first portion (e.g. first subset) of a control message. The first portion includes a resource allocation for a second portion (e.g., second subset) of the control message and information for decoding the second portion of the control message and for decoding user data. For example, the first portion may include a resource allocation for a current transmission of the user data and/or a transmission priority of the user data. The first portion may also include a destination identifier associated with a service for which the user data is being received, a source identifier associated with the service for which the user data is being received, and/or a link identifier determined based on at least one of a link layer identifier associated with the UE or a link layer identifier associated with a transmitting device (e.g., second UE, base station, etc.). The first portion may further include a resource allocation for a future transmission or retransmission of the user data and/or information indicating whether acknowledgment information is to be transmitted by the UE. In an aspect, the resource allocation for the second portion of the control message may include a transmission priority of the second portion of the control message, a format type of the second portion of the control message, time-frequency resources of the second portion of the control message, and/or an orthogonal frequency division multiplexing (OFDM) symbol location of the second portion of the control message.

At block 2204, the UE determines whether the second portion of the control message or the user data is intended to be received by the UE based on the information included in the first portion of the control message. As such, the second portion of the control message is received if the second portion or the user data is intended to be received by the UE.

At block 2206, the UE receives the second portion of the control message based on the resource allocation included in the first portion of the control message. The second portion includes additional information for decoding the user data. For example, the second portion may include a resource allocation for the user data. In an aspect, the resource allocation for the user data indicates a number of slots (e.g., transmission time intervals) that will be occupied by the user data. In another aspect, the resource allocation for the user data indicates one or more resource blocks (e.g. subchannels) that will be occupied by the user data. The second portion may further include a transmission mode, multiple input multiple output (MIMO) layer information, a speed of a transmitting device, a position of the transmitting device, a transmit power, information indicating whether a transmission of the user data is a new data transmission or a retransmission, a modulation and coding scheme (MCS), and/or information indicating whether acknowledgment information is to be transmitted by the UE. The second portion may further include a destination identifier associated with a service for which the user data is being received, a source identifier associated with the service for which the user data is being received, and/or information for determining one or more feedback transmissions by the UE.

At block 2208, the UE decodes the received second portion of the control message based on the information included in the first portion of the control message and may determine whether the user data is intended to be received by the UE based on the additional information included in the second portion of the control message. At block 2210, the UE receives the user data if the received second portion of the control message is able to be decoded. At block 2012, the UE decodes the received user data based on the information included in the first portion of the control message and the additional information included in the second portion of the control message. In an aspect, when decoding the received user data, the UE discards the user data if the UE is an unintended receiver of the user data.

In an aspect, the first portion of the control message is received via a first subset of time-frequency resources, the second portion of the control message is received via a second subset of the time-frequency resources, and the user data is received via a third subset of the time-frequency resources. In an aspect, the UE receives the first portion of the control message by first determining a multiple access (MA) signature used to transmit the first portion of the control message. The MA signature distinguishes a transmission of a transmitting device from another transmission of another transmitting device on a same time-frequency resource. Thereafter, the UE receives the first portion of the control message via the first subset of the time-frequency resources based on the MA signature.

In an aspect, a format type of the first portion of the control message is independent of a transmission type (e.g., unicast, multicast, or broadcast) of the second portion of the control message. Also, a format type of the second portion of the control message varies with respect to a transmission type (e.g., unicast, multicast, or broadcast) of the second portion of the control message. Moreover, a modulation and coding scheme (MCS) of the first portion of the control message may be different from, or the same as, an MCS of the second portion of the control message.

At block 2214, the UE transmits a negative acknowledgement (NACK) if the received second portion of the control message or the received user data is unable to be decoded.

In one configuration, the UE 1600 for wireless communication includes means for receiving a first portion of a control message, the first portion including a resource allocation for a second portion of the control message and information for decoding the second portion of the control message and for decoding user data, means for determining whether the second portion of the control message or the user data is intended to be received by the UE based on the information included in the first portion of the control message, means for receiving the second portion of the control message based on the resource allocation included in the first portion of the control message, the second portion including additional information for decoding the user data, means for decoding the received second portion of the control message based on the information included in the first portion of the control message, means for determining whether the user data is intended to be received by the UE based on the additional information included in the second portion of the control message, means for receiving the user data if the received second portion of the control message is able to be decoded, means for decoding the received user data based on the information included in the first portion of the control message and the additional information included in the second portion of the control message, and means for transmitting a negative acknowledgement (NACK) if the received second portion of the control message or the received user data is unable to be decoded.

In one aspect, the aforementioned means may be the processor 1604 shown in FIG. 16 configured to perform the functions recited by the aforementioned means. In another aspect, the aforementioned means may be a circuit or any apparatus configured to perform the functions recited by the aforementioned means.

Of course, in the above examples, the circuitry included in the processor 1604 is merely provided as an example, and other means for carrying out the described functions may be included within various aspects of the present disclosure, including but not limited to the instructions stored in the computer-readable storage medium 1606, or any other suitable apparatus or means described in any one of the FIGS. 1, 3, 4, 5, and/or 12 and utilizing, for example, the processes and/or algorithms described herein in relation to FIG. 22.

It should be noted that the methods described above describe possible implementations, and that the operations and the steps may be rearranged or otherwise modified and that other implementations are possible. Further, aspects from two or more of the methods may be combined.

Example 1

A method of wireless communication at a first user equipment (UE), comprising transmitting a first portion of a control message to a second UE, the first portion comprising information for decoding a second portion of the control message and for decoding user data; transmitting the second portion of the control message to the second UE, the second portion comprising additional information for decoding the user data; and transmitting the user data to the second UE.

Example 2

The method of example 1, further comprising generating the first portion of the control message; and generating the second portion of the control message.

Example 3

The method of any of examples 1 or 2, wherein the first portion of the control message further comprises a resource allocation for the second portion of the control message; a resource allocation for a current transmission of the user data; a transmission priority of the user data; a destination identifier associated with a service for which the user data is being transmitted; a source identifier associated with the service for which the user data is being transmitted; a link identifier determined based on at least one of a link layer identifier associated with the first UE or a link layer identifier associated with the second UE; a resource allocation for a future transmission or retransmission of the user data; or information indicating whether acknowledgment information is to be transmitted by the second UE.

Example 4

The method of any of examples 1 to 3, wherein the resource allocation for the second portion of the control message comprises one or more of time-frequency resources of the second portion of the control message; an orthogonal frequency division multiplexing (OFDM) symbol location of the second portion of the control message; a format type of the second portion of the control message; or a transmission priority of the second portion of the control message.

Example 5

The method of any of examples 1 to 4, wherein the second UE is one of an intended receiver UE of the user data; or any UE.

Example 6

The method of any of examples 1 to 5, further comprising receiving a negative acknowledgement (NACK) from the second UE if the second UE fails to successfully decode the user data. The method of any of examples 1 to 5, further comprising receiving a negative acknowledgement (NACK) from the second UE if the second UE fails to successfully decode the second portion of the control message.

Example 7

The method of any of examples 1 to 6, wherein the second portion of the control message comprises one or more of a resource allocation for the user data; a transmission mode; multiple input multiple output (MIMO) layer information; a speed of the first UE; a position of the first UE; a transmit power; information indicating whether the transmission of the user data is a new data transmission or a retransmission; a modulation and coding scheme (MCS); information indicating whether acknowledgment information is to be transmitted by the second UE; a destination identifier associated with a service for which the user data is being transmitted; a source identifier associated with the service for which the user data is being transmitted; or information for determining one or more feedback transmissions by the second UE.

Example 8

The method of any of examples 1 to 7, wherein the resource allocation for the user data indicates a number of slots that will be occupied by the user data.

Example 9

The method of any examples 1 to 8, wherein the resource allocation for the user data indicates one or more subchannels that will be occupied by the user data.

Example 10

The method of any of examples 1 to 9, wherein a format type of the first portion of the control message is independent of a transmission type of the second portion of the control message; and a format type of the second portion of the control message varies with respect to a transmission type of the second portion of the control message.

Example 11

The method of any of examples 1 to 10, wherein a modulation and coding scheme (MCS) of the first portion of the control message is different from an MCS of the second portion of the control message. The method of any of examples 1 to 10, wherein a modulation and coding scheme (MCS) of the first portion of the control message is the same as an MCS of the second portion of the control message.

Example 12

The method of any of examples 1 to 11, further comprising determining time-frequency resources to transmit the first portion of the control message, the second portion of the control message, and the user data, wherein the first portion of the control message is transmitted via a first subset of the time-frequency resources, wherein the second portion of the control message is transmitted via a second subset of the time-frequency resources, and wherein the user data is transmitted via a third subset of the time-frequency resources.

Example 13

The method of any of examples 1 to 12, wherein the transmitting the first portion of the control message comprises determining a multiple access (MA) signature for distinguishing a transmission of the first UE from another transmission of another UE on a same time-frequency resource; and transmitting the first portion of the control message via the first subset of the time-frequency resources using the MA signature.

Example 14

A first user equipment (UE) for wireless communication comprising at least one processor and a memory coupled to the at least one processor, the at least one processor and the memory configured to perform a method of any of examples 1 to 13.

Example 15

A first user equipment (UE) for wireless communication comprising at least one means for performing a method of any of examples 1 to 13.

Example 16

A non-transitory computer-readable medium storing computer-executable code at a first user equipment (UE), comprising code for causing a computer to perform a method of any of examples 1 to 13.

Example 17

A method of wireless communication at a user equipment (UE), comprising transmitting a first portion of a control message, the first portion comprising a resource allocation for a second portion of the control message and information for decoding the second portion of the control message and for decoding user data; transmitting the second portion of the control message, the second portion comprising additional information for decoding the user data; and transmitting the user data.

Example 18

The method of example 17, further comprising generating the first portion of the control message; and generating the second portion of the control message.

Example 19

The method of any of examples 17 or 18, wherein the first portion of the control message further comprises one or more of a resource allocation for a current transmission of the user data; a transmission priority of the user data; a destination identifier associated with a service for which the user data is being transmitted; a source identifier associated with the service for which the user data is being transmitted; a link identifier determined based on at least one of a link layer identifier associated with the UE or a link layer identifier associated with a receiving device; a resource allocation for a future transmission or retransmission of the user data; or information indicating whether acknowledgment information is to be transmitted by the receiving device.

Example 20

The method of any of examples 17 to 19, further comprising receiving a negative acknowledgement (NACK) from a receiving device if the receiving device fails to successfully decode the user data. The method of any of examples 17 to 19, further comprising receiving a negative acknowledgement (NACK) from a receiving device if the receiving device fails to successfully decode the second portion of the control message.

Example 21

The method of any of examples 17 to 20, wherein the resource allocation for the second portion of the control message comprises one or more of time-frequency resources of the second portion of the control message; an orthogonal frequency division multiplexing (OFDM) symbol location of the second portion of the control message; a format type of the second portion of the control message; or a transmission priority of the second portion of the control message.

Example 22

The method of any of examples 17 to 21, wherein the second portion of the control message comprises one or more of a resource allocation for the user data; a transmission mode; multiple input multiple output (MIMO) layer information; a speed of the UE; a position of the UE; a transmit power; information indicating whether the transmission of the user data is a new data transmission or a retransmission; a modulation and coding scheme (MCS); information indicating whether acknowledgment information is to be transmitted by a receiving device; a destination identifier associated with a service for which the user data is being transmitted; a source identifier associated with the service for which the user data is being transmitted; or information for determining one or more feedback transmissions by the receiving device.

Example 23

The method of any of examples 17 to 22, wherein the resource allocation for the user data indicates a number of slots that will be occupied by the user data.

Example 24

The method of any of examples 17 to 23, wherein the resource allocation for the user data indicates one or more subchannels that will be occupied by the user data.

Example 25

The method of any of examples 17 to 24, wherein a format type of the first portion of the control message is independent of a transmission type of the second portion of the control message; and a format type of the second portion of the control message varies with respect to a transmission type of the second portion of the control message.

Example 26

The method of any of examples 17 to 25, wherein a modulation and coding scheme (MCS) of the first portion of the control message is different from an MCS of the second portion of the control message. The method of any of examples 17 to 25, wherein a modulation and coding scheme (MCS) of the first portion of the control message is the same as an MCS of the second portion of the control message.

Example 27

The method of any of examples 17 to 26, further comprising determining time-frequency resources to transmit the first portion of the control message, the second portion of the control message, and the user data, wherein the first portion of the control message is transmitted via a first subset of the time-frequency resources, wherein the second portion of the control message is transmitted via a second subset of the time-frequency resources, and wherein the user data is transmitted via a third subset of the time-frequency resources.

Example 28

The method of any of examples 17 to 27, wherein the transmitting the first portion of the control message comprises determining a multiple access (MA) signature for distinguishing a transmission of the UE from another transmission of another UE on a same time-frequency resource; and transmitting the first portion of the control message via the first subset of the time-frequency resources using the MA signature.

Example 29

A user equipment (UE) for wireless communication comprising at least one processor and a memory coupled to the at least one processor, the at least one processor and the memory configured to perform a method of any of examples 17 to 28.

Example 30

A user equipment (UE) for wireless communication comprising at least one means for performing a method of any of examples 17 to 28.

Example 31

A non-transitory computer-readable medium storing computer-executable code at a user equipment (UE), comprising code for causing a computer to perform a method of any of examples 17 to 28.

Example 32

A method of wireless communication at a first user equipment (UE), comprising receiving a first portion of a control message from a second UE, the first portion including information for decoding a second portion of the control message and for decoding user data; receiving the second portion of the control message from the second UE, the second portion including additional information for decoding the user data; decoding the received second portion of the control message based on the information included in the first portion of the control message; receiving the user data from the second UE if the received second portion of the control message is able to be decoded; and decoding the received user data based on the information included in the first portion of the control message and the additional information included in the second portion of the control message.

Example 33

The method of example 32, further comprising determining whether the second portion of the control message or the user data is intended to be received by the first UE based on the information included in the first portion of the control message. The method of example 32, further comprising determining whether the user data is intended to be received by the first UE based on the additional information included in the second portion of the control message.

Example 34

The method of any of examples 32 or 33, wherein the second portion of the control message is received if the second portion or the user data is intended to be received by the first UE.

Example 35

The method of any of examples 32 to 34, wherein the decoding the received user data includes discarding the user data if the first UE is an unintended receiver of the user data.

Example 36

The method of any of examples 32 to 35, further comprising transmitting a negative acknowledgement (NACK) to the second UE if the received user data is unable to be decoded. The method of any of examples 32 to 35, further comprising transmitting a negative acknowledgement (NACK) to the second UE if the received second portion of the control message is unable to be decoded.

Example 37

The method of any of examples 32 to 36, wherein the first portion of the control message includes a resource allocation for the second portion of the control message; a resource allocation for a current transmission of the user data; a transmission priority of the user data; a destination identifier associated with a service for which the user data is being received; a source identifier associated with the service for which the user data is being received; a link identifier determined based on at least one of a link layer identifier associated with the first UE or a link layer identifier associated with the second UE; a resource allocation for a future transmission or retransmission of the user data; or information indicating whether acknowledgment information is to be transmitted by the first UE.

Example 38

The method of any of examples 32 to 37, wherein the resource allocation for the second portion of the control message includes one or more of time-frequency resources of the second portion of the control message; an orthogonal frequency division multiplexing (OFDM) symbol location of the second portion of the control message; a format type of the second portion of the control message; or a transmission priority of the second portion of the control message.

Example 39

The method of any of examples 32 to 38, wherein the second portion of the control message includes one or more of a resource allocation for the user data; a transmission mode; multiple input multiple output (MIMO) layer information; a speed of the second UE; a position of the second UE; a transmit power; information indicating whether a transmission of the user data is a new data transmission or a retransmission; a modulation and coding scheme (MCS); information indicating whether acknowledgment information is to be transmitted by the first UE; a destination identifier associated with a service for which the user data is being received; a source identifier associated with the service for which the user data is being received; or information for determining one or more feedback transmissions by the first UE.

Example 40

The method of any of examples 32 to 39, wherein the resource allocation for the user data indicates a number of slots that will be occupied by the user data.

Example 41

The method of any of examples 32 to 40, wherein the resource allocation for the user data indicates one or more subchannels that will be occupied by the user data.

Example 42

The method of any of examples 32 to 41, wherein a format type of the first portion of the control message is independent of a transmission type of the second portion of the control message; and a format type of the second portion of the control message varies with respect to a transmission type of the second portion of the control message.

Example 43

The method of any of examples 32 to 42, wherein a modulation and coding scheme (MCS) of the first portion of the control message is different from an MCS of the second portion of the control message. The method of any of examples 32 to 42, wherein a modulation and coding scheme (MCS) of the first portion of the control message is the same as an MCS of the second portion of the control message.

Example 44

The method of any of examples 32 to 43, wherein the first portion of the control message is received via a first subset of time-frequency resources, the second portion of the control message is received via a second subset of the time-frequency resources, and the user data is received via a third subset of the time-frequency resources.

Example 45

The method of any of examples 32 to 44, wherein the receiving the first portion of the control message comprises determining a multiple access (MA) signature used to transmit the first portion of the control message, the MA signature distinguishing a transmission of the second UE from another transmission of another UE on a same time-frequency resource; and receiving the first portion of the control message via the first subset of the time-frequency resources based on the MA signature.

Example 46

A first user equipment (UE) for wireless communication comprising at least one processor and a memory coupled to the at least one processor, the at least one processor and the memory configured to perform a method of any of examples 32 to 45.

Example 47

A first user equipment (UE) for wireless communication comprising at least one means for performing a method of any of examples 32 to 45.

Example 48

A non-transitory computer-readable medium storing computer-executable code at a first user equipment (UE), comprising code for causing a computer to perform a method of any of examples 32 to 45.

Example 49

A method of wireless communication at a user equipment (UE), comprising receiving a first portion of a control message, the first portion including a resource allocation for a second portion of the control message and information for decoding the second portion of the control message and for decoding user data; receiving the second portion of the control message based on the resource allocation included in the first portion of the control message, the second portion including additional information for decoding the user data; decoding the received second portion of the control message based on the information included in the first portion of the control message; receiving the user data if the received second portion of the control message is able to be decoded; and decoding the received user data based on the information included in the first portion of the control message and the additional information included in the second portion of the control message.

Example 50

The method of example 49, further comprising determining whether the second portion of the control message or the user data is intended to be received by the UE based on the information included in the first portion of the control message. The method of example 49, further comprising determining whether the user data is intended to be received by the UE based on the additional information included in the second portion of the control message.

Example 51

The method of any of examples 49 or 50, wherein the second portion of the control message is received if the second portion or the user data is intended to be received by the UE.

Example 52

The method of any of examples 49 to 51, wherein the decoding the received user data includes discarding the user data if the UE is an unintended receiver of the user data.

Example 53

The method of any of examples 49 to 52, further comprising transmitting a negative acknowledgement (NACK) if the received user data is unable to be decoded. The method of any of examples 49 to 52, further comprising transmitting a negative acknowledgement (NACK) if the received second portion of the control message is unable to be decoded.

Example 54

The method of any of examples 49 to 53, wherein the first portion of the control message further includes one or more of a resource allocation for a current transmission of the user data; a transmission priority of the user data; a destination identifier associated with a service for which the user data is being received; a source identifier associated with the service for which the user data is being received; a link identifier determined based on at least one of a link layer identifier associated with the UE or a link layer identifier associated with a transmitting device; a resource allocation for a future transmission or retransmission of the user data; or information indicating whether acknowledgment information is to be transmitted by the UE.

Example 55

The method of any of examples 49 to 54, wherein the resource allocation for the second portion of the control message includes one or more of time-frequency resources of the second portion of the control message; an orthogonal frequency division multiplexing (OFDM) symbol location of the second portion of the control message; a format type of the second portion of the control message; or a transmission priority of the second portion of the control message.

Example 56

The method of any of examples 49 to 55, wherein the second portion of the control message comprises one or more of a resource allocation for the user data; a transmission mode; multiple input multiple output (MIMO) layer information; a speed of a transmitting device; a position of the transmitting device; a transmit power; information indicating whether a transmission of the user data is a new data transmission or a retransmission; a modulation and coding scheme (MCS); information indicating whether acknowledgment information is to be transmitted by the UE; a destination identifier associated with a service for which the user data is being received; a source identifier associated with the service for which the user data is being received; or information for determining one or more feedback transmissions by the UE.

Example 57

The method of any of examples 49 to 56, wherein the resource allocation for the user data indicates a number of slots that will be occupied by the user data.

Example 58

The method of any of examples 49 to 57, wherein the resource allocation for the user data indicates one or more subchannels that will be occupied by the user data.

Example 59

The method of any of examples 49 to 58, wherein a format type of the first portion of the control message is independent of a transmission type of the second portion of the control message; and a format type of the second portion of the control message varies with respect to a transmission type of the second portion of the control message.

Example 60

The method of any of examples 49 to 59, wherein a modulation and coding scheme (MCS) of the first portion of the control message is different from an MCS of the second portion of the control message. The method of any of examples 49 to 59, wherein a modulation and coding scheme (MCS) of the first portion of the control message is the same as an MCS of the second portion of the control message.

Example 61

The method of any of examples 49 to 60, wherein the first portion of the control message is received via a first subset of time-frequency resources, the second portion of the control message is received via a second subset of the time-frequency resources, and the user data is received via a third subset of the time-frequency resources.

Example 62

The method of any of examples 49 to 61, wherein the receiving the first portion of the control message comprises determining a multiple access (MA) signature used to transmit the first portion of the control message, the MA signature distinguishing a transmission of a transmitting device from another transmission of another transmitting device on a same time-frequency resource; and receiving the first portion of the control message via the first subset of the time-frequency resources based on the MA signature.

Example 63

A user equipment (UE) for wireless communication comprising at least one processor and a memory coupled to the at least one processor, the at least one processor and the memory configured to perform a method of any of examples 49 to 62.

Example 64

A user equipment (UE) for wireless communication comprising at least one means for performing a method of any of examples 49 to 62.

Example 65

A non-transitory computer-readable medium storing computer-executable code at a user equipment (UE), comprising code for causing a computer to perform a method of any of examples 49 to 62.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-22 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-22 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication at a first user equipment (UE), comprising:
    transmitting a first portion of a control message associated with user data, wherein the first portion of the control message comprises information for decoding a second portion of the control message associated with the user data, information for decoding the user data, and a resource allocation for the user data, further wherein the first portion of the control message is to be decoded by a second UE and a third UE, the user data is to be decoded by the second UE, and the user data is unintended to be decoded by the third UE;
    transmitting the second portion of the control message associated with the user data, the second portion of the control message comprising additional information for decoding the user data, the additional information including a source identifier associated with the user data and a destination identifier associated with the user data; and
    transmitting the user data.

2. The method of claim 1, wherein the resource allocation for the user data comprises at least one of a resource allocation for a current transmission of the user data or a resource allocation for a future transmission or retransmission of the user data, and wherein the first portion of the control message further comprises one or more of:
- a resource allocation for the second portion of the control message; or
- a transmission priority of the user data.

3. The method of claim 2, wherein the resource allocation for the second portion of the control message comprises one or more of:
- time-frequency resources of the second portion of the control message;
- an orthogonal frequency division multiplexing (OFDM) symbol location of the second portion of the control message; or
- a format type of the second portion of the control message.

4. The method of claim 2, wherein the first portion of the control message further comprises one or more of:
- a link identifier determined based on at least one of a link layer identifier associated with the first UE or a link layer identifier associated with a second UE; or
- information indicating whether acknowledgment information is to be transmitted by the second UE.

5. The method of claim 3, wherein the resource allocation for the second portion of the control message further comprises:
- a transmission priority of the second portion of the control message.

6. The method of claim 1, wherein:
- the destination identifier comprises information for indicating that the second UE is intended to decode the user data, and
- the third UE unintended to decode the user data discards the user data upon reception of the user data.

7. The method of claim 6, further comprising:
- receiving a negative acknowledgement (NACK) from the second UE if the second UE fails to successfully decode the user data.

8. The method of claim 6, further comprising:
- receiving a negative acknowledgement (NACK) from the second UE if the second UE fails to successfully decode the second portion of the control message.

9. The method of claim 1, wherein the second portion of the control message further comprises one or more of:
- a transmission mode;
- information indicating whether the transmission of the user data is a new data transmission or a retransmission;
- information indicating whether acknowledgment information is to be transmitted by a second UE; or
- information for determining one or more feedback transmissions by the second UE,
- wherein the source identifier is associated with a service for which the user data is being transmitted.

10. The method of claim 9, wherein the transmission mode indicates at least one of:
- a unicast type transmission,
- a broadcast type transmission,
- a multicast type transmission, or
- a groupcast type transmission.

11. The method of claim 9, wherein the second portion of the control message further comprises one or more of:
- a resource allocation for the user data;
- multiple input multiple output (MIMO) layer information;
- a speed of the first UE;
- a position of the first UE;
- a transmit power; or
- a modulation and coding scheme (MCS).

12. The method of claim 11, wherein the resource allocation for the user data indicates a number of slots that will be occupied by the user data.

13. The method of claim 11, wherein the resource allocation for the user data indicates one or more subchannels that will be occupied by the user data.

14. The method of claim 1, wherein:
- a format type of the first portion of the control message is independent of a transmission type of the second portion of the control message; and
- a format type of the second portion of the control message varies with respect to a transmission type of the second portion of the control message.

15. The method of claim 1, wherein a modulation and coding scheme (MCS) of the first portion of the control message is different from an MCS of the second portion of the control message.

16. The method of claim 1, further comprising:
- determining time-frequency resources to transmit the first portion of the control message, the second portion of the control message, and the user data,
- wherein the first portion of the control message is transmitted via a first subset of the time-frequency resources,
- wherein the second portion of the control message is transmitted via a second subset of the time-frequency resources, and
- wherein the user data is transmitted via a third subset of the time-frequency resources.

17. The method of claim 16, wherein the transmitting the first portion of the control message comprises:
- determining a multiple access (MA) signature for distinguishing a transmission of the first UE from another transmission of another UE on a same time-frequency resource; and
- transmitting the first portion of the control message via the first subset of the time-frequency resources using the MA signature.

18. The method of claim 1, wherein the resource allocation for the user data comprises a resource allocation for a current transmission of the user data, and wherein the first portion of the control message further comprises one or more of:
- a resource allocation for the second portion of the control message; or
- a transmission priority of the user data.

19. The method of claim 18, wherein the resource allocation for the second portion of the control message comprises one or more of:
- time-frequency resources of the second portion of the control message; or
- a format type of the second portion of the control message.

20. The method of claim 1, wherein the second portion of the control message further comprises one or more of:
- a transmission mode;
- information indicating whether the transmission of the user data is a new data transmission or a retransmission;
- information indicating whether acknowledgment information is to be transmitted by a second UE; or
- information for determining one or more feedback transmissions by the second UE.

21. A first user equipment (UE) for wireless communication, comprising:
- at least one processor; and
- a memory coupled to the at least one processor, the at least one processor and the memory configured to:
  - transmit a first portion of a control message associated with user data, wherein the first portion of the control message comprises information for decoding a second portion of the control message associated with the user data, information for decoding the user data, and a resource allocation for the user data, further wherein the first portion of the control message is to be decoded by a second UE and a third UE, the user data is to be decoded by the second UE, and the user data is unintended to be decoded by the third UE,
  - transmit the second portion of the control message associated with the user data, the second portion of the control message comprising additional information for decoding the user data, the additional information including a source identifier associated with the user data and a destination identifier associated with the user data, and
  - transmit the user data.

22. The first UE of claim 21, the at least one processor and the memory further configured to:
- receive a negative acknowledgement (NACK) from the second UE if the second UE fails to successfully decode the user data.

23. The first UE of claim 21, wherein the resource allocation for the user data comprises a resource allocation for a current transmission of the user data, and wherein the first portion of the control message further comprises one or more of:
- a resource allocation for the second portion of the control message; or
- a transmission priority of the user data.

24. The first UE of claim 23, wherein the resource allocation for the second portion of the control message comprises one or more of:
- time-frequency resources of the second portion of the control message; or
- a format type of the second portion of the control message.

25. The first UE of claim 21, wherein the second portion of the control message further comprises one or more of:
- a transmission mode;
- information indicating whether the transmission of the user data is a new data transmission or a retransmission;
- information indicating whether acknowledgment information is to be transmitted by a second UE; or
- information for determining one or more feedback transmissions by the second UE.

26. A method of wireless communication at a first user equipment (UE), comprising:
- receiving, from a second UE, a first portion of a control message associated with user data, wherein the first portion of the control message includes information for decoding a second portion of the control message associated with the user data and for decoding the user data and supplementary information including a resource allocation for the user data, further wherein the first portion of the control message is to be decoded by the first UE and a third UE, the user data is to be decoded by the first UE, and the user data is unintended to be decoded by the third UE;
- receiving, from the second UE, the second portion of the control message associated with the user data, the second portion of the control message including additional information for decoding the user data, the additional information including a source identifier associated with the user data and a destination identifier associated with the user data;
- decoding the received second portion of the control message based on the information included in the first portion of the control message and the supplementary information included in the first portion of the control message;
- receiving the user data from the second UE if the received second portion of the control message is able to be decoded; and
- decoding the received user data based on the information included in the first portion of the control message and the additional information included in the second portion of the control message.

27. The method of claim 26, further comprising:
- determining whether the second portion of the control message or the user data is intended to be decoded by the first UE based on the information included in the first portion of the control message; and
- determining whether the user data is intended to be decoded by the first UE based on the additional information included in the second portion of the control message.

28. The method of claim 27, wherein the second portion of the control message is decoded if the second portion of the control message or the user data is intended to be decoded by the first UE.

29. The method of claim 27, wherein the decoding the received user data includes discarding the user data if the first UE is unintended to decode the user data.

30. The method of claim 26, further comprising:
- transmitting a negative acknowledgement (NACK) to the second UE if the received user data is unable to be decoded.

31. The method of claim 26, wherein the resource allocation for the user data includes at least one of a resource allocation for a current transmission of the user data or a resource allocation for a future transmission or retransmission of the user data, and wherein the first portion of the control message further includes one or more of:
- a resource allocation for the second portion of the control message; or
- a transmission priority of the user data.

32. The method of claim 31, wherein the resource allocation for the second portion of the control message includes one or more of:
- time-frequency resources of the second portion of the control message;
- an orthogonal frequency division multiplexing (OFDM) symbol location of the second portion of the control message; or
- a format type of the second portion of the control message.

33. The method of claim 31, wherein the first portion of the control message further includes one or more of:
- a link identifier determined based on at least one of a link layer identifier associated with the first UE or a link layer identifier associated with the second UE; or
- information indicating whether acknowledgment information is to be transmitted by the first UE.

34. The method of claim 32, wherein the resource allocation for the second portion of the control message further includes:
a transmission priority of the second portion of the control message.

35. The method of claim 26, wherein the second portion of the control message further includes one or more of:
a transmission mode;
information indicating whether a transmission of the user data is a new data transmission or a retransmission;
information indicating whether acknowledgment information is to be transmitted by the first UE; or
information for determining one or more feedback transmissions by the first UE,
wherein the source identifier is associated with a service for which the user data is being received.

36. The method of claim 35, wherein the transmission mode indicates at least one of:
a unicast type transmission,
a broadcast type transmission,
a multicast type transmission, or
a groupcast type transmission.

37. The method of claim 35, wherein the second portion of the control message further includes one or more of:
a resource allocation for the user data;
multiple input multiple output (MIMO) layer information;
a speed of the second UE;
a position of the second UE;
a transmit power; or
a modulation and coding scheme (MCS).

38. The method of claim 37, wherein the resource allocation for the user data indicates a number of slots that will be occupied by the user data.

39. The method of claim 37, wherein the resource allocation for the user data indicates one or more subchannels that will be occupied by the user data.

40. The method of claim 26, wherein a modulation and coding scheme (MCS) of the first portion of the control message is different from an MCS of the second portion of the control message.

41. The method of claim 26, wherein:
the first portion of the control message is received via a first subset of time-frequency resources,
the second portion of the control message is received via a second subset of the time-frequency resources, and
the user data is received via a third subset of the time-frequency resources.

42. The method of claim 41, wherein the receiving the first portion of the control message comprises:
determining a multiple access (MA) signature used to transmit the first portion of the control message, the MA signature distinguishing a transmission of the second UE from another transmission of another UE on a same time-frequency resource; and
receiving the first portion of the control message via the first subset of the time-frequency resources based on the MA signature.

43. The method of claim 26, wherein the resource allocation for the user data includes a resource allocation for a current transmission of the user data, and wherein the first portion of the control message further includes one or more of:
a resource allocation for the second portion of the control message; or
a transmission priority of the user data.

44. The method of claim 43, wherein the resource allocation for the second portion of the control message includes one or more of:
time-frequency resources of the second portion of the control message; or
a format type of the second portion of the control message.

45. The method of claim 26, wherein the second portion of the control message further includes one or more of:
a transmission mode;
information indicating whether a transmission of the user data is a new data transmission or a retransmission;
information indicating whether acknowledgment information is to be transmitted by the first UE; or
information for determining one or more feedback transmissions by the first UE.

46. A first user equipment (UE) for wireless communication, comprising:
at least one processor; and
a memory coupled to the at least one processor, the at least one processor and the memory configured to:
receive, from a second UE, a first portion of a control message associated with user data, wherein the first portion of the control message includes information for decoding a second portion of the control message associated with the user data and for decoding the user data and supplementary information including a resource allocation for the user data, further wherein the first portion of the control message is to be decoded by the first UE and a third UE, the user data is to be decoded by the first UE, and the user data is unintended to be decoded by the third UE,
receive, from the second UE, the second portion of the control message associated with the user data, the second portion of the control message including additional information for decoding the user data, the additional information including a source identifier associated with the user data and a destination identifier associated with the user data,
decode the received second portion of the control message based on the information included in the first portion of the control message and the supplementary information included in the first portion of the control message,
receive the user data from the second UE if the received second portion of the control message is able to be decoded, and
decode the received user data based on the information included in the first portion of the control message and the additional information included in the second portion of the control message.

47. The first UE of claim 46, the at least one processor and the memory further configured to:
transmit a negative acknowledgement (NACK) to the second UE if the received user data is unable to be decoded.

48. The first UE of claim 46, wherein the resource allocation for the user data includes a resource allocation for a current transmission of the user data, and wherein the first portion of the control message further includes one or more of:
a resource allocation for the second portion of the control message; or
a transmission priority of the user data.

49. The first UE of claim 48, wherein the resource allocation for the second portion of the control message includes one or more of:

time-frequency resources of the second portion of the control message; or a format type of the second portion of the control message.

50. The first UE of claim 46, wherein the second portion of the control message further includes one or more of:

a transmission mode;

information indicating whether a transmission of the user data is a new data transmission or a retransmission;

information indicating whether acknowledgment information is to be transmitted by the first UE; or information for determining one or more feedback transmissions by the first UE.

51. A first user equipment (UE) for wireless communication, comprising:

means for transmitting a first portion of a control message associated with user data, wherein the first portion of the control message comprises information for decoding a second portion of the control message associated with the user data, information for decoding the user data, and a resource allocation for the user data, further wherein the first portion of the control message is to be decoded by a second UE and a third UE, the user data is to be decoded by the second UE, and the user data is unintended to be decoded by the third UE;

means for transmitting the second portion of the control message associated with the user data, the second portion of the control message comprising additional information for decoding the user data, the additional information including a source identifier associated with the user data and a destination identifier associated with the user data; and means for transmitting the user data.

52. The first UE of claim 51, wherein the resource allocation for the user data comprises at least one of a resource allocation for a current transmission of the user data or a resource allocation for a future transmission or retransmission of the user data, and wherein the first portion of the control message further comprises one or more of:

a resource allocation for the second portion of the control message; or a transmission priority of the user data.

53. The first UE of claim 52, wherein the resource allocation for the second portion of the control message comprises one or more of:

time-frequency resources of the second portion of the control message;

an orthogonal frequency division multiplexing (OFDM) symbol location of the second portion of the control message; or a format type of the second portion of the control message.

54. The first UE of claim 51, wherein the second portion of the control message further comprises one or more of:

a transmission mode;

information indicating whether the transmission of the user data is a new data transmission or a retransmission;

information indicating whether acknowledgment information is to be transmitted by a second UE; or information for determining one or more feedback transmissions by the second UE.

55. The first UE of claim 51, wherein the resource allocation for the user data comprises a resource allocation for a current transmission of the user data, and wherein the first portion of the control message further comprises one or more of:

a resource allocation for the second portion of the control message; or a transmission priority of the user data.

56. The first UE of claim 55, wherein the resource allocation for the second portion of the control message comprises one or more of:

time-frequency resources of the second portion of the control message; or a format type of the second portion of the control message.

57. The first UE of claim 51, wherein the second portion of the control message further comprises one or more of:

a transmission mode;

information indicating whether the transmission of the user data is a new data transmission or a retransmission;

information indicating whether acknowledgment information is to be transmitted by a second UE; or information for determining one or more feedback transmissions by the second UE.

58. A non-transitory computer-readable medium storing computer-executable code at a first user equipment (UE), comprising code for causing a computer to:

transmit a first portion of a control message associated with user data, wherein the first portion of the control message comprises information for decoding a second portion of the control message associated with the user data, information for decoding the user data, and a resource allocation for the user data, further wherein the first portion of the control message is to be decoded by a second UE and a third UE, the user data is to be decoded by the second UE, and the user data is unintended to be decoded by the third UE;

transmit the second portion of the control message associated with the user data, the second portion of the control message comprising additional information for decoding the user data, the additional information including a source identifier associated with the user data and a destination identifier associated with the user data; and transmit the user data.

59. The non-transitory computer-readable medium of claim 58, wherein the resource allocation for the user data comprises at least one of a resource allocation for a current transmission of the user data or a resource allocation for a future transmission or retransmission of the user data, and wherein the first portion of the control message further comprises one or more of:

a resource allocation for the second portion of the control message; or a transmission priority of the user data.

60. The non-transitory computer-readable medium of claim 59, wherein the resource allocation for the second portion of the control message comprises one or more of:

time-frequency resources of the second portion of the control message;

an orthogonal frequency division multiplexing (OFDM) symbol location of the second portion of the control message; or a format type of the second portion of the control message.

61. The non-transitory computer-readable medium of claim 58, wherein the second portion of the control message further comprises one or more of:
   a transmission mode;
   information indicating whether the transmission of the user data is a new data transmission or a retransmission;
   information indicating whether acknowledgment information is to be transmitted by a second UE; or
   information for determining one or more feedback transmissions by the second UE.

62. The non-transitory computer-readable medium of claim 58, wherein the resource allocation for the user data comprises a resource allocation for a current transmission of the user data, and wherein the first portion of the control message further comprises one or more of:
   a resource allocation for the second portion of the control message; or
   a transmission priority of the user data.

63. The non-transitory computer-readable medium of claim 62, wherein the resource allocation for the second portion of the control message comprises one or more of:
   time-frequency resources of the second portion of the control message; or
   a format type of the second portion of the control message.

64. The non-transitory computer-readable medium of claim 28, wherein the second portion of the control message further comprises one or more of:
   a transmission mode;
   information indicating whether the transmission of the user data is a new data transmission or a retransmission;
   information indicating whether acknowledgment information is to be transmitted by a second UE; or
   information for determining one or more feedback transmissions by the second UE.

65. A first user equipment (UE) for wireless communication, comprising:
   means for receiving, from a second UE, a first portion of a control message associated with user data, wherein the first portion of the control message includes information for decoding a second portion of the control message associated with the user data and for decoding the user data and supplementary information including a resource allocation for the user data, further wherein the first portion of the control message is to be decoded by the first UE and a third UE, the user data is to be decoded by the first UE, and the user data is unintended to be decoded by the third UE;
   means for receiving, from the second UE, the second portion of the control message associated with the user data, the second portion of the control message including additional information for decoding the user data, the additional information including a source identifier associated with the user data and a destination identifier associated with the user data;
   means for decoding the received second portion of the control message based on the information included in the first portion of the control message and the supplementary information included in the first portion of the control message;
   means for receiving the user data from the second UE if the received second portion of the control message is able to be decoded; and
   means for decoding the received user data based on the information included in the first portion of the control message and the additional information included in the second portion of the control message.

66. The first UE of claim 65, wherein the resource allocation for the user data includes a resource allocation for a current transmission of the user data, and wherein the first portion of the control message further includes one or more of:
   a resource allocation for the second portion of the control message; or
   a transmission priority of the user data.

67. The first UE of claim 66, wherein the resource allocation for the second portion of the control message includes one or more of:
   time-frequency resources of the second portion of the control message; or
   a format type of the second portion of the control message.

68. The first UE of claim 65, wherein the second portion of the control message further includes one or more of:
   a transmission mode;
   information indicating whether a transmission of the user data is a new data transmission or a retransmission;
   information indicating whether acknowledgment information is to be transmitted by the first UE; or
   information for determining one or more feedback transmissions by the first UE.

69. A non-transitory computer-readable medium storing computer-executable code at a first user equipment (UE), comprising code for causing a computer to:
   receive, from a second UE, a first portion of a control message associated with user data, wherein the first portion of the control message includes information for decoding a second portion of the control message associated with the user data and for decoding the user data and supplementary information including a resource allocation for the user data, further wherein the first portion of the control message is to be decoded by the first UE and a third UE, the user data is to be decoded by the first UE, and the user data is unintended to be decoded by the third UE;
   receive, from the second UE, the second portion of the control message associated with the user data, the second portion of the control message including additional information for decoding the user data, the additional information including a source identifier associated with the user data and a destination identifier associated with the user data;
   decode the received second portion of the control message based on the information included in the first portion of the control message and the supplementary information included in the first portion of the control message;
   receive the user data from the second UE if the received second portion of the control message is able to be decoded; and
   decode the received user data based on the information included in the first portion of the control message and the additional information included in the second portion of the control message.

70. The non-transitory computer-readable medium of claim 69, wherein the resource allocation for the user data comprises a resource allocation for a current transmission of the user data, and wherein the first portion of the control message further comprises one or more of:
   a resource allocation for the second portion of the control message; or
   a transmission priority of the user data.

71. The non-transitory computer-readable medium of claim 70, wherein the resource allocation for the second portion of the control message comprises one or more of:
  time-frequency resources of the second portion of the control message; or
  a format type of the second portion of the control message.

72. The non-transitory computer-readable medium of claim 69, wherein the second portion of the control message further comprises one or more of:
  a transmission mode;
  information indicating whether the transmission of the user data is a new data transmission or a retransmission;
  information indicating whether acknowledgment information is to be transmitted by a second UE; or
  information for determining one or more feedback transmissions by the second UE.

* * * * *